US009540052B2

(12) United States Patent
Burt, II et al.

(10) Patent No.: US 9,540,052 B2
(45) Date of Patent: Jan. 10, 2017

(54) SIDE-BY-SIDE VEHICLE

(71) Applicant: Polaris Industries Inc, Medina, MN (US)

(72) Inventors: Daniel L. Burt, II, Forest Lake, MN (US); Brent C. Eaton, Lindstrom, MN (US); Michael C. Bohnsack, Forest Lake, MN (US); Andrew J. Miller, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/458,839

(22) Filed: Aug. 13, 2014

(65) Prior Publication Data

US 2015/0047917 A1 Feb. 19, 2015

Related U.S. Application Data

(60) Provisional application No. 61/865,983, filed on Aug. 14, 2013.

(51) Int. Cl.
| | |
|---|---|
| *B62D 33/06* | (2006.01) |
| *B60K 1/04* | (2006.01) |
| *B60K 5/00* | (2006.01) |
| *B60K 15/04* | (2006.01) |
| *B60R 7/06* | (2006.01) |
| *B62D 25/14* | (2006.01) |
| *B62D 25/20* | (2006.01) |
| *B62D 23/00* | (2006.01) |
| *B60K 13/02* | (2006.01) |

(52) U.S. Cl.
CPC ............ *B62D 33/0617* (2013.01); *B60J 10/80* (2016.02); *B60K 1/04* (2013.01); *B60K 5/00* (2013.01); *B60K 15/04* (2013.01); *B60R 7/06* (2013.01); *B62D 23/005* (2013.01); *B62D 25/14* (2013.01); *B62D 25/2036* (2013.01); *B60K 13/02* (2013.01); *B60K 2001/0405* (2013.01); *B60K 2005/003* (2013.01); *B60K 2015/0474* (2013.01); *B60Y 2200/20* (2013.01); *B60Y 2200/86* (2013.01)

(58) Field of Classification Search
CPC .... B62D 33/0617; B62D 21/183; B60J 10/80; B60K 1/04; B60K 13/02; B60K 15/04; B60R 7/06
USPC ................................................ 296/190.03, 64
See application file for complete search history.

(56) References Cited

U.S. PATENT DOCUMENTS

| | | | |
|---|---|---|---|
| 7,258,395 B2 * | 8/2007 | Bataille | B62D 21/183 296/203.01 |
| 7,795,602 B2 | 9/2010 | Leonard et al. | |
| RE42,086 E | 2/2011 | Saito et al. | |

(Continued)

OTHER PUBLICATIONS

International Search Report and Written Opinion of the International Searching Authority issued by the European Patent Office, dated as of the International Search Report, Oct. 21, 2014, for International Application No. PCT/US2014/050890; 15 pages.

*Primary Examiner* — Pinel Romain
(74) *Attorney, Agent, or Firm* — Faegre Baker Daniels LLP

(57) ABSTRACT

A utility vehicle includes a plurality of ground-engaging members, a frame assembly supported by the plurality of ground-engaging members, and a powertrain assembly. Additionally, the utility vehicle includes a body generally surrounding the frame assembly and including a hood, dashboard assembly, and a side panel.

18 Claims, 60 Drawing Sheets

(56) References Cited

U.S. PATENT DOCUMENTS

| | | |
|---|---|---|
| 7,950,486 B2 | 5/2011 | Van Bronkhorst et al. |
| 8,079,602 B2 | 12/2011 | Kinsman et al. |
| 8,132,827 B2 | 3/2012 | Bergman et al. |
| 8,302,711 B2 | 11/2012 | Kinsman et al. |
| 8,613,336 B2 | 12/2013 | Deckard et al. |
| 8,613,337 B2 | 12/2013 | Kinsman et al. |
| 8,800,706 B2 | 8/2014 | Deckard et al. |
| 2011/0298189 A1 | 12/2011 | Schneider et al. |
| 2012/0161468 A1* | 6/2012 | Tsumiyama ........... B60J 5/0487 296/146.11 |
| 2013/0033070 A1 | 2/2013 | Kinsman et al. |
| 2014/0110893 A1 | 4/2014 | Kinsman et al. |

* cited by examiner

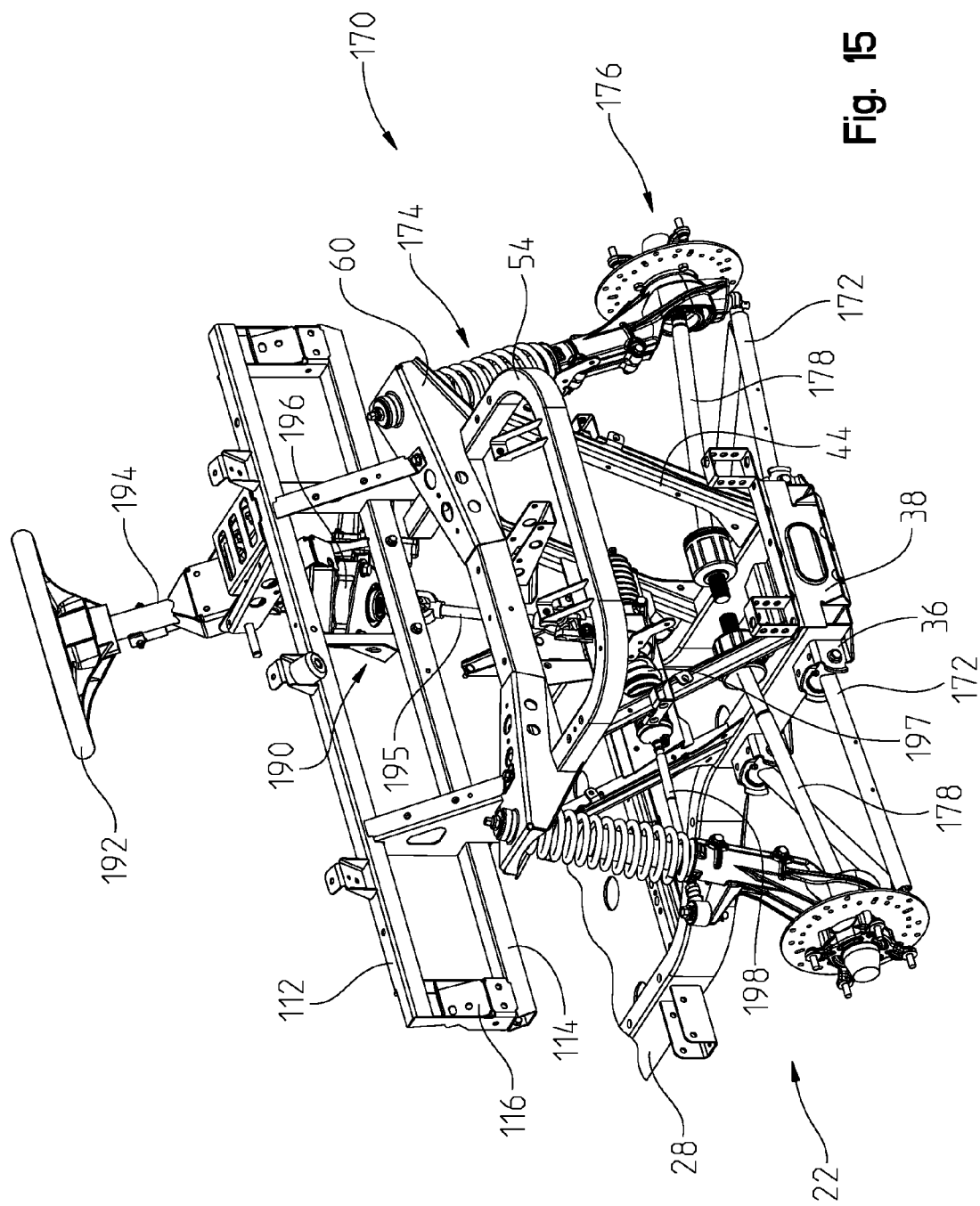

SIDE-BY-SIDE VEHICLE

CROSS-REFERENCE TO RELATED APPLICATIONS

The present application claims priority to U.S. Provisional Patent Application Ser. No. 61/865,983, filed on Aug. 14, 2013, and entitled "SIDE-BY-SIDE VEHICLE," the complete disclosure of which is expressly incorporated by reference herein.

BACKGROUND OF THE DISCLOSURE

The present disclosure generally relates to all-terrain and utility vehicles and, more particularly, to side-by-side utility vehicles configured to carry at least an operator, a passenger, and cargo.

Generally, all-terrain vehicles ("ATVs") and utility vehicles ("UVs") are configured to carry one or two passengers and cargo over a variety of terrains. Most side-by-side vehicles include seating for two to three passengers. Side-by-side vehicles, in which the driver and passenger are seated beside each other on laterally spaced apart seats, have become popular because of the ability to allow the passenger to share the driver's viewpoint and riding experience instead of being positioned behind the driver.

SUMMARY OF THE DISCLOSURE

In one embodiment described herein a utility vehicle comprises a plurality of ground engaging members, a frame supported by the plurality of ground engaging members, and an engine supported by the frame and configured to provide power to at least one of the plurality of ground engaging members. The utility vehicle further comprises an operator area supported by the frame and including seating for at least an operator and a passenger in a side-by-side arrangement. The seating includes at least one seat bottom and at least one seat back. The utility vehicle further comprises a body assembly coupled to the frame and including a hood, a first unitary side panel positioned along an operator side of the utility vehicle and extending continuously from the hood to the at least one seat back, and a second unitary side panel positioned along a passenger side of the utility vehicle and extending continuously from the hood to the at least one seat back.

A further embodiment of the present disclosure includes a utility vehicle comprising a plurality of ground engaging members, a frame supported by the plurality of ground engaging members, and a powertrain assembly supported by the frame and configured to provide power to at least one of the plurality of ground engaging members. The utility vehicle further comprises an operator area supported by the frame and including seating for at least an operator and a passenger in a side-by-side arrangement. The seating includes at least one seat bottom and at least one seat back. The utility vehicle also includes a body coupled to the frame, which includes a hood, and at least one side panel extending from the hood to the seat back and positioned generally below the seat bottom. The at least one side panel includes a first front sealing surface configured to engage with a door to seal the operator area.

Another illustrative embodiment of the present disclosure includes a utility vehicle comprising a plurality of ground engaging members, a frame supported by the plurality of ground engaging members, and a powertrain assembly supported by the frame and configured to provide power to at least one of the plurality of ground engaging members. The utility vehicle further comprises an operator area supported by the frame and including seating for at least an operator and a passenger in a side-by-side arrangement. The seating includes at least one seat bottom and at least one seat back. The utility vehicle also comprises a body coupled to the frame, which includes a hood and at least one side panel. The at least one side panel is positioned generally below the at least one seat bottom. The utility vehicle further comprises at least one seat restraint device supported by the frame and generally surrounded by the at least one side panel. The seat restraint device includes a latch member, a belt, and a belt retractor operably coupled to the belt, and the belt is configured to extend through an opening in the at least one side panel.

An alternative embodiment of the present disclosure includes a utility vehicle comprising a plurality of ground engaging members and a frame supported by the plurality of ground engaging members. The frame includes a cross-member extending laterally between opposing outer edges of the frame. The cross-member is configured to increase frame rigidity. The utility vehicle further comprises a powertrain assembly supported by the frame and configured to provide power to at least one of the plurality of ground engaging members. The powertrain assembly includes an engine and a transmission. Additionally, the utility vehicle comprises an operator area supported by the frame and including an operator seat portion and at least one passenger seat portion in a side-by-side arrangement. The utility vehicle also comprises an air intake system supported by the frame and operably coupled to the powertrain assembly. The cross-member of the frame is positioned rearward of the operator area and is fluidly coupled to the air intake system.

Another illustrative embodiment of the present disclosure includes a utility vehicle comprising a plurality of ground engaging members and a frame supported by the plurality of ground engaging members. The frame has a wheel base length of approximately 70-75 inches and a width of approximately 45-50 inches. The utility vehicle further comprises a powertrain assembly supported by the frame and configured to provide power to at least one of the plurality of ground engaging members. Additionally, the utility vehicle comprises an operator area supported by the frame and including at least one seat bottom and at least one seat back. The utility vehicle also comprises a body assembly coupled to the frame, which includes a hood, a dashboard assembly, and a floorboard assembly. The dashboard assembly is positioned forward of the at least one seat back and the at least one seat bottom, and includes an upper dashboard member and a lower dashboard member coupled to the upper dashboard member. The lower dashboard member includes at least one integral storage compartment. The floorboard assembly is coupled to the lower dashboard member and the lower dashboard member extends continuously between the upper dashboard member and the floorboard.

In yet a further illustrative embodiment of the present disclosure, a utility vehicle comprises a plurality of ground engaging members, a frame supported by the plurality of ground engaging member, and an engine supported by the frame and configured to provide power to at least one of the plurality of ground engaging members. The utility vehicle further comprises an operator area supported by the frame, a roll cage assembly coupled to the frame and positioned above the operator area, and a front windshield assembly including a wiper blade and a wiper motor operably coupled to the front windshield. The wiper blade and wiper motor are supported on the frame and positioned outward of the operator area.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIG. 15 is right front perspective view of a front suspension assembly of the vehicle of FIG. 1;

DETAILED DESCRIPTION OF THE DRAWINGS

Figure 1:
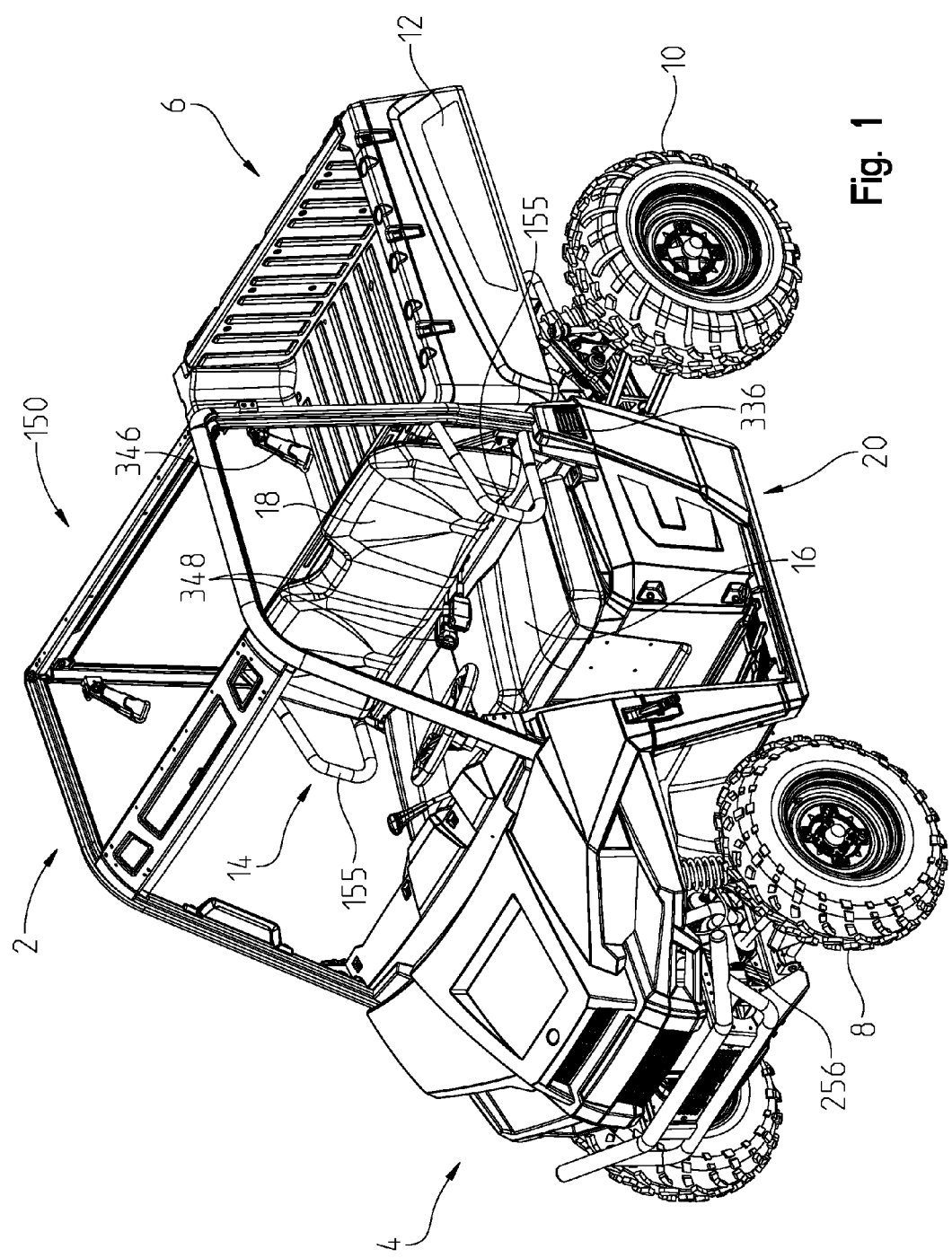
FIG. 1 is a front left perspective view of the vehicle of the present disclosure.

Corresponding reference characters indicate corresponding parts throughout the several views. Unless stated otherwise the drawings are proportional.

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIGS. 1-8, a utility vehicle 2 has a front end 4 and a rear end 6. A plurality of ground engaging members, including front wheels 8 and rear wheels 10, support utility vehicle 2 on a ground surface. Illustratively, the length between the axles of front wheels 8 and the axles of rear wheels 10 defines a wheel base length and may be approximately 70-75 inches. In one embodiment, the wheel base length may be approximately 73.1 inches. Additionally, the width between the axles of rear wheels 10 defines a wheel base width and may be approximately 45-55 inches. In one embodiment, the wheel base width may be approximately 46 inches.

A frame assembly 20 extends between front end 4 and rear end 6 of utility vehicle 2 and is supported on front wheels 8 and rear wheels 10. Frame assembly 20 supports a cargo box 12 at rear end 6 and an operator area 14 between front end 4 and rear end 6.

Operator area 14 includes seating for at least an operator and a passenger in a side-by-side arrangement. Illustratively, operator area 14 includes a seat bottom 16 and a seat back 18. While seat bottom 16 and seat back 18 are illustratively of the bench seat-style and are configured to support both the operator and the passenger, other embodiments of seat bottom 16 and seat back 18 may be configured as bucket seats, such that each seat bottom 16 and seat back 18 supports only one person.

Figure 9:
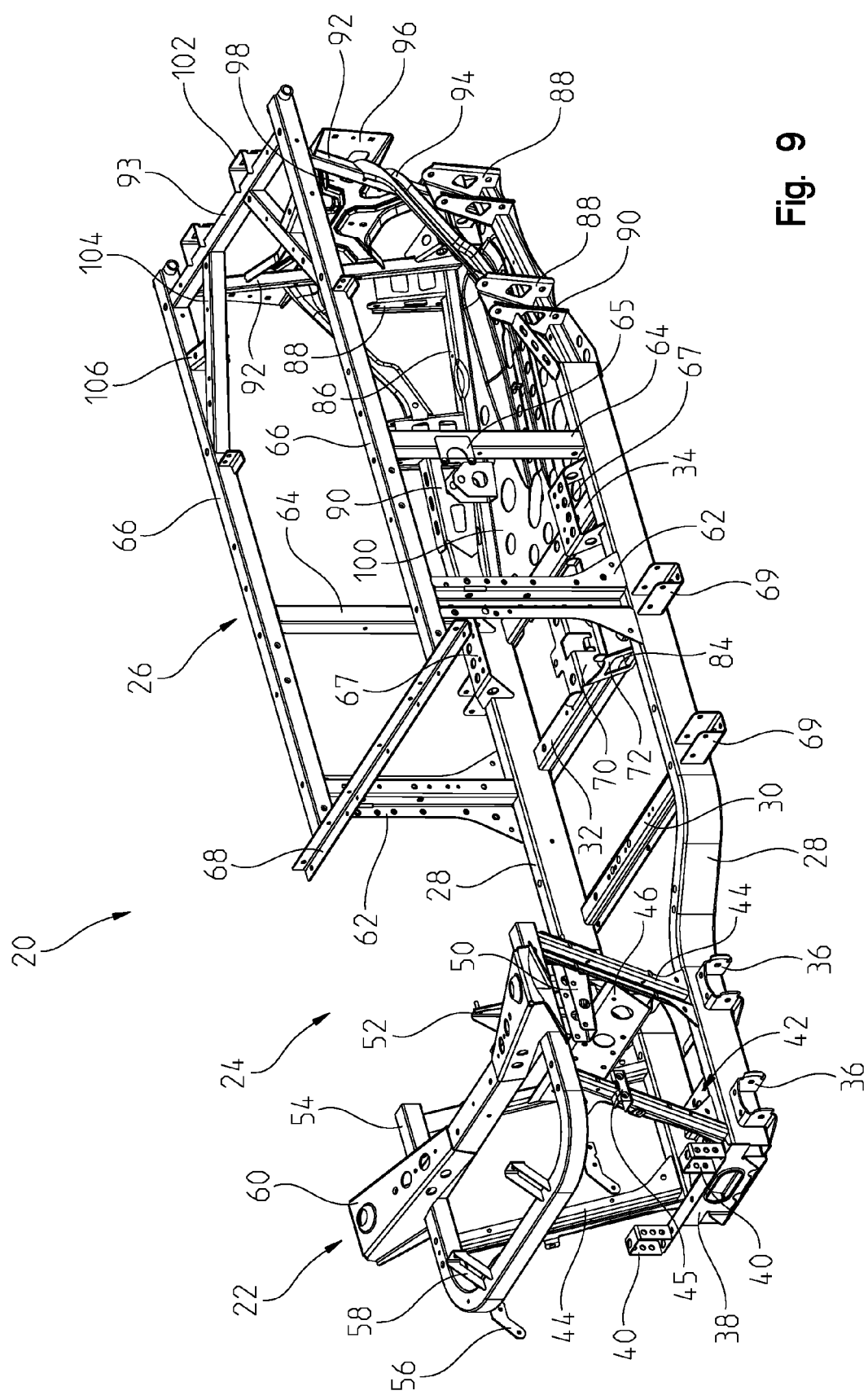
FIG. 9 is a front left perspective view of a frame of the vehicle of FIG. 1.
Figure 10:
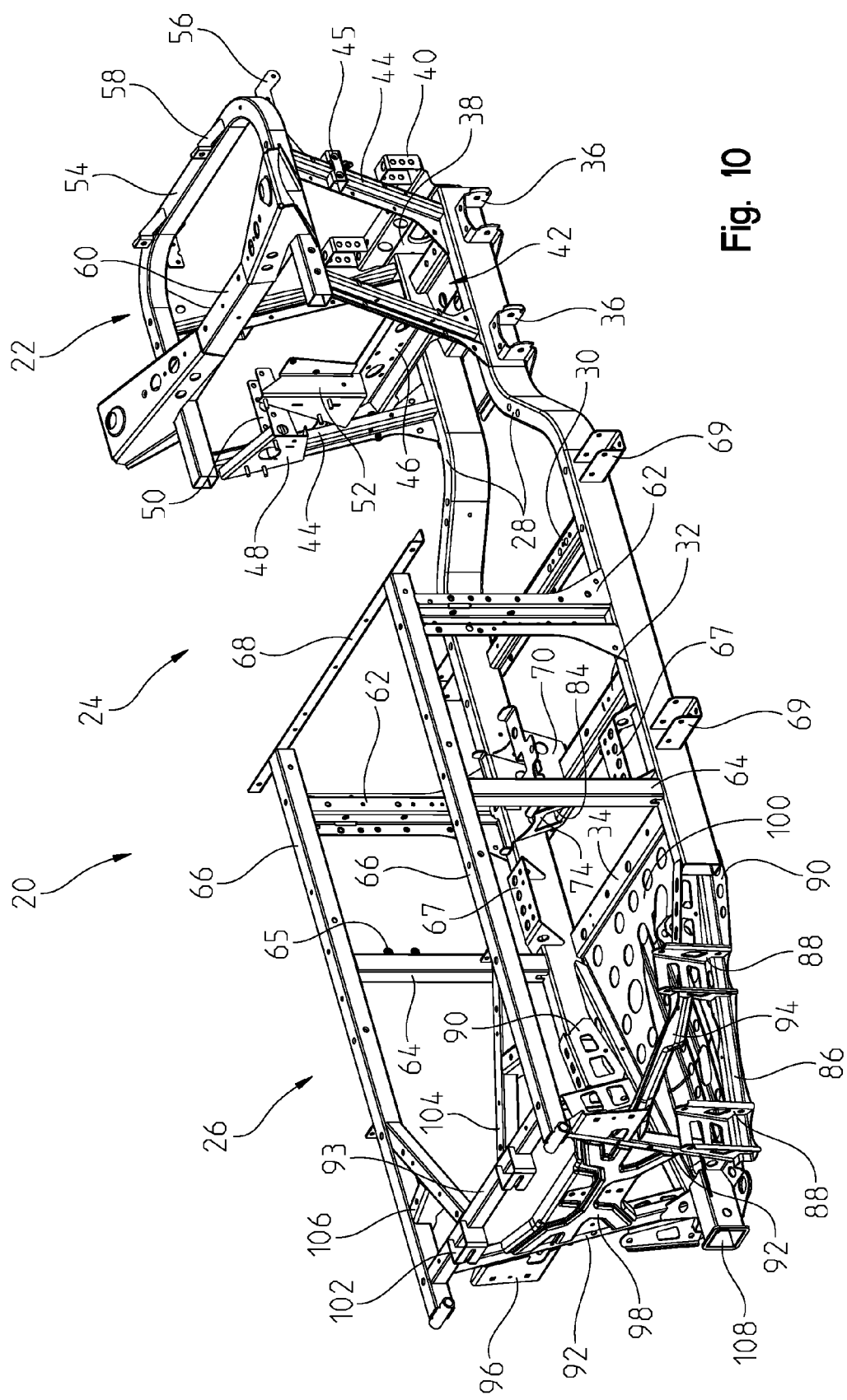
FIG. 10 is a right rear perspective view of the frame of FIG. 9.
Figure 11:
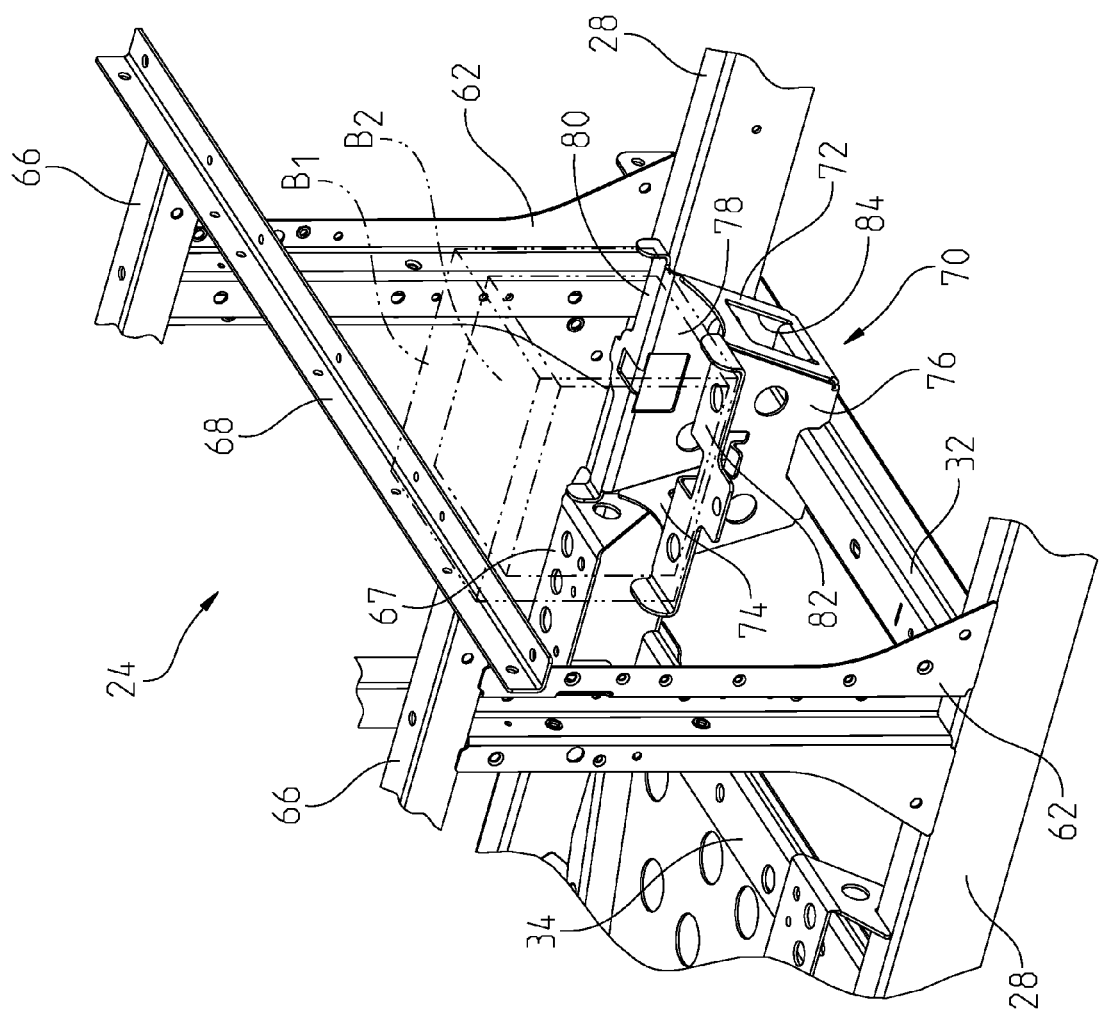
FIG. 11 is a right front perspective view of a battery support member of the frame of FIG. 10.

Referring to FIGS. 9-11, frame assembly 20 extends along a longitudinal axis L of utility vehicle 2 (FIG. 6) and includes a front frame portion 22, a mid-frame portion 24, and a rear frame portion 26. Frame assembly 20 includes lower longitudinally-extending members 28 extending between front frame portion 22 and rear frame portion 26. A plurality of cross-members 30, 32, and 34 extend transversely to longitudinal axis L and are coupled to both lower longitudinally-extending members 28.

At front frame portion 22, lower longitudinally-extending members 28 are coupled to alignment arm brackets 36 for a front suspension assembly 170, detailed further herein. Illustratively, front frame portion 22 includes at least four brackets 36. Additionally, lower longitudinally-extending members 28 are coupled to plate member 38, which supports brackets 40. A forward powertrain support member 42 is coupled to lower longitudinally-extending members 28 and is positioned rearward of plate member 38. Forward powertrain support member 42 may be configured to support a portion of a powertrain assembly 250, for example a front final drive unit 256.

Additionally, as shown in FIGS. 9 and 10, lower longitudinally-extending members 28 are coupled to upstanding members 44 at front frame portion 22. Illustratively, front frame portion 22 includes four upstanding members 44. Upstanding members 44 support a brace 46 extending therebetween and a brake pedal support member 48, as shown best in FIG. 10. Brake pedal support member 48 is coupled to a bracket 50 extending forwardly therefrom. Brace 46 is coupled to a throttle pedal support member 52 extending upwardly therefrom.

Upstanding members 44 also support a U-shaped frame member 54 coupled to the upper ends thereof. More particularly, the lower ends of upstanding members 44 are coupled to lower longitudinally-extending members 28 and the upper ends of upstanding members 44 are coupled to U-shaped frame member 54, such that U-shaped frame member 54 is positioned above lower longitudinally-extending members 28. U-shaped frame member 54 includes brackets 56 and bracket 58, and also supports a cross-member 60.

Referring to FIGS. 9 and 10, mid-frame portion 24 includes upstanding members 62 and 64. Upstanding members 64 are positioned rearward of upstanding members 62 and include a bracket 65. A lower end of upstanding members 62, 64 are coupled to lower longitudinally-extending members 28 and an upper end of upstanding members 62, 64 is coupled to upper longitudinally-extending members 66.

Upper longitudinally-extending members 66 extend between mid-frame portion 24 and rear frame portion 26, and are positioned above lower longitudinally-extending members 28. A forward end of upper longitudinally-extending members 66 is coupled to cross-member 68, which may be further coupled to a seat frame 165 (FIG. 12) to support seat bottom 16 and/or seat back 18.

Mid-frame portion 24 also includes brackets 67, which are coupled to lower longitudinally-extending members 28. Additionally, mid-frame portion 24 includes a battery support member 70, which is also coupled to lower longitudinally-extending members 28. As shown best in FIG. 11, battery support member 70 includes a front plate 72, a rear plate 74, an inner side plate 76, and an outer side plate 78. Illustratively, battery support member 70 is supported on cross-member 32 and lower longitudinally-extending members 28, and is positioned inward of upstanding members 62. More particularly, outer side plate 78 of battery support member 70 is adjacent one of lower longitudinally-extending member 28 and may be coupled thereto with conventional fasteners, for example, screws, bolts, welds, rivets, and/or adhesive. Furthermore, outer side plate 78 includes a tab 80 that engages the top surface of lower longitudinally-extending members 28. Similarly, inner side plate 76 includes a tab 82 that is generally opposite tab 80. Front and rear plates 72, 74 each include an opening 84 which may facilitate cooling, accessibility, and assembly of a battery within battery support member 70. Illustrative battery support member 70 is positioned below an operator portion of seat bottom 16; however, in alternative embodiments of utility vehicle 2, battery support member 70 may be positioned below a passenger portion of seat bottom 16. By coupling battery support member to frame assembly 20, the center of gravity of utility vehicle 2 may be lowered. Battery support member 70 is configured to accommodate batteries of various sizes in order to allow the operator to customize the electrical system of utility vehicle 2. For example, battery support member 70 is configured to support a battery B1 or a battery B2. Illustratively, battery B1 is larger than battery B2 and, as such, battery support member 70 is configured to support various sizes of batteries.

Figure 11A:
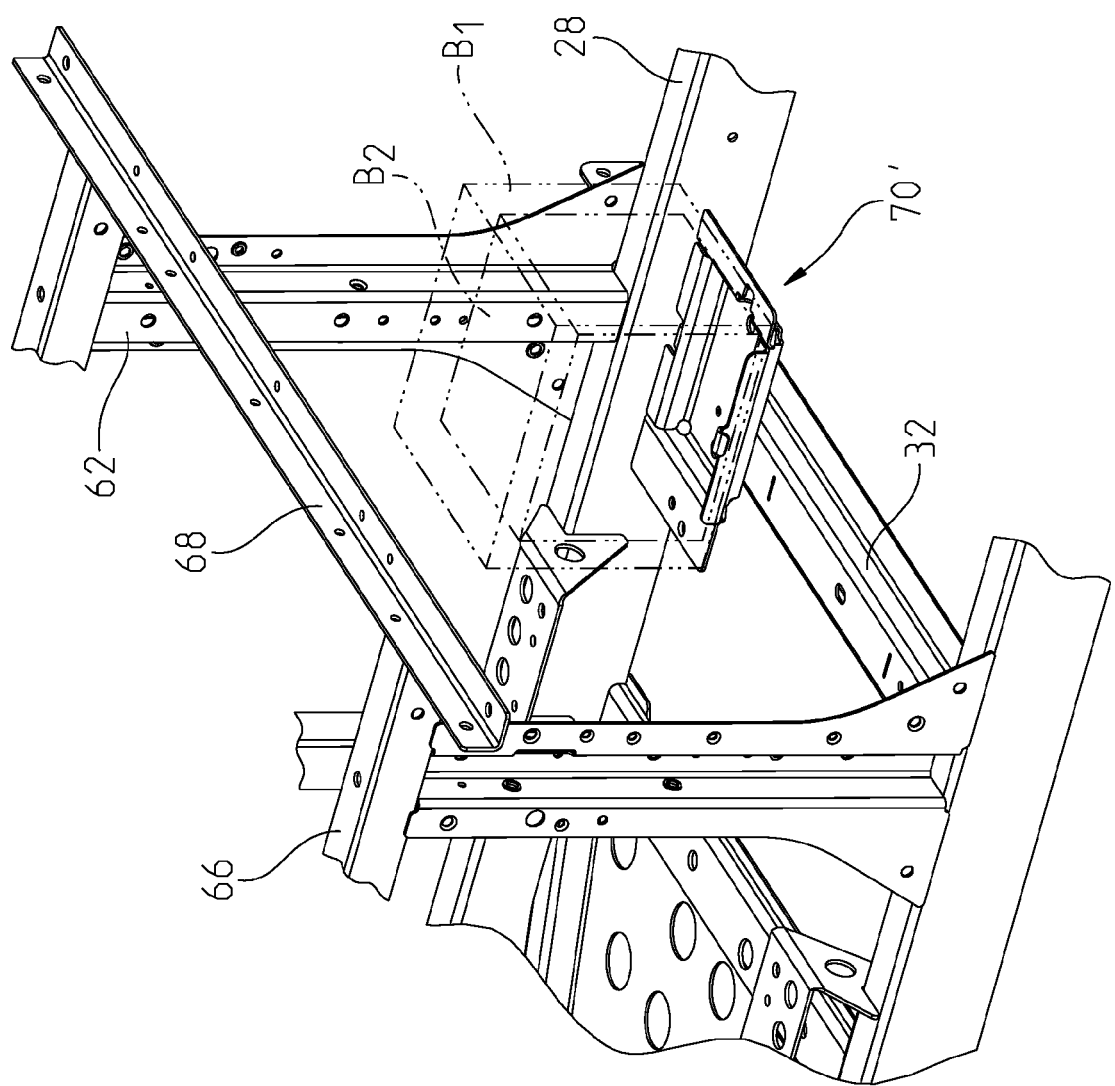
FIG. 11A is a right front perspective view of an alternative embodiment battery support member of the frame of FIG. 10.

As shown in FIG. 11A, an alternative embodiment of battery support member 70 is shown as battery support member 70'. Battery support member 70' may be configured as a tray or plate-type member. As with battery support member 70 of FIG. 11, battery support member 70' of FIG. 11A also is configured to support batteries of various sizes. For example, battery support member 70' is configured to support battery B1 or battery B2.

Illustratively, batteries B1 and B2 are positioned lower within vehicle 2 because battery support member 70' has a lower vertical profile than battery support member 70. More particularly, battery support member 70' and a bottom surface of batteries B1 and B2 are positioned below the top surface of lower longitudinally-extending members 28. Conversely, a portion of battery support member 70' and the bottom surface of batteries B1 and B2 may be positioned above the top surface of lower longitudinally-extending member 28.

Figure 12:
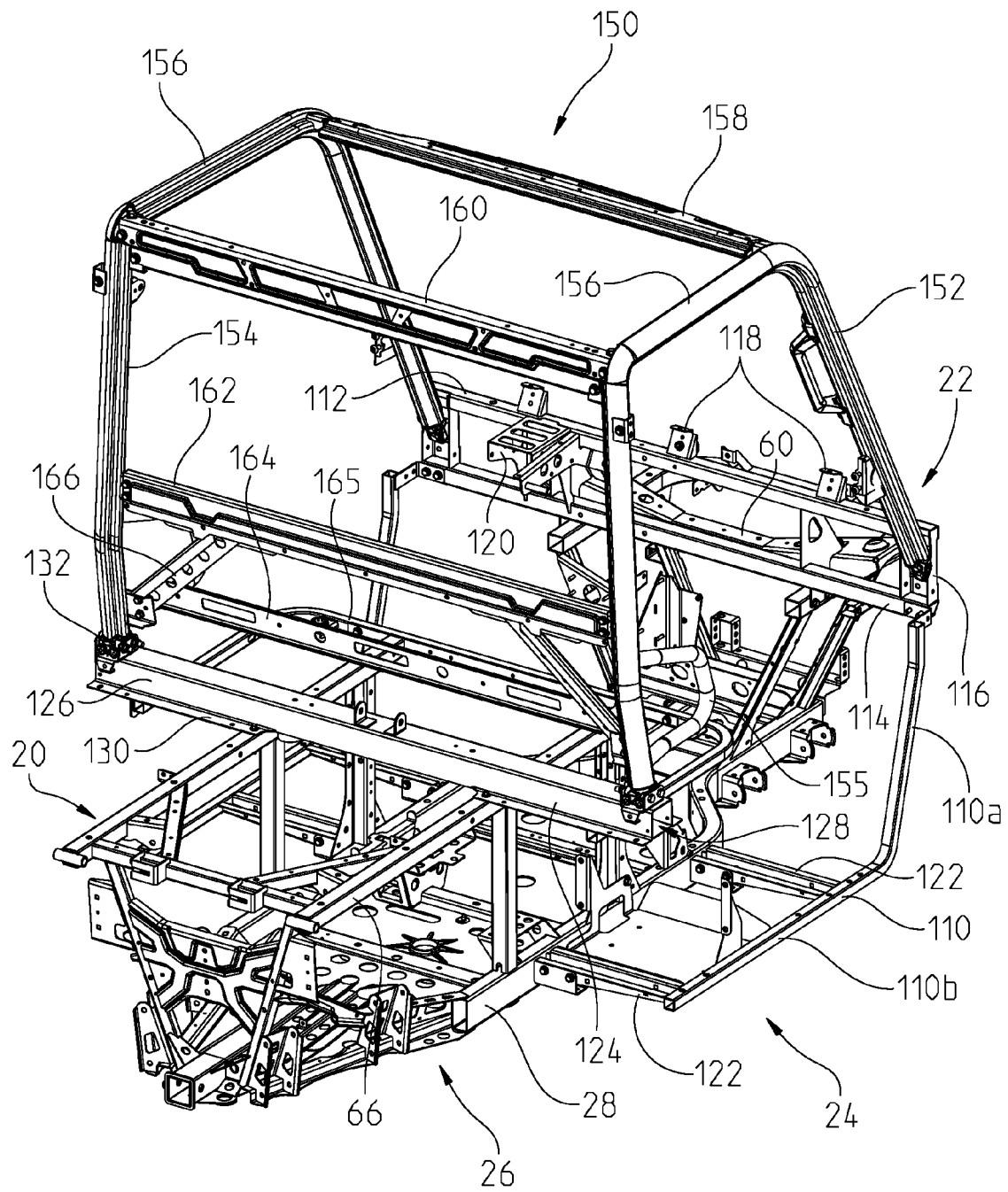
FIG. 12 is a right rear perspective view of a roll cage assembly of the vehicle coupled to the frame of FIG. 10.

Referring to FIG. 12, mid-frame portion 24 also includes a roll cage support frame, which includes outer frame rails 110, an upper cross-member 112, a lower cross-member 114, and braces 116. Outer frame rails 110 have an upstanding portion 110a and a longitudinal portion 110b. Longitudinal portion 110b is coupled to lower longitudinally-extending members 28 with braces 122. Upstanding portion 110a of outer frame rails 110 is coupled to lower cross-member 114 with conventional fasteners, such as bolts, screws, welds, rivets, and/or adhesive.

Lower cross-member 114 is generally parallel to upper cross-member 112 and is coupled thereto with braces 116. Upper cross-member 112, lower cross-member 114, and braces 116 are generally positioned rearward of cross-member 60 of front frame portion 22. In one embodiment, upper cross-member 112, lower cross-member 114, and braces 116 may be a single-piece weldment. In other embodiments, upper cross-member 112, lower cross-member 114, and braces 116 are separate from each other and coupled thereto with conventional fasteners. Upper and lower cross-members 112, 114 are coupled to a steering support member 120. Upper cross-member 112 also is coupled to brackets 118.

Figure 13:
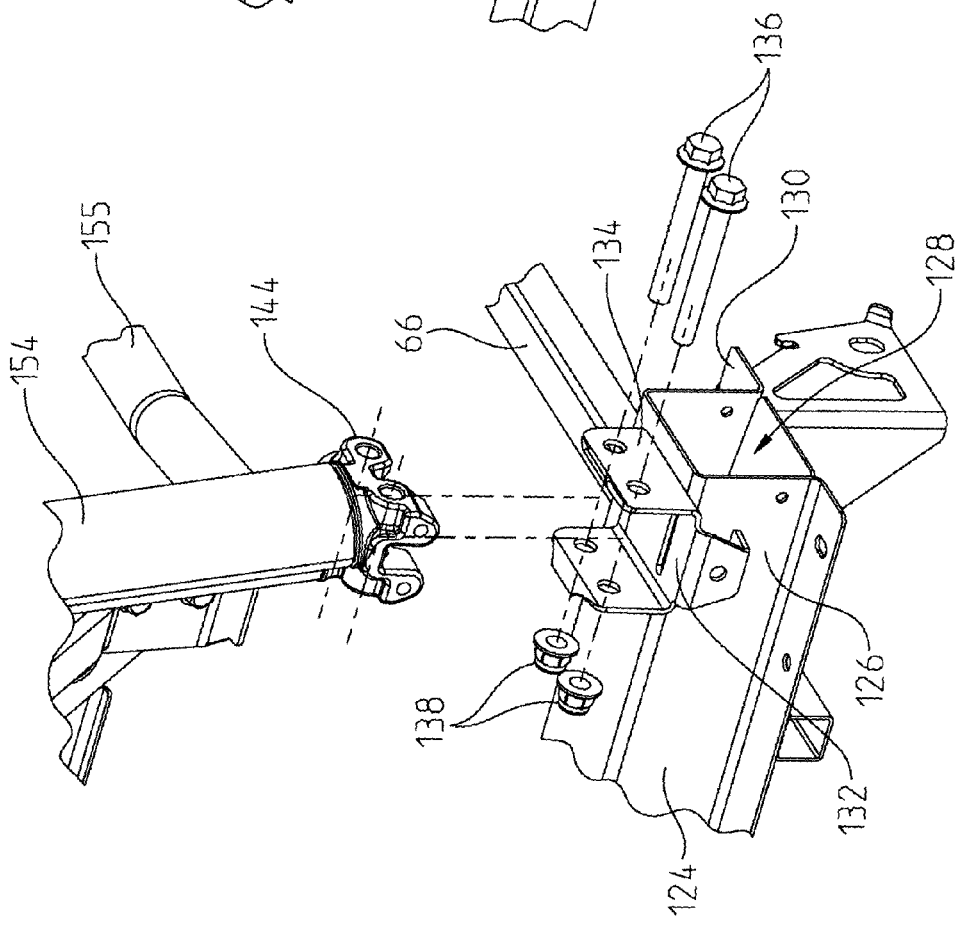
FIG. 13 is a right rear perspective view of a rear upstanding member of the roll cage assembly coupled to a rear portion of the frame of FIG. 11.

The roll cage support frame of mid-frame portion 24 further includes a rear cross-member 124, which is coupled to upper longitudinally-extending members 66. Rear cross-member 124 includes tabs 130, which facilitate the coupling between rear cross-member 124 and upper longitudinally-extending members 66. As shown in FIGS. 12 and 13, rear cross-member 124 includes a channel body 126 having a generally hollow interior channel 128, which is detailed further herein. Channel body 126 of rear cross-member 124 supports a bracket 132 which includes upstanding tabs 134.

Referring to FIGS. 9 and 10, rear frame portion 26 includes frame rails 86 coupled to lower longitudinally-extending members 28. Frame rails 86 support alignment arm brackets 88 for coupling with upper and lower alignment arms 302, 304 of a rear suspension assembly 300. Additionally, frame rails 86 include brackets 90 which are coupled to the rearward ends of lower longitudinally-extending members 28. A pan 100 is coupled to frame rails 86 and may be configured to support a portion of powertrain assembly 250. Pan 100 also may support a hitch member 108, as shown in FIG. 10, for towing an object and/or cargo behind utility vehicle 2. In one embodiment, utility vehicle 2 has a towing capacity of approximately 1,250 lbs.

Rear frame portion 26 also includes upstanding members 92. Lower ends of upstanding members 92 are coupled to the rearward ends of frame rails 86 and upper ends of upstanding members 92 are coupled to a cross-member 93, which extends between upper longitudinally-extending members 66. Upstanding members 92 include braces 94, which extend between upstanding members 92 and brackets 88. Upstanding members 92 also are coupled to support plates 96 and 98.

Cross-member 93 includes brackets 102 and is coupled to diagonal frame members 104. Diagonal frame members 104 also are coupled to upper longitudinally-extending members 66 and braces 106. While diagonal frame members 104 and braces 106 are illustratively shown having a rectangular cross-section, diagonal frame members 104 and braces 106 may also have a circular cross-sectional profile.

Figure 14:
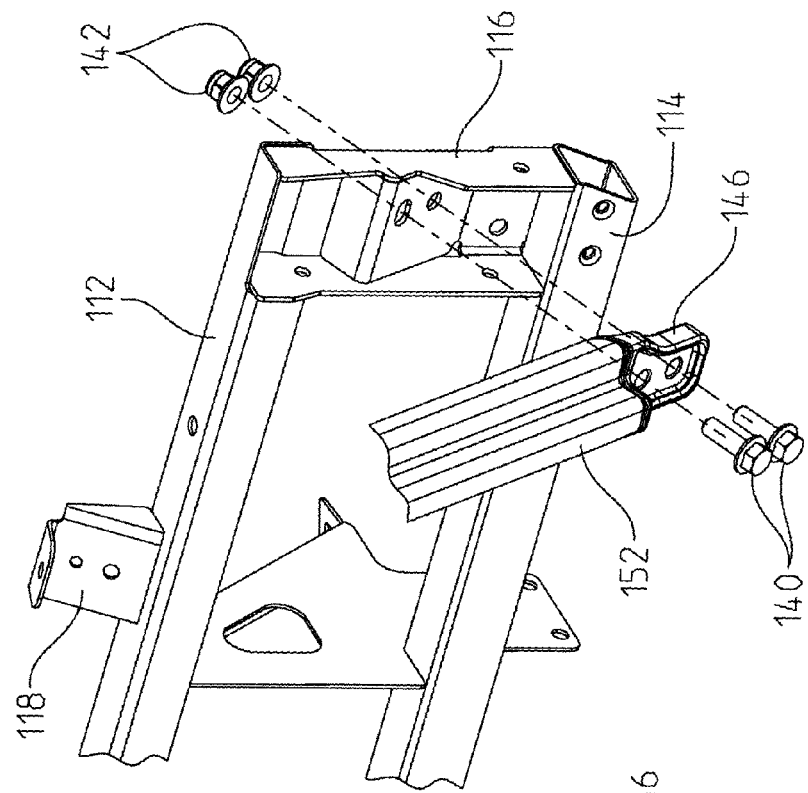
FIG. 14 is a right rear perspective view of a front upstanding member of the roll cage assembly coupled to a front portion of the frame of FIG. 11.

Referring to FIGS. 12-14, a roll cage assembly 150 is coupled to frame assembly 20 and includes front upstanding members 152, rear upstanding members 154, and longitudinal members 156 extending therebetween. In one embodiment, front upstanding member 152, longitudinal member 156, and rear upstanding member 154 may be integrally formed together as a single-piece weldment. Alternatively, front upstanding member 152, longitudinal member 156, and rear upstanding member 154 may be separate from each other and coupled to each other with conventional fasteners, such as welds, rivets, bolts and/or adhesive. Additionally, roll cage assembly 150 includes a front cross-member 158, a rear upper cross-member 160, a rear intermediate cross-member 162, a rear lower cross-member 164, and diagonal braces 166. Front cross-member 158 is coupled to front upstanding members 152 and/or longitudinal members 156. Front cross-member 158 and rear upper cross-member 160 may be formed by stamping.

Rear upper cross-member 160 is coupled to rear upstanding members 154 and/or longitudinal members 156. Rear intermediate cross-member 162, rear lower cross-member 164, and diagonal braces 166 are coupled to rear upstanding members 154. Illustratively, rear intermediate cross-member 162, rear lower cross-member 164, and diagonal braces 166 may generally define a K-shape, however, other configurations of rear intermediate cross-member 162, rear lower cross-member 164, and diagonal braces 166 are possible (e.g., an X-shape, a Y-shape).

Figure 8:
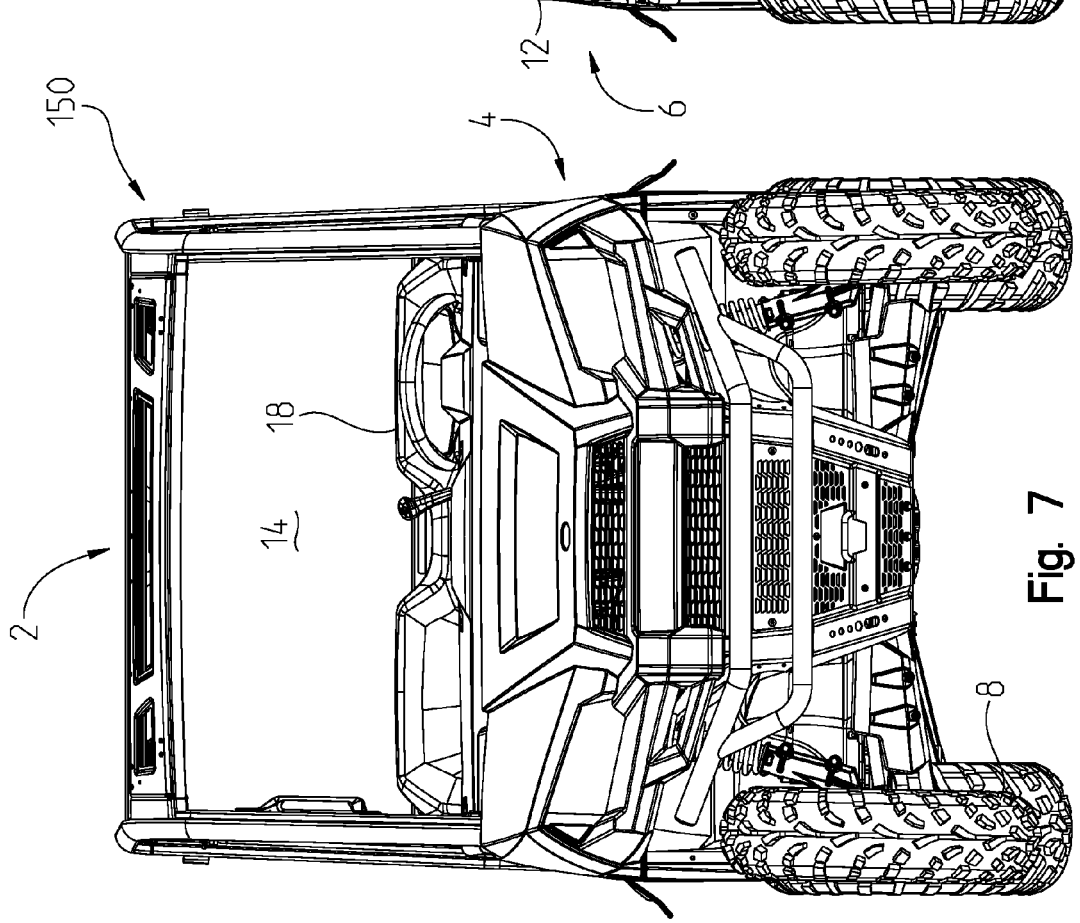
FIG. 8 is a rear view of the vehicle of FIG. 1.

At least front upstanding members 152, rear upstanding members 154, longitudinal members 156, front cross-member 158, and rear upper cross-member 160 may be profiled such that the cross-sections thereof generally define a figure-8 or hourglass configuration, as detailed further in U.S. patent application Ser. No. 13/492,589, filed on Jun. 8, 2012, the complete disclosure of which is incorporated by reference herein.

As shown in FIG. 12, the upper end of rear upstanding members 154 is coupled to rear cross-member 160 and/or longitudinal members 156. The lower end of rear upstanding members 154 is coupled to rear cross-member 124 of frame assembly 20 through brackets 132. As shown best in FIG. 13, the lower ends of rear upstanding members 154 include couplers 144. Couplers 144 may be cast components or, alternatively, may be formed through other processes. Couplers 144 are configured to be received between tabs 134 of brackets 132 such that openings within couplers 144 align with the corresponding openings in tabs 134. Fasteners 136 extend though the openings in tabs 134 and couplers 144 in order to couple with fasteners 138 to secure rear upstanding members 154 to rear cross-member 124, which may be detailed further in U.S. patent application Ser. No. 13/492,589, filed on Jun. 8, 2012, the complete disclosure of which is incorporated by reference herein. Rear upstanding members 154 also may include retention bars 155 (FIG. 1), which support the operator and the passenger within operator area 14. Retention bars 155 may be welded to rear upstanding members 154.

Referring to FIG. 12, the upper end of front upstanding members 152 is coupled to front cross-member 158 and/or longitudinal members 156. As shown in FIG. 14, the lower end of front upstanding members 152 is coupled to braces 116 of frame assembly 20. The lower ends of front upstanding members 152 include couplers 146, which may be formed through casting or other processing techniques. Couplers 146 include openings which align with corresponding openings in braces 116. Fasteners 140 extend through the openings in couplers 146 and braces 116 and couple with fasteners 142 to secure front upstanding members 152 to braces 116 of frame assembly 20, which may be detailed further in U.S. patent application Ser. No. 13/492,589, filed on Jun. 8, 2012, the complete disclosure of which is incorporated by reference herein.

Figure 16:
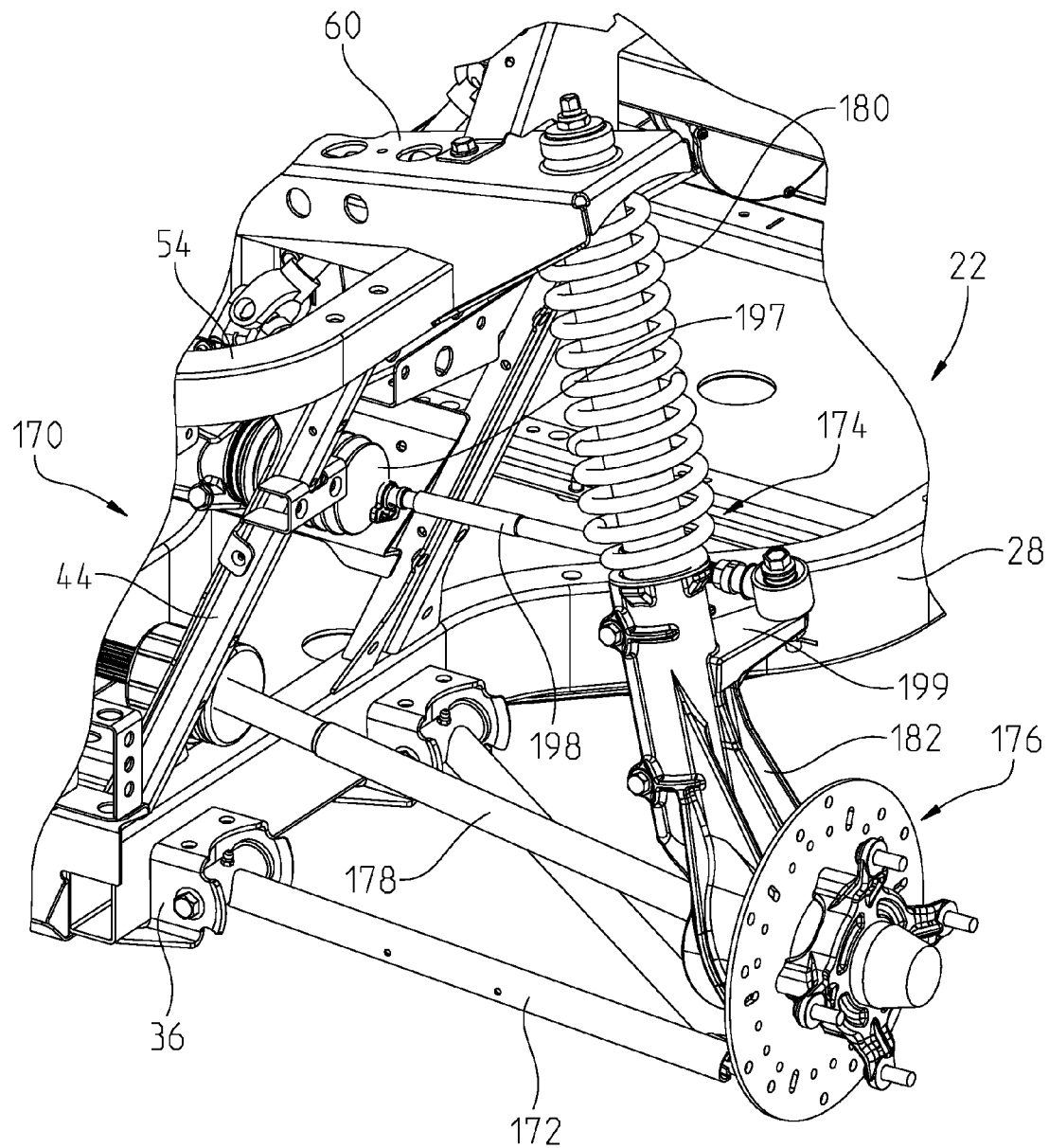
FIG. 16 is a left front perspective view of the front suspension assembly of FIG. 15.
Figure 17:
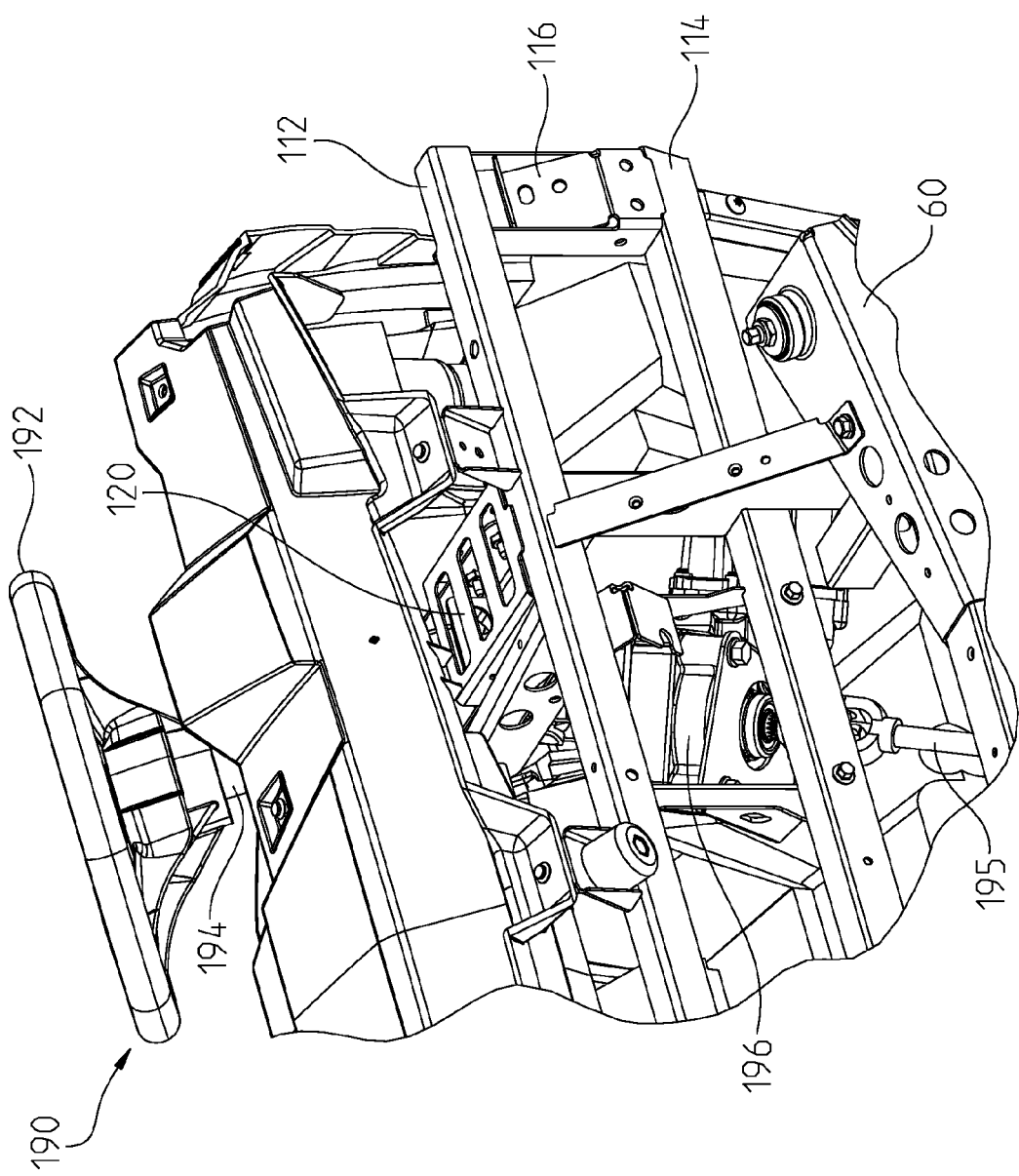
FIG. 17 is a right front perspective view of a steering assembly of the vehicle of FIG. 1.
Figure 18:
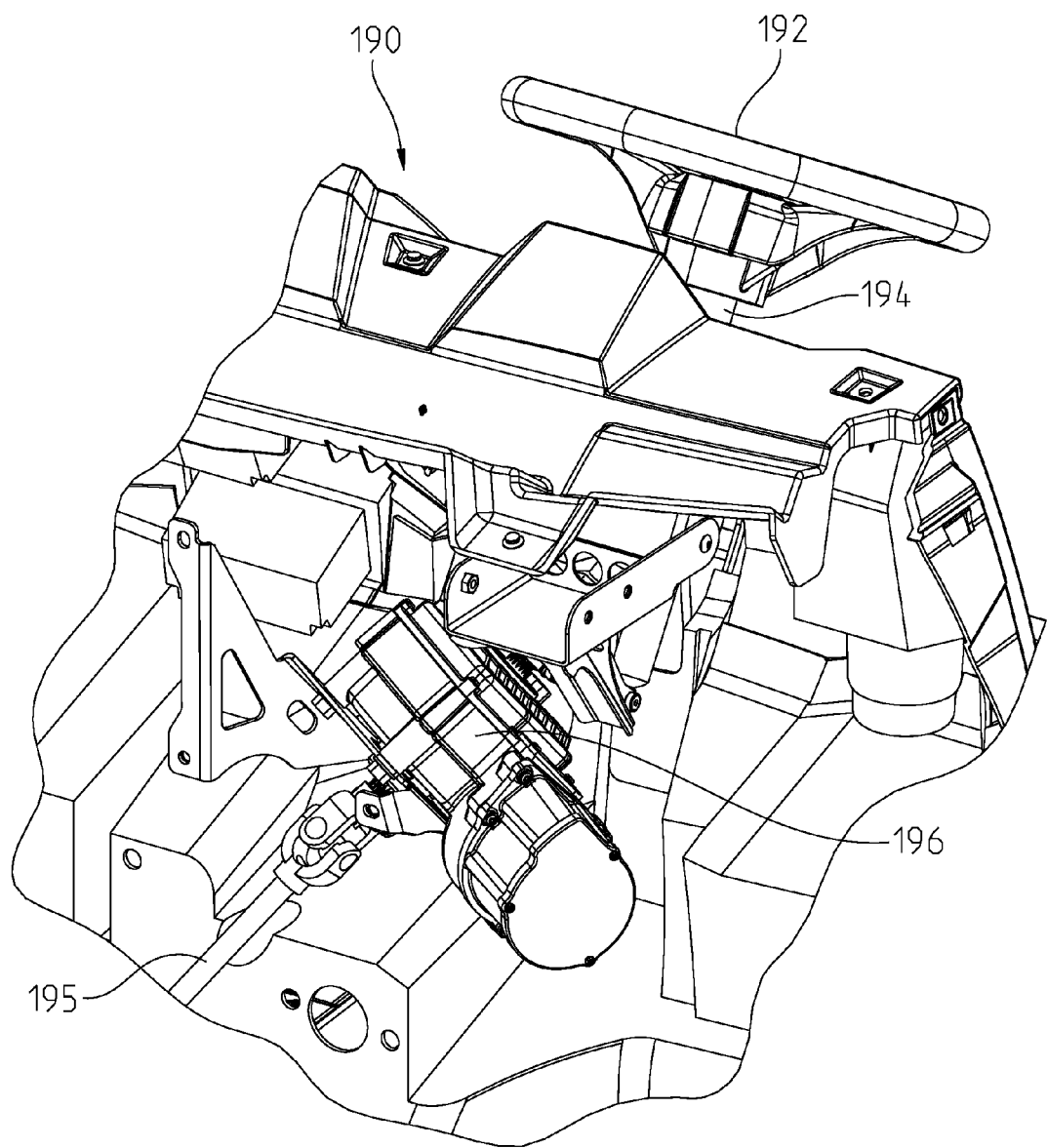
FIG. 18 is a left front perspective view of the steering assembly of FIG. 17.

As shown in FIGS. 15 and 16, front suspension assembly 170 is supported on front frame portion 22. Front suspension assembly 170 is configured as a strut-type suspension and includes alignment arms 172 and struts 174. In one embodiment, front suspension assembly 170 may be configured for approximately 8 inches of suspension travel. An inner end of alignment arms 172 is coupled to alignment arm brackets 36 on lower longitudinally-extending members 28. An outer end of alignment arms 172 is coupled to a hub assembly 176 of front wheels 8. Half shafts 178 are positioned above alignment arms 172 and also are coupled to hub assemblies 176. The inner ends of half shafts 178 are coupled to front final drive unit 256 (FIG. 1).

Referring to FIG. 16, struts 174 include an upper portion defined by a coil-over shock absorber 180 and a lower or hub portion 182. The upper end of shock absorber 180 is coupled to cross-member 60 of front frame portion 22 and the lower end is coupled to hub portion 182. Hub portion 182 is coupled to hub assemblies 176 of front wheels 8, half shafts 178, and steering arms 198 of a power steering assembly 190, and are rotatable relative to shock absorber 180, in order to assist in turning front wheels 8.

By including struts 174, rather than shock absorbers, front suspension assembly 170 does not include upper alignment arms. Rather, struts 174 are coupled directly to steering arms 198 to assist in turning front wheels 8. Additionally, unlike shock absorbers, which are linear force elements (i.e., are only configured for linear movement), struts 174 are configured for both linear and pivotal movement. As such, struts 174 are configured to dampen linear forces on utility vehicle 2 and also support lateral loads.

Referring to FIGS. 15-18, power steering assembly 190 is operably coupled to hub portion 182. Power steering assembly 190 includes a steering wheel 192, a steering column 194, a power steering unit 196, a steering shaft 195, a steering rack 197, and steering arms 198. Steering wheel 192 and steering column 194 are coupled to steering support member 120 on upper cross-member 112 of frame assembly 20. Power steering unit 196 is positioned below steering column 194 and is operably coupled thereto. Power steering unit 196 also is operably coupled to steering rack 197 through steering shaft 195. Steering rack 197 is operably coupled to steering arms 198, which extend laterally outward therefrom to couple with hub portions 182 at link arms 199 (FIG. 16).

Figure 19:
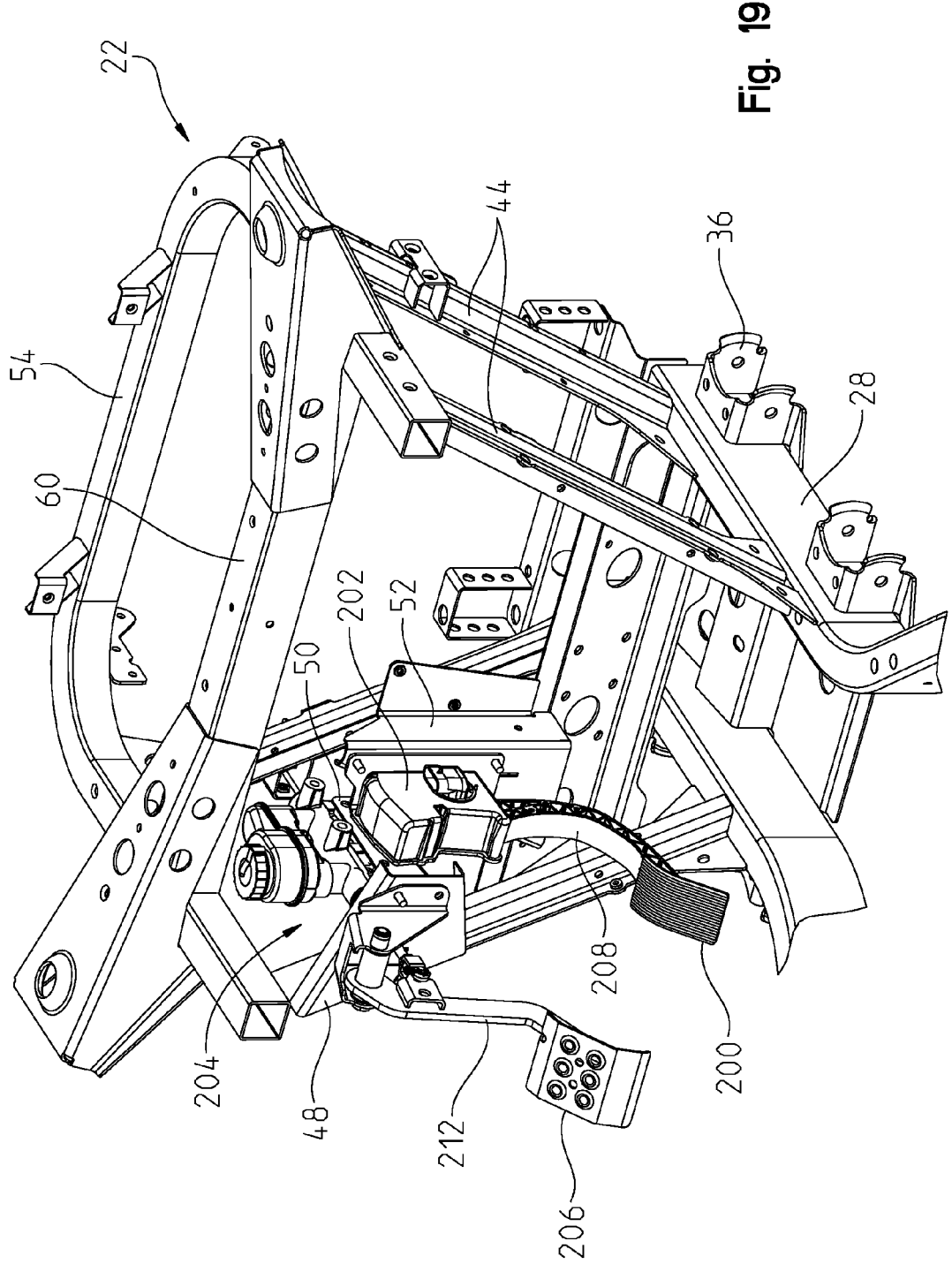
FIG. 19 is a right rear perspective view of operator pedals of the present vehicle.
Figure 20:
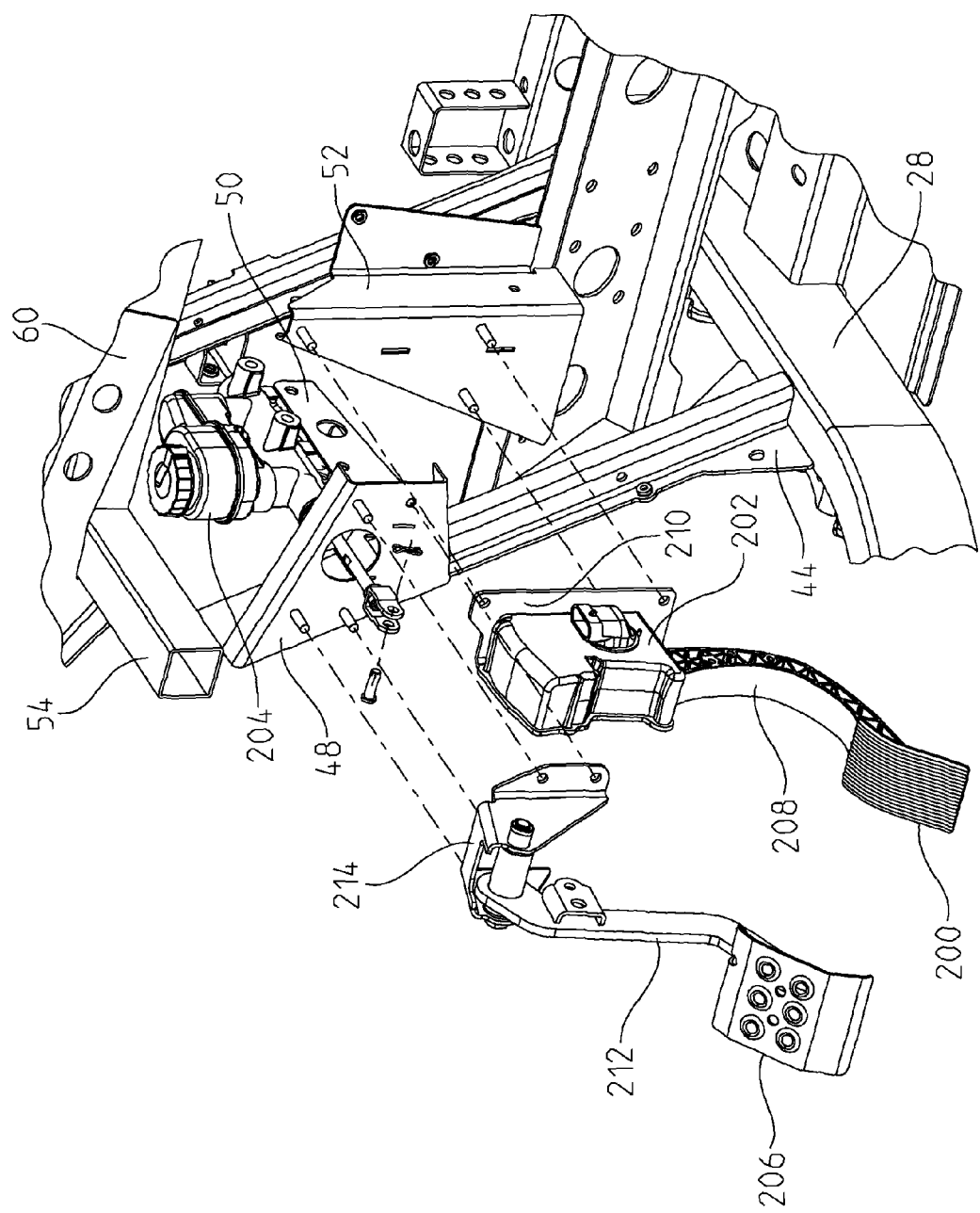
FIG. 20 is an exploded view of the operator pedals of FIG. 19.

Referring to FIGS. 19 and 20, in addition to power steering assembly 190, the operator uses operator pedals when driving utility vehicle 2. A throttle pedal 200 may be operably coupled to an electronic throttle control ("ETC") assembly 202 by way of an arm 208. ETC assembly 202 is supported on a plate 210, which is coupled to throttle pedal support member 52 of frame assembly 20 with conventional fasteners. Plate 210 may be a weldment and allows throttle pedal 200 and ETC assembly 202 to be included on utility vehicle 2 after utility vehicle 2 has been assembled, rather than during the assembly process.

The operator pedals also include a brake pedal 206 positioned adjacent throttle pedal 200 and operably coupled to a master cylinder assembly 204. Brake pedal 206 is operably coupled to master cylinder assembly 204 by way of an arm 212. Arm 212 includes a bracket 214, which couples with brake pedal support member 48 with conventional fasteners. Bracket 214 may be a weldment and may allow brake pedal 206 to be included on utility vehicle 2 after utility vehicle 2 has been assembled, rather than during the assembly process. Master cylinder assembly 204 is supported on bracket 50 of frame assembly 20.

Figure 21:
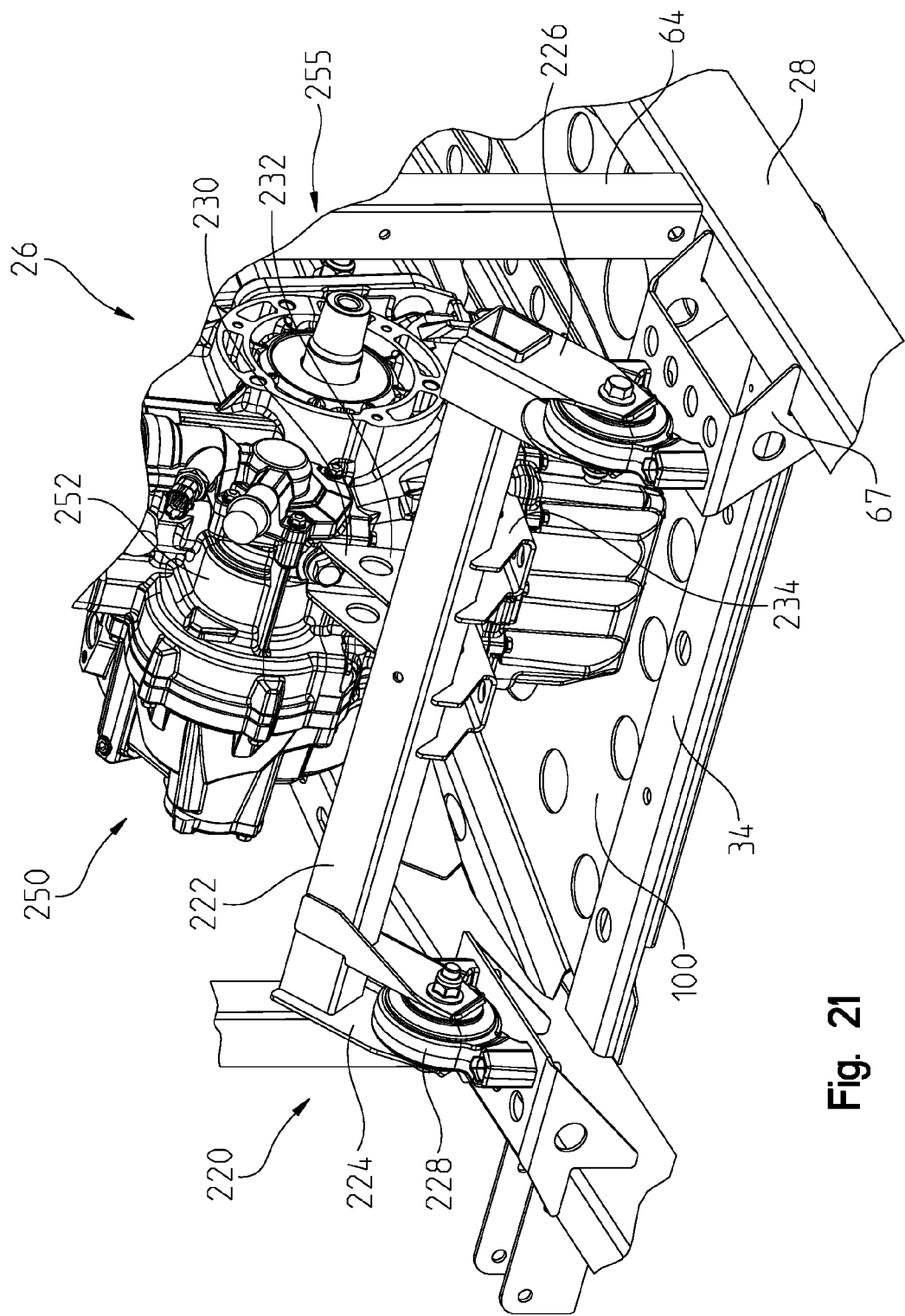
FIG. 21 is a left front perspective view of an engine mount of the present vehicle.
Figure 22:
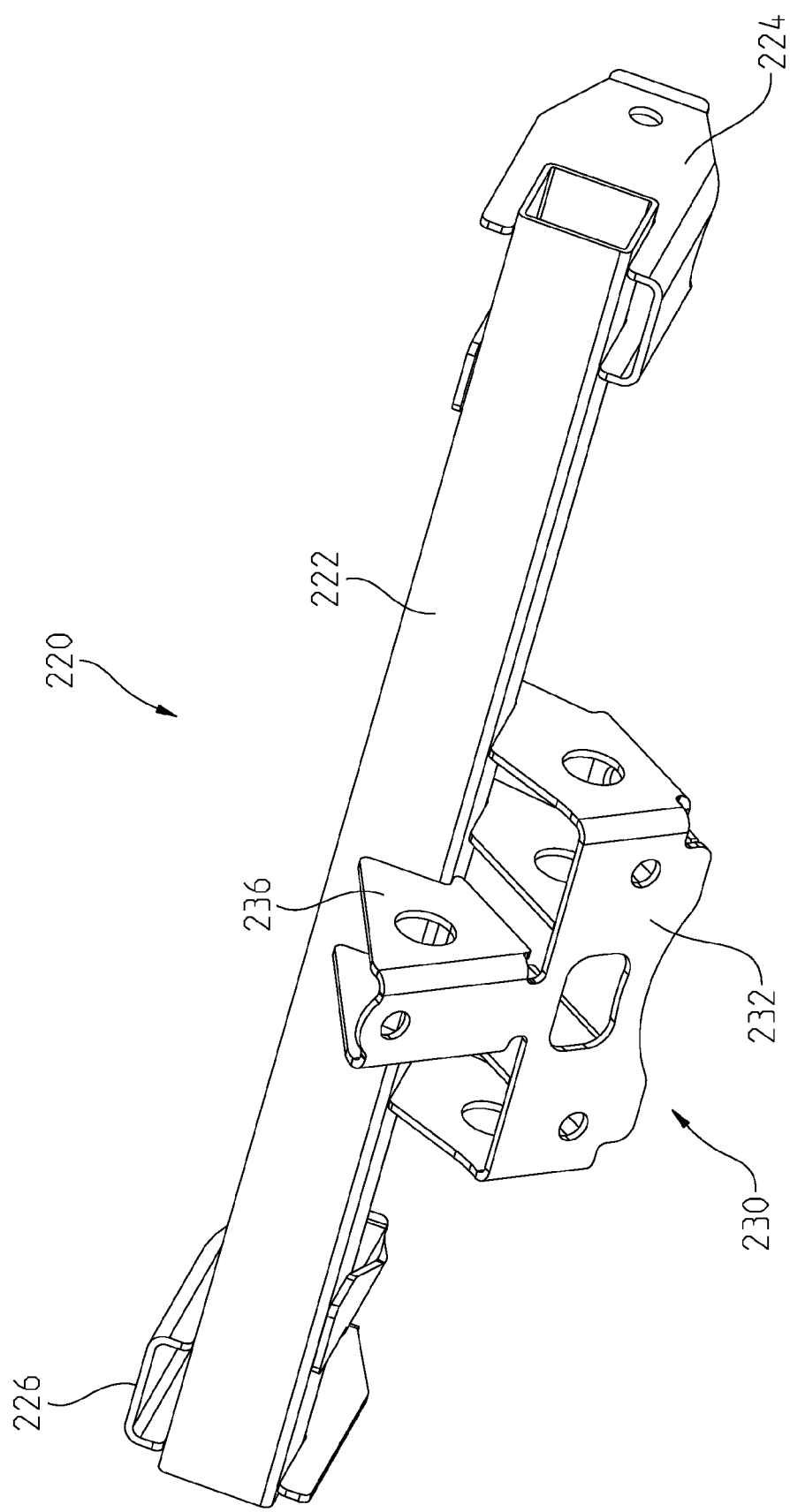
FIG. 22 is a right rear perspective view of the engine mount of FIG. 21.

Referring now to FIGS. 21 and 22, rear frame portion 26 includes an engine mount assembly 220 for supporting and stabilizing at least an engine 252 of powertrain assembly 250. As shown, engine mount assembly 220 includes a cross-bar 222, a first bracket 224, a second bracket 226, support members 228, and a support body 230. Cross-bar 222 is positioned generally above cross-member 34 of frame assembly 20 and is generally forward of upstanding members 64. In this way, engine mount assembly 220 is positioned generally forward of engine 252.

Cross-bar 222 extends between first and second brackets 224, 226 and is coupled thereto. Illustratively, first bracket 224 is positioned on the passenger side of utility vehicle 2 and second bracket 226 is positioned on the operator side of utility vehicle 2. As shown in FIGS. 21 and 22, first bracket 224 is open at a top surface of cross-bar 222, however, second bracket 226 is closed at, and generally surrounds, the top surface of cross-bar 222. First and second brackets 224, 226 are coupled to support members 228, which, illustratively, are circular members coupled to brackets 67 of frame assembly 20.

Support body 230 couples engine 252 to cross-bar 222. More particularly, and as shown in FIG. 22, support body 230 includes a body member 232, lower fingers 234, and upper fingers 236. Illustratively, fingers 234 and 236 may be integrally formed with body member 232; however, in alternative embodiments of engine mount assembly 220, fingers 234 and 236 may be formed separately from body member 232 and coupled thereto with conventional fasteners. Body member 232 is coupled to engine 252. Lower fingers 234 extend forwardly from body member 232 and extend generally around a bottom surface of cross-bar 222 and angle upwardly to retain cross-bar 222. Upper fingers 236 extend at least partially over a top surface of cross-bar 222 to further retain cross-bar 222 between lower fingers 234 and upper fingers 236.

Figure 2:
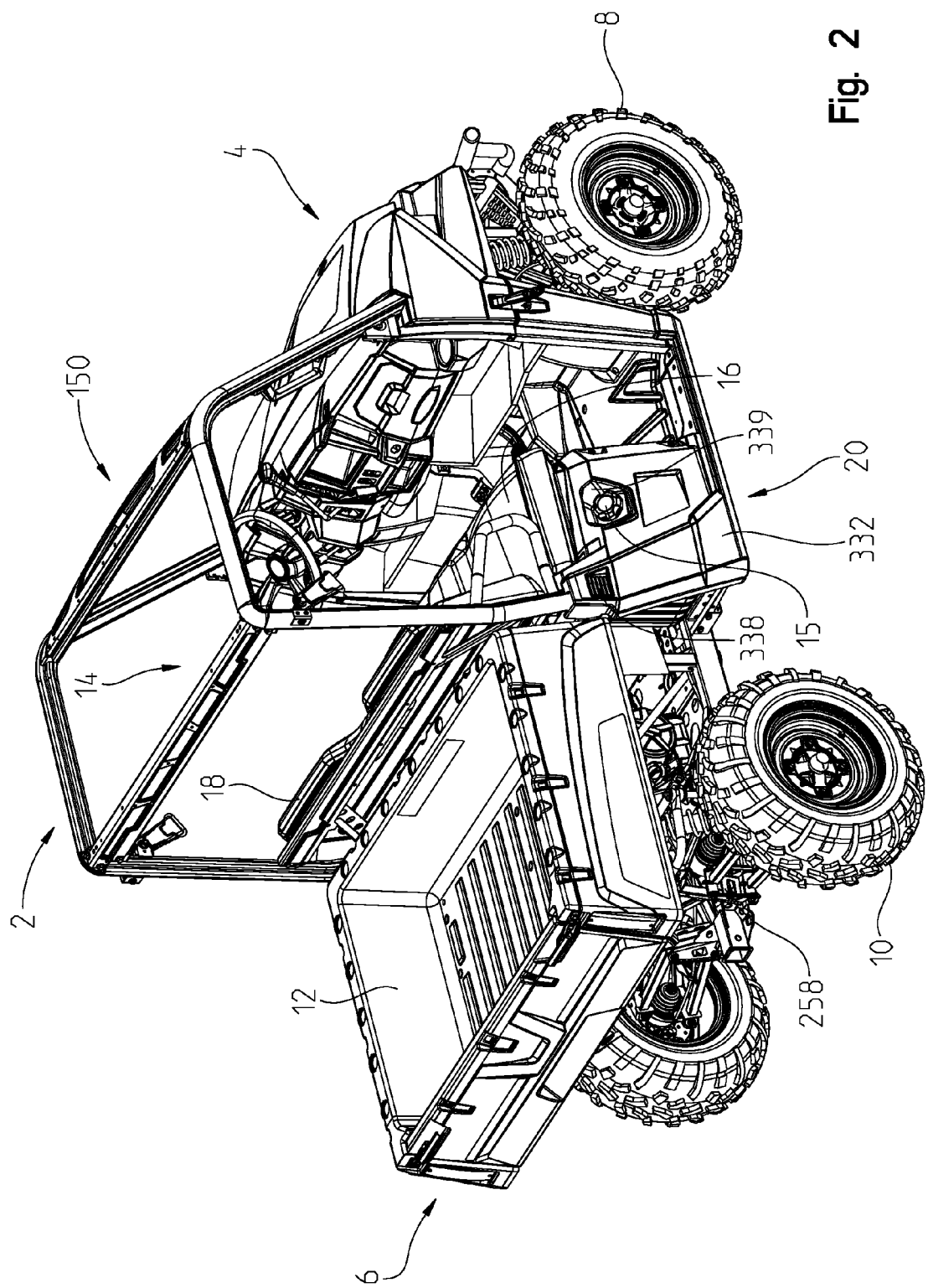
FIG. 2 is a right rear perspective view of the vehicle of FIG. 1.
Figure 3:
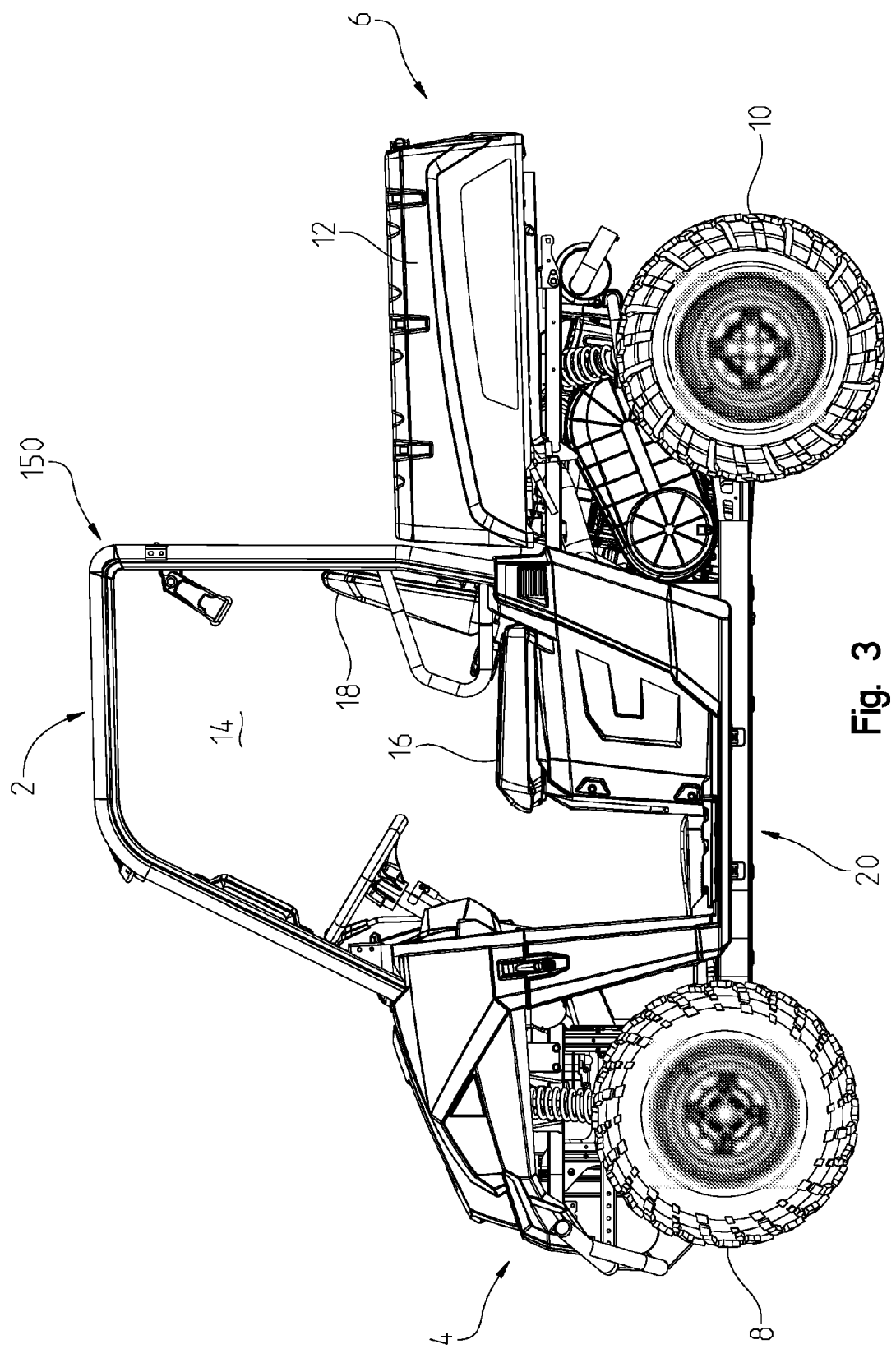
FIG. 3 is a left side view of the vehicle of FIG. 1.
Figure 23:
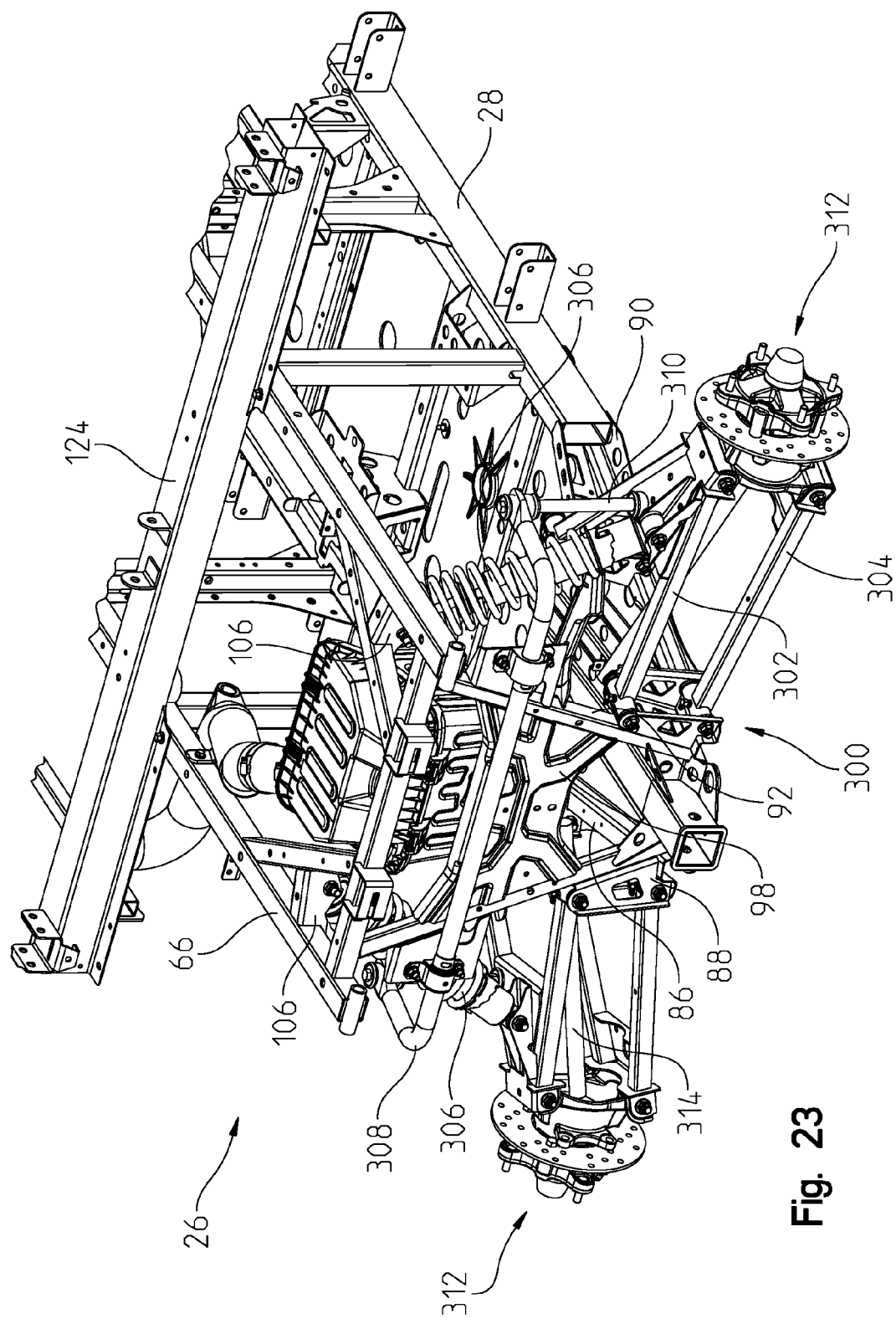
FIG. 23 is a right rear perspective view of a rear suspension assembly of the vehicle of FIG. 1.

As shown in FIG. 23, rear suspension assembly 300 is positioned generally rearward of powertrain assembly 250 at rear end 6 of utility vehicle 2. Rear suspension assembly 300 may be configured as a dual alignment arm-type suspension assembly and includes upper alignment arms 302, lower alignment arms 304, shock absorbers 306, a torsion bar 308, and arms 310. In one embodiment, rear suspension assembly 300 may be configured for approximately 9 inches of suspension travel. An inner end of upper and lower alignment arms 302, 304 are coupled to alignment arms brackets 88 of rear frame portion 26, and an outer end of upper and lower alignment arms 302, 304 are coupled to hub assemblies 312 of rear wheels 10. Half shafts 314 generally extend between upper and lower alignment arms 302, 304 and are coupled to hub assemblies 312 and a rear final drive unit 258 (FIG. 2). Illustratively, upper and lower alignment arms 302, 304 and/or half shafts 314 may be angled rearwardly relative to longitudinal axis L of utility vehicle 2, such that upper and lower alignment arms 302, 304 and/or half shafts 314 are in a "swept back" configuration.

A lower end of shock absorber 306 is coupled to upper alignment arm 302, and an upper end of shock absorber 306 is coupled to braces 106 on upper longitudinally-extending members 66. By coupling the upper ends of shock absorbers 306 to braces 106, additional space is provided for an air box 262 of an air intake assembly 260, as detailed further herein. For example, air box 262 may be centrally positioned generally along the longitudinal axis L between shock absorbers 306, rather than laterally off-set from the longitudinal axis L.

A lower end of arms 310 also are coupled to upper alignment arms 302 and/or the lower ends of shock absorbers 306. The upper end of arms 310 are coupled to torsion bar 308, which extends generally around plate 98 and upstanding members 92 of rear frame portion 26. Illustratively, torsion bar 308 is generally U-shaped.

Figure 24:
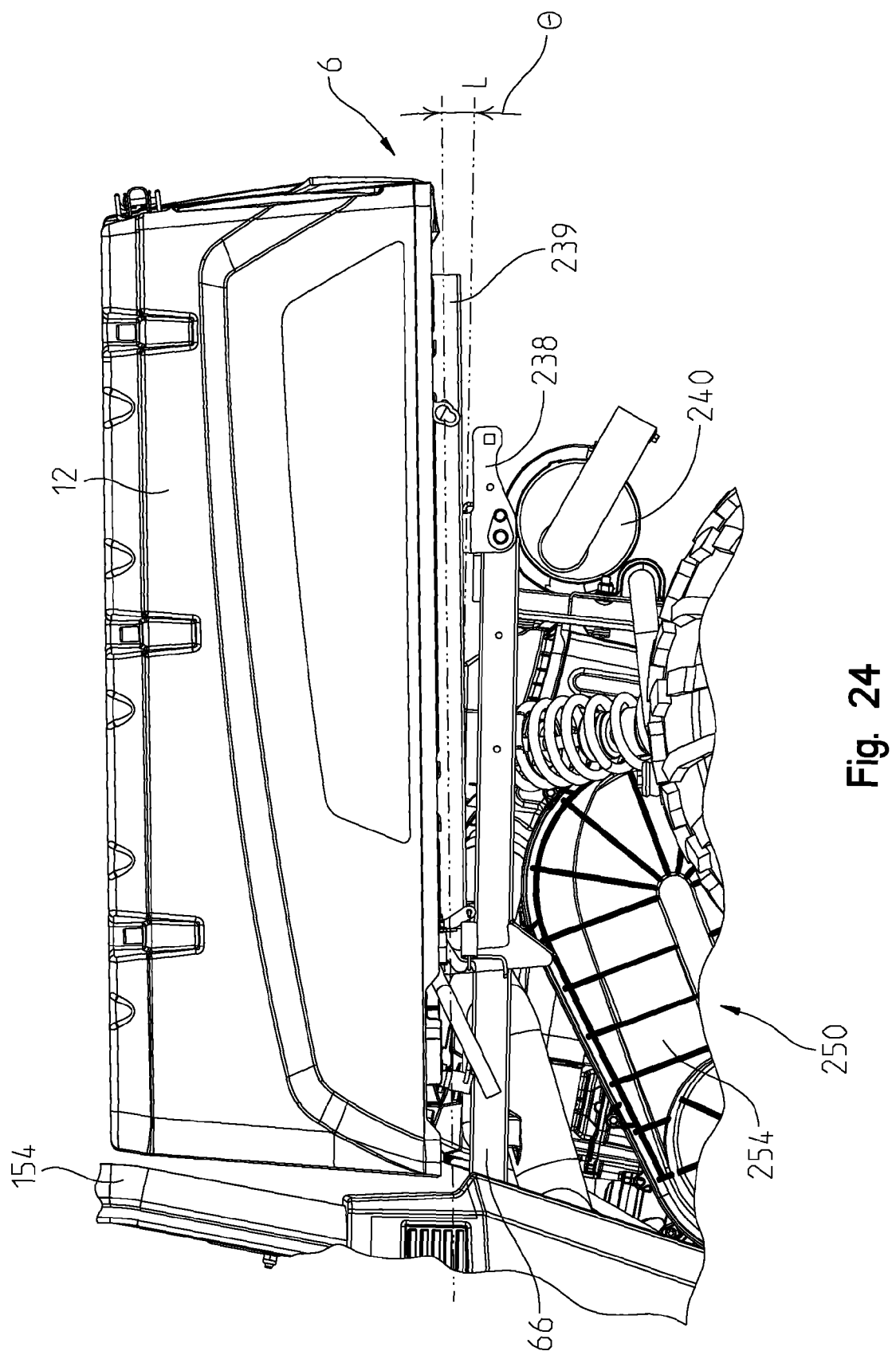
FIG. 24 is a left side view of a cargo box of the vehicle of FIG. 1.

Referring now to FIG. 24, rear end 6 of utility vehicle 2 also supports cargo box 12. In one embodiment, cargo box 12 may be configured to support a payload of approximately 500 lbs. Cargo box 12 includes a support frame 239, which is coupled to upper longitudinally-extending members 66 of frame assembly 20. Illustratively, the forward end of cargo box 12 and support frame 239 may be lower than the rearward ends thereof, such that cargo box 12 and support frame 239 are angled downwardly and forwardly. For example, the rearward end of cargo box 12 may be raised approximately 10 mm relative to the forward end thereof. As such, cargo box 12 may have a rake angle θ of approximately 1.0-2.0 degrees and, more particularly, the rake angle θ may be approximately 1.7 degrees relative to the longitudinal axis L of utility vehicle 2. The downward angle of the forward end of cargo box 12 may decrease or eliminate sag in cargo box 12 along the longitudinal axis L.

During operation of utility vehicle 2, cargo box 12 may pivot or move slightly. In order to prevent cargo box 12 from contacting exhaust assembly 240 during such movement, stop members 238 are coupled to the rearward ends of upper longitudinally-extending members 66. Stop members 238 are positioned generally above exhaust assembly 240 and also are positioned and configured to contact support frame 239 of cargo box 12 if cargo box 12 moves or pivots. Additionally, cargo box 12 may contact cross-member 93 of rear frame portion 26 if cargo box 12 moves or pivots during operation of utility vehicle 2. As such, during operation of utility vehicle 2, if the rearward end of cargo box 12 pivots or otherwise moves in a generally downward direction, support frame 239 of cargo box 12 contacts stop members 238 and/or cross-member 93, rather than exhaust assembly 240.

Figure 25:
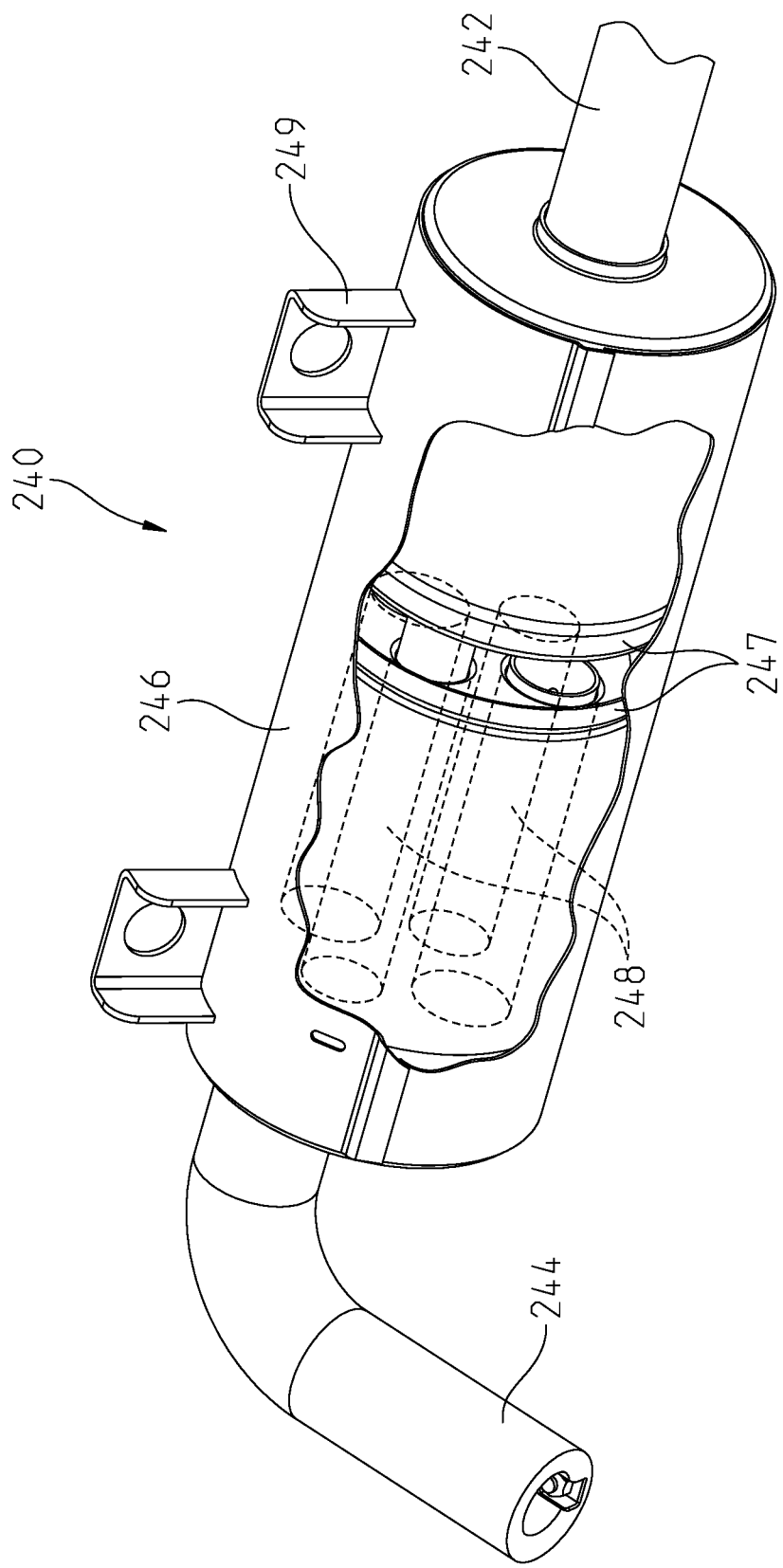
FIG. 25 is a right rear perspective view of an exhaust assembly of the vehicle of FIG. 1 with a cut-out portion to show an inner portion of the exhaust assembly.
Figure 26:
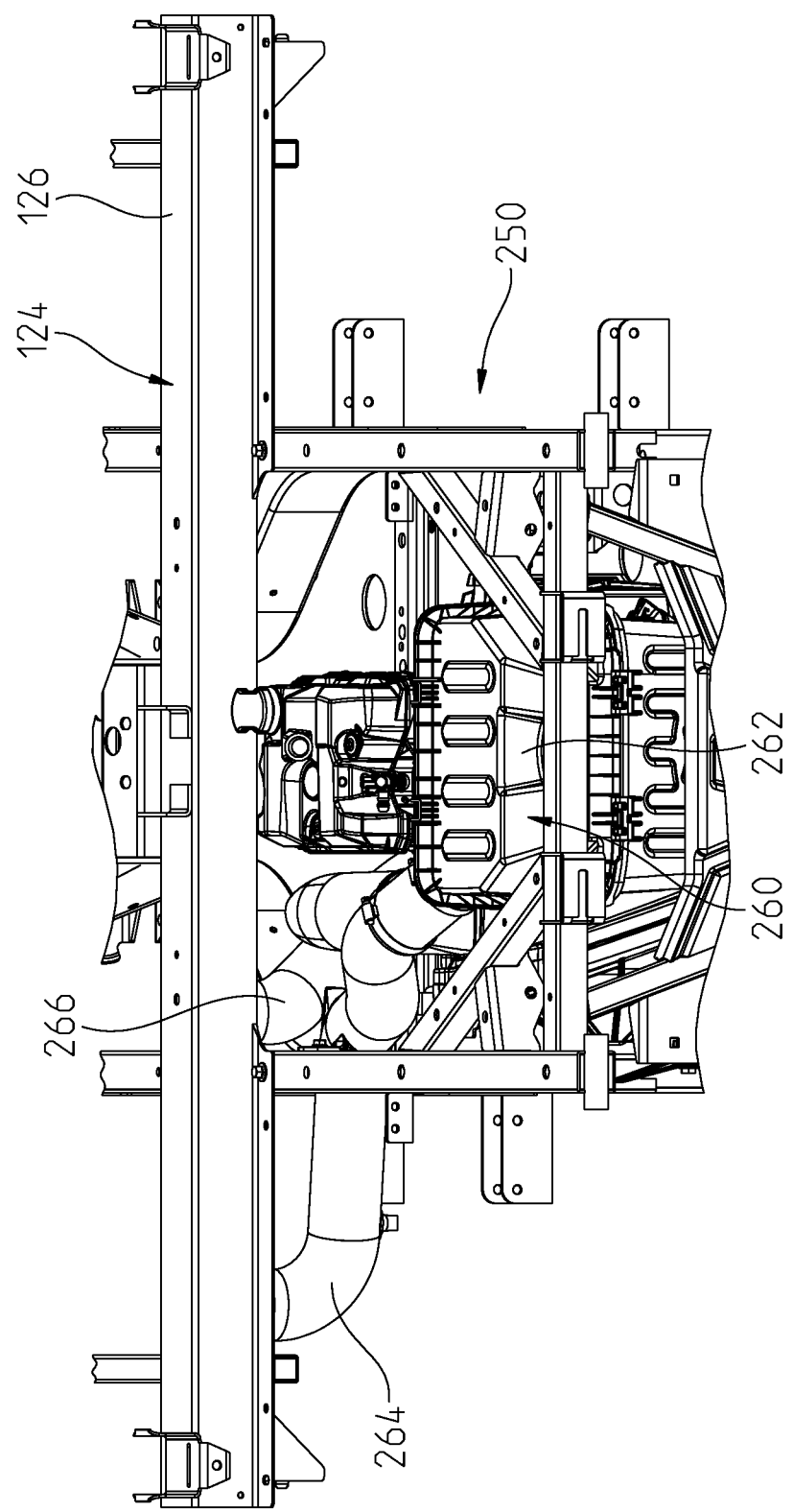
FIG. 26 is a top plan view of a powertrain assembly of the vehicle of FIG. 1.

As shown in FIG. 25, exhaust assembly 240 of powertrain assembly 250 includes an inlet tube or pipe 242, an outlet tube or pipe 244, and an exhaust body 246 therebetween. Exhaust body 246 may include a plurality of baffle plates 247 and internal passages or tubes 248. Exhaust assembly 240 may be an active exhaust assembly such that at least one of baffle plates 247 may be configured to adjust the sound and performance of exhaust assembly 240. Additionally, exhaust assembly 240 may be configured as a "closed loop" assembly and may include an oxygen sensor.

The outer surface of exhaust assembly 240 may be wrapped or otherwise surrounded by an insulation material, for example a fiberglass insulation wrap available from The 3M Company. In assembly, the wrap may be wound around exhaust assembly 240, heated, and then allowed to cool such that the wrap ultimately forms a hard cast-type material around exhaust assembly 240. In one embodiment, at least exhaust body 246 may be perforated such that when the insulation wrap is applied thereto and heated, the insulation may expand and a portion of the insulation will penetrate the perforations and generally extend into the interior of exhaust body 246. Alternative embodiments of insulation material also may be used.

Exhaust assembly 240 may be coupled to frame assembly 20 with tabs 249 on exhaust body 246. Tabs 249 may be integrally formed with exhaust body 246 or may be separate therefrom and coupled thereto with conventional fasteners (e.g., welds, rivets, bolts, adhesive). Additionally, polymeric grommets (not shown) may be used when coupling tabs 249 to frame assembly 20 to decrease the amount of vibrations transferred to exhaust assembly 240. For example, the polymeric grommets may be comprised of a silicone material.

Referring to FIGS. 26-32, rear end 6 of utility vehicle 2 also supports a portion of powertrain assembly 250. Powertrain assembly 250 includes at least engine 252, a variable clutch assembly 254, illustratively a continuously variable transmission ("CVT"), a transmission assembly 255 (FIGS. 4 and 21), front final drive unit 256 (FIG. 1), rear final drive unit 258 (FIG. 2), exhaust assembly 240, and an air intake assembly 260. In one embodiment, powertrain assembly 250 may be configured for approximately 40 hp and a maximum speed of approximately 50 mph.

Figure 27:
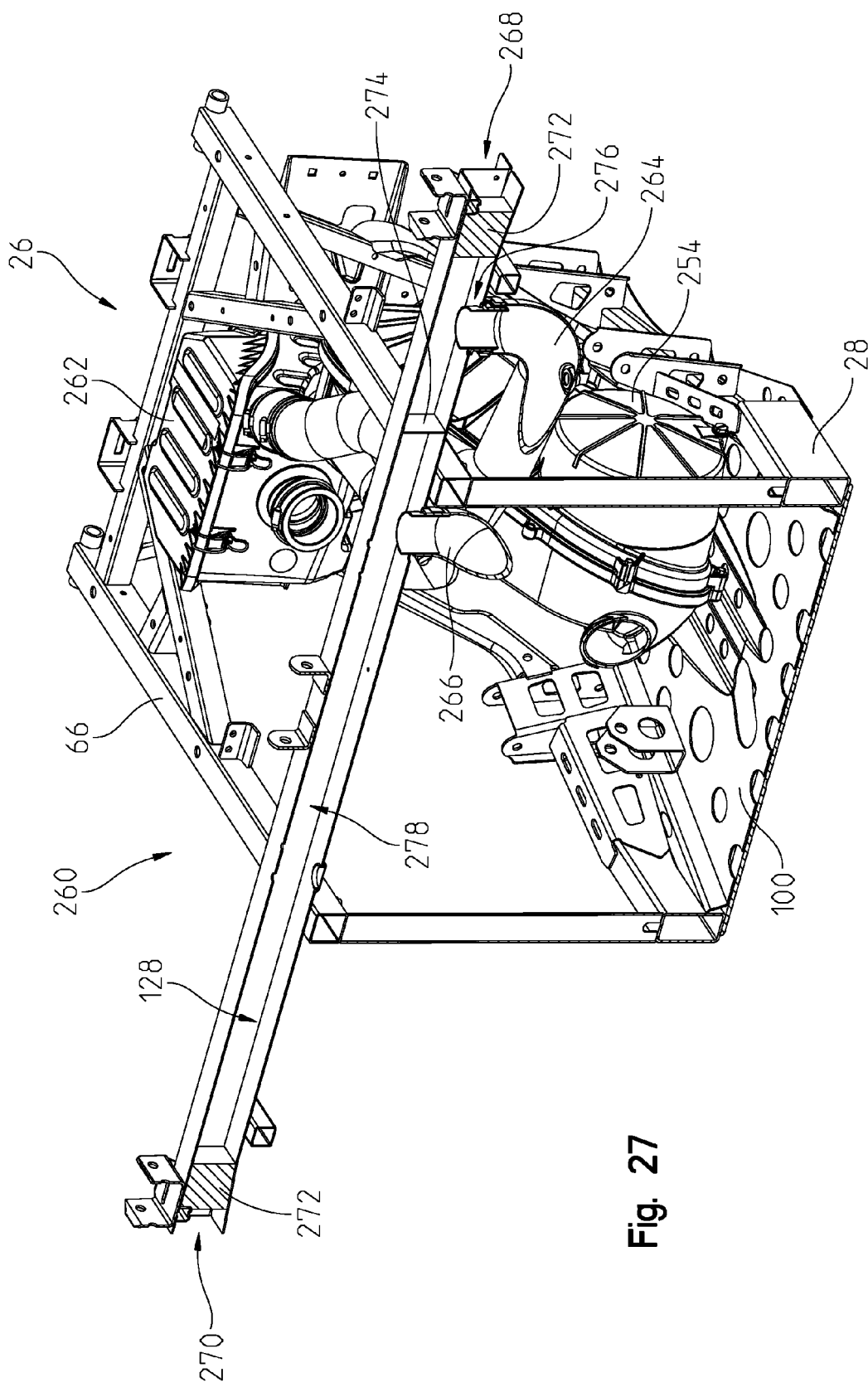
FIG. 27 is a left front perspective view of the powertrain assembly of FIG. 26.
Figure 28:
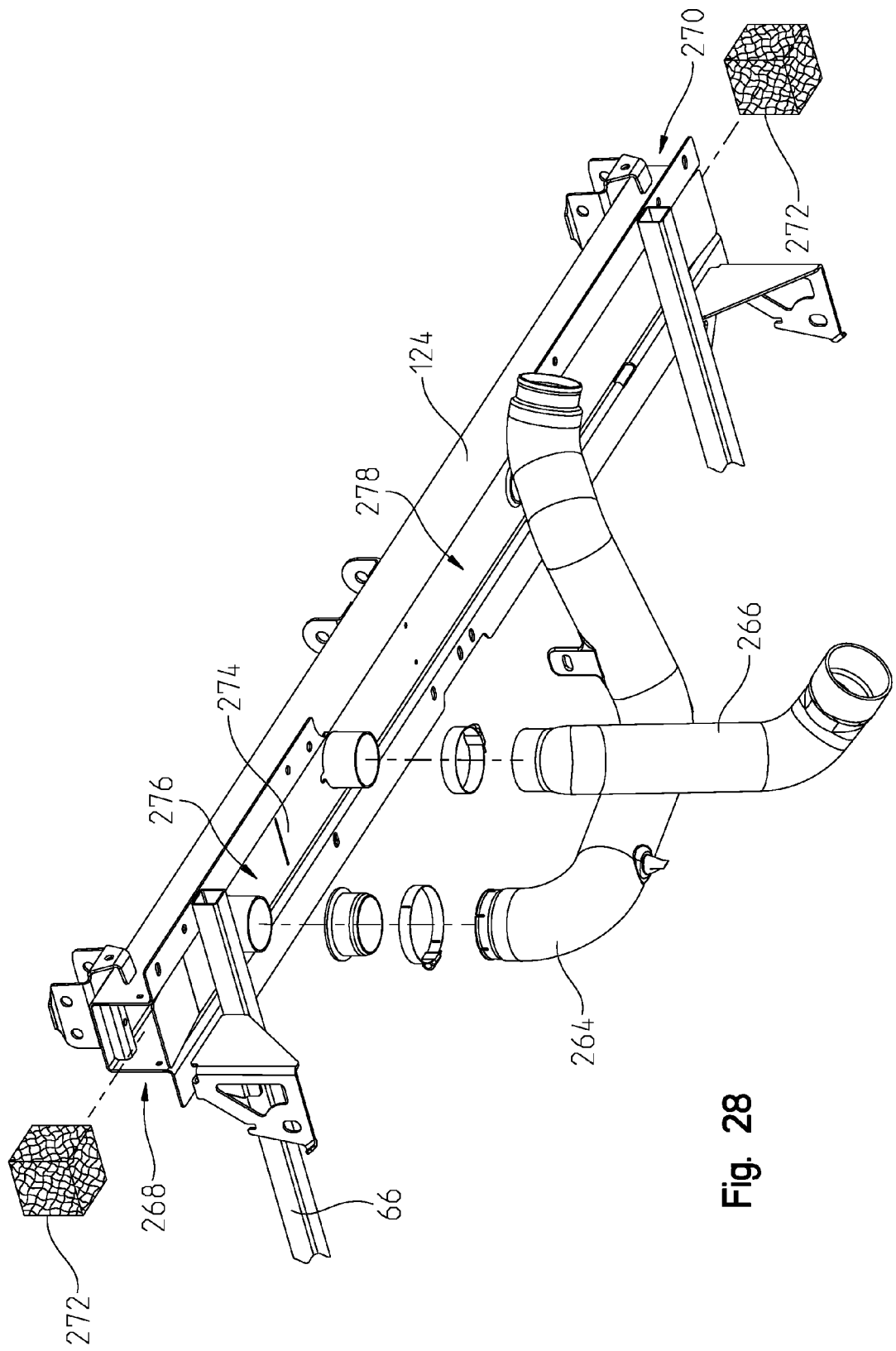
FIG. 28 is a bottom perspective view of a portion of an air intake assembly of the powertrain assembly of FIG. 26.
Figure 29:
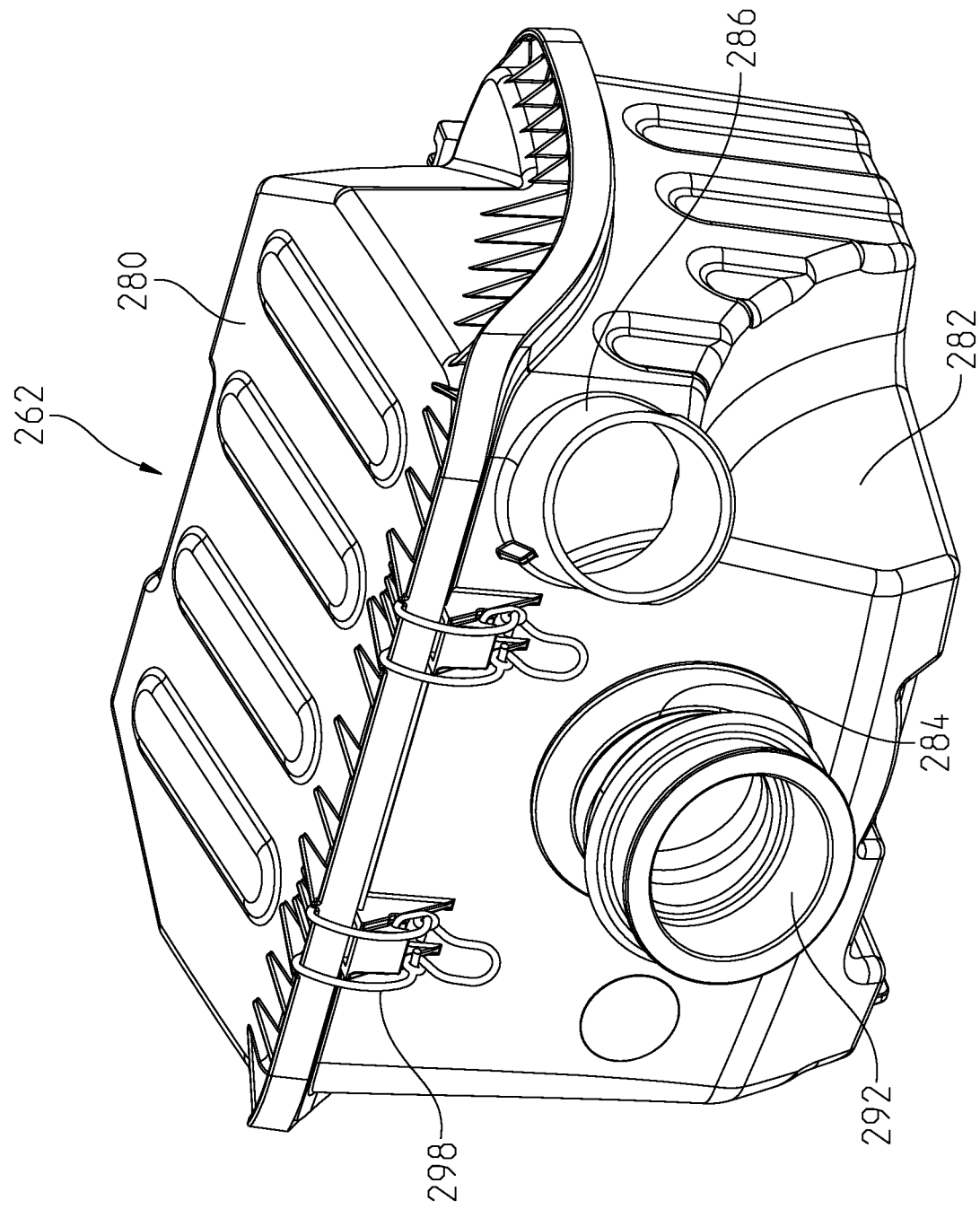
FIG. 29 is a left front perspective view of an air box of the air intake assembly of FIG. 28.
Figure 30:
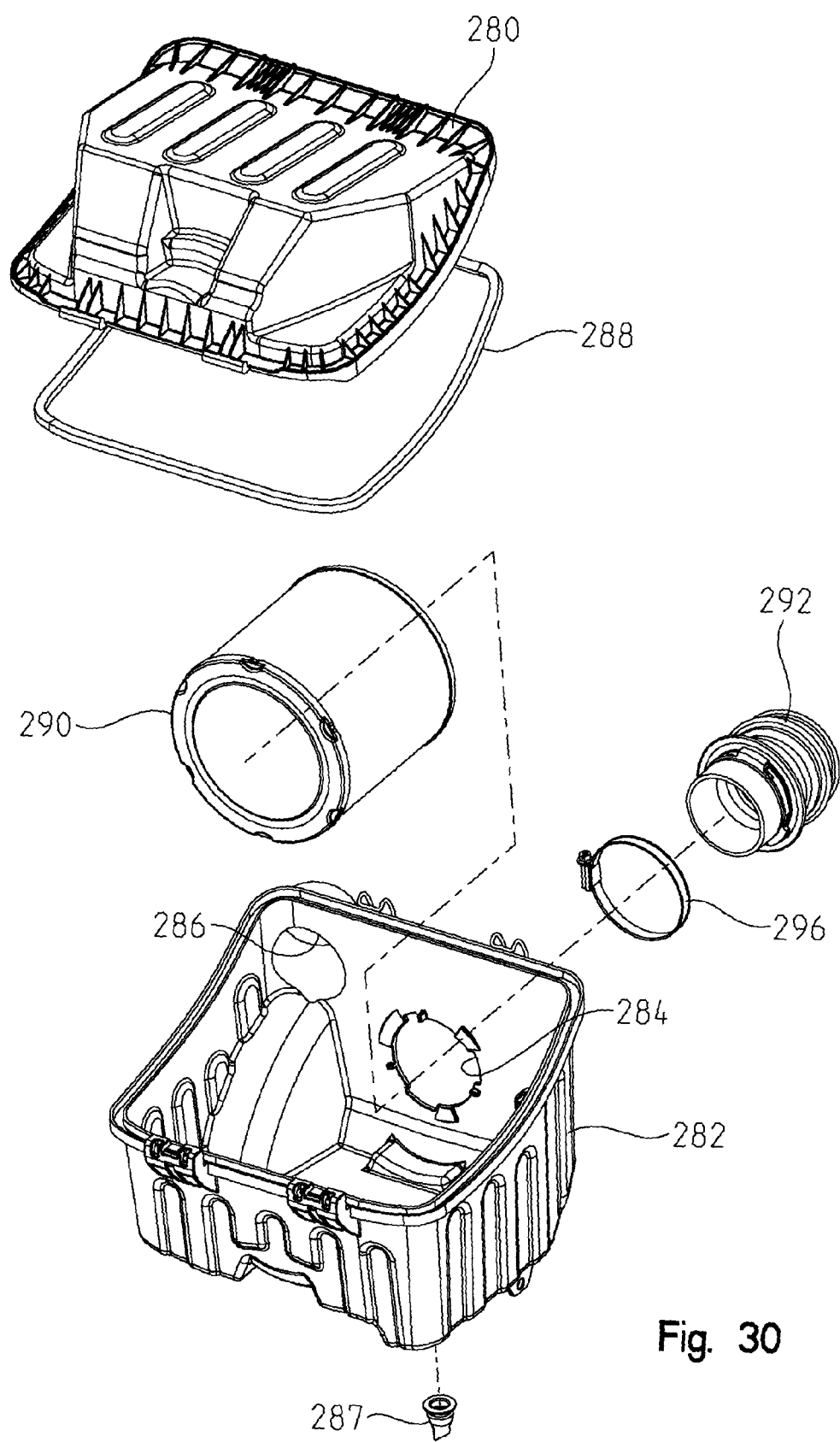
FIG. 30 is an exploded view of the air box of FIG. 29.

Air intake assembly 260 includes air box 262, an engine air intake tube 264, a clutch air intake tube 266, and filters 272. Rear cross-member 124 of frame assembly 20, and more particularly, interior channel 128 of rear cross-member 124, is fluidly coupled to air box 262. More particularly, as shown in FIG. 27, interior channel 128 of rear cross-member 124 includes a partition wall 274, which divides interior channel 128 into a first portion 276 and a second portion 278. First portion 276 includes an engine air intake port 268, and filter 272 may be positioned within intake port 268. Additionally, first portion 276 includes an opening for coupling with engine air intake tube 264. Similarly, second portion 278 includes a clutch air intake port 270, and filter 272 may be positioned within intake port 270. Additionally, second portion includes an opening for coupling with clutch air intake tube 266. In this way, interior channel 128 of rear cross-member 124 is divided into two air channels—one channel for supplying air to engine 252 and one channel for supplying air to variable clutch assembly 254 of powertrain assembly 250. As such, rear cross-member 124 of frame assembly 20 not only provides strength and rigidity to frame assembly 20 but also functions as an inlet for air intake assembly 260.

In operation, ambient air may be received through engine air intake port 268 of rear cross-member 124 and may flow through filter 272 into first portion 276 of interior channel 128. The air in first portion 276 then flows into engine air intake tube 264 and air box 262 in order to "clean" or filter the air before flowing into engine 252. Similarly, ambient air may be received through clutch air intake port 270 and may flow through filter 272 into second portion 278 of interior channel 128. The air in second portion 278 then flows into clutch air intake tube 266 in order to flow into transmission 254.

Figure 31:
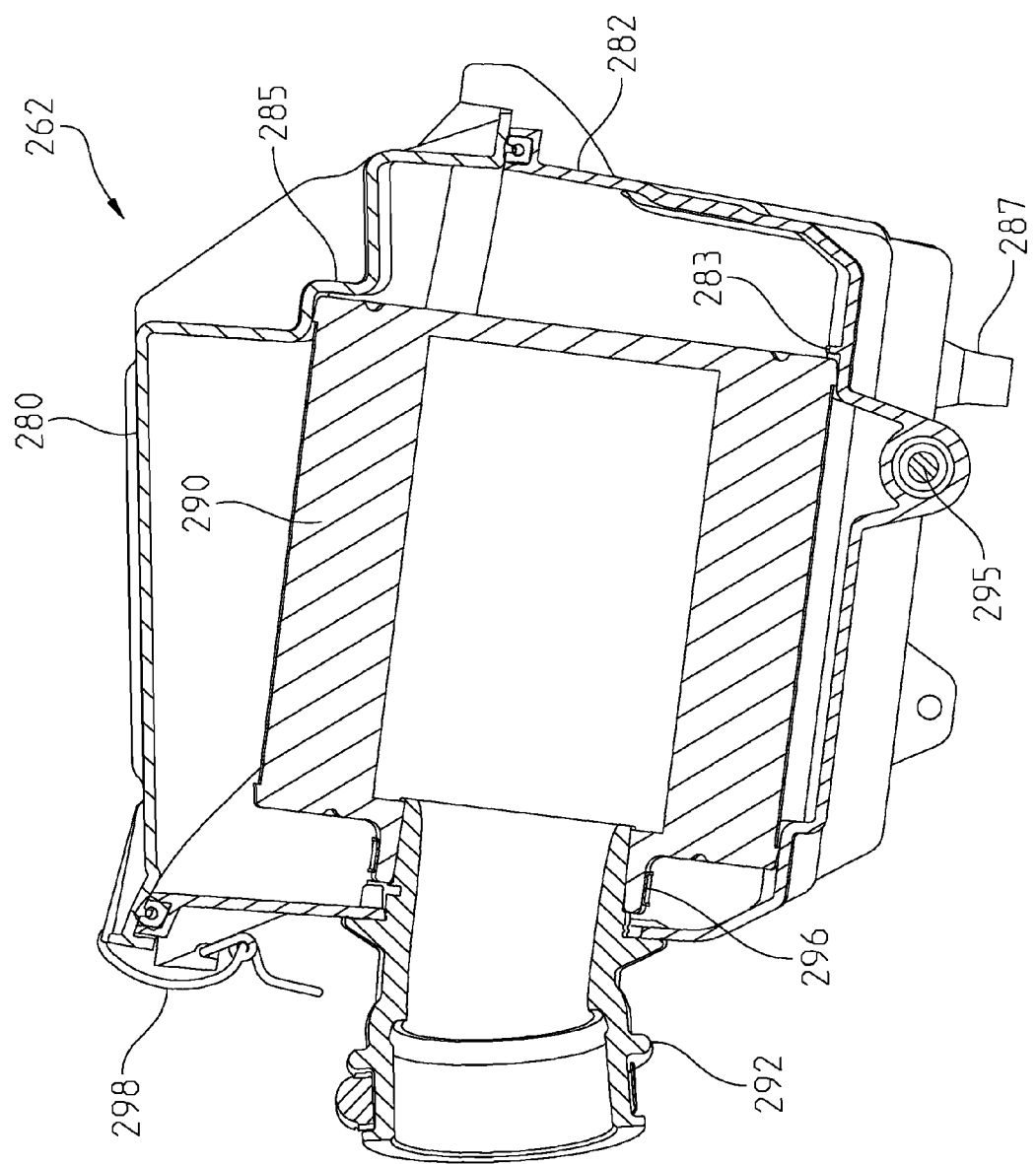
FIG. 31 is a cross-sectional view of the air box of FIG. 29.

Referring to FIGS. 29-32, air box 262 is configured to receive the air from engine air intake tube 264 before the air flows into engine 252. Air box 262 includes a lid 280, a base 282, a throttle body port 284, an intake port 286, a filter 290, a boot 292, latches 298, and a hinge assembly 299. Base 282 may be coupled to engine 252, other components of powertrain assembly 250, and/or frame assembly 20 with mount 295 (FIG. 31). Vibration isolators, for example those comprised of rubber, may be used with mount 295.

Figure 32:
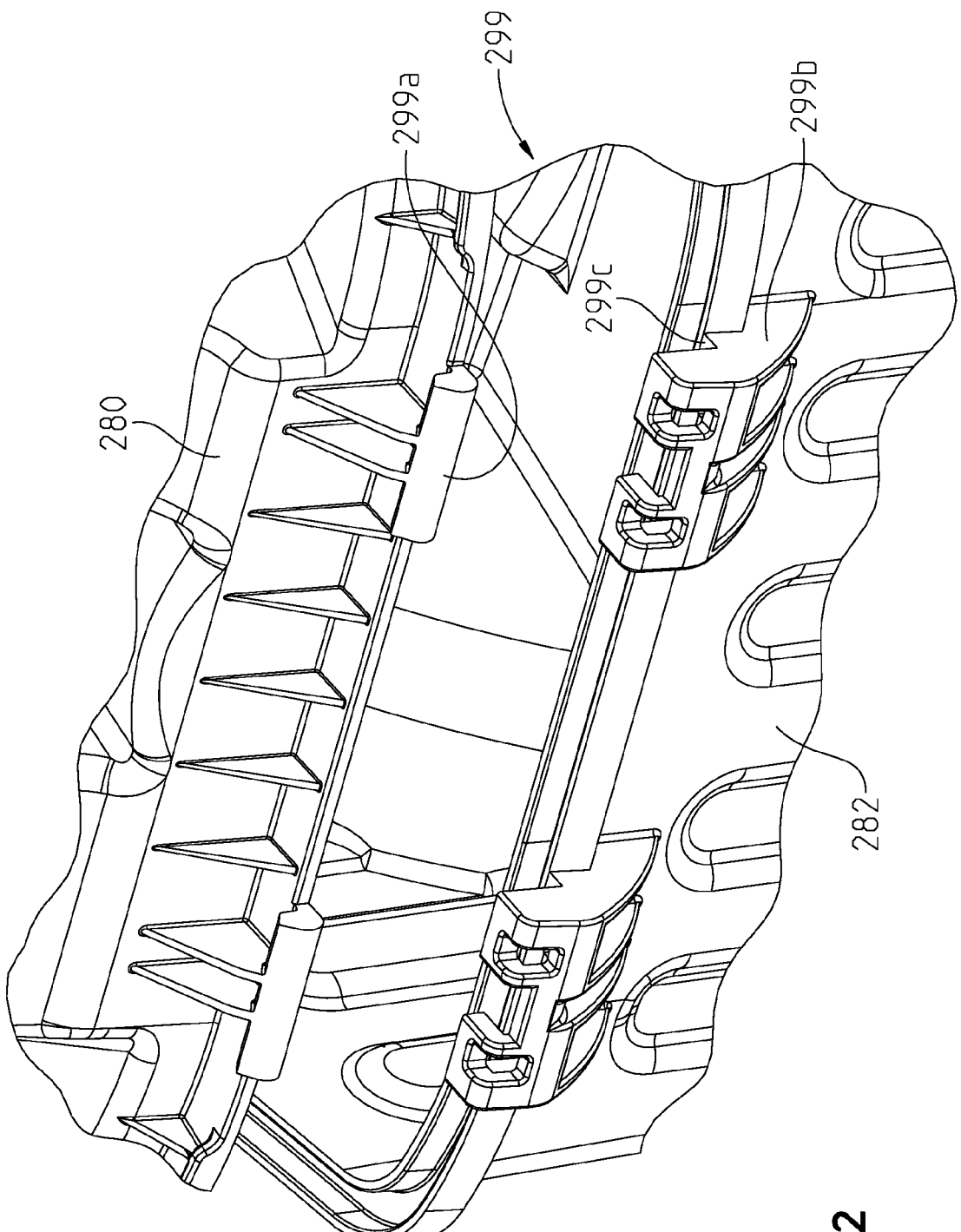
FIG. 32 is a detailed view of a hinge assembly of the air box of FIG. 29.

Lid 280 may be coupled to base 282 with latches 298 and hinge assembly 299. A seal 288 may be positioned at the interface between lid 280 and base 282. As shown in FIG. 32, hinge assembly 299 includes a hinge tab 299a on lid 280 and a hinge base 299b on base 282. Hinge tab 299a is received within a recess 299c of hinge base 299b such that hinge tab 299a may pivot within recess 299c when lid 280 opens and closes. If lid 280 is not properly seated against base 282 with hinge assembly 299, then lid 280 will move relative to base 282 to alert the operator that lid 280 is not sealed against base 282.

Throttle body port 284 and intake port 286 are openings in base 282 and are in fluid communication with filter 290. As shown in FIG. 31, filter 290 is positioned within base 282 and is seated against a tab 283 and a shoulder 285 of base 282. As such, filter 290 is properly positioned within base 282 when filter 290 contacts tab 283 and shoulder 285. Additionally, if filter 290 is not properly positioned within base 282, lid 280 will not seal against base 282 and hinge tab 299a will not properly fit within recess 299c of hinge base 299b. Also, latches 298 may not properly engage against lid 280 when filter 290 is not properly positioned within base 282.

Filter 290 is coupled to throttle body port 284 with boot 292. A clamp or sealing ring 296 is positioned around boot 292 and filter 290. Boot 292 extends outwardly from base 282 through throttle body port 284 in order to couple with the throttle bodies (not shown) of engine 252.

In operation, after air flows through first portion 276 of interior channel 128 and engine air intake tube 264, the air flows through intake port 286 of air box 262 and into filter 290. Filter 290 removes debris and other particulate matter from the air in order to "clean" the air before it flows into engine 252. After the air flows through filter 290, the clean air then flows into boot 292 and through throttle body port 284 in order to flow into engine 252. Base 282 of air box 262 may include a drain 287 to drain any moisture within base 282. However, drain 287 is generally a one-way valve, such that fluids and moisture may drain from base 282 but fluids, dust, and debris do not enter base 282.

Figure 33:
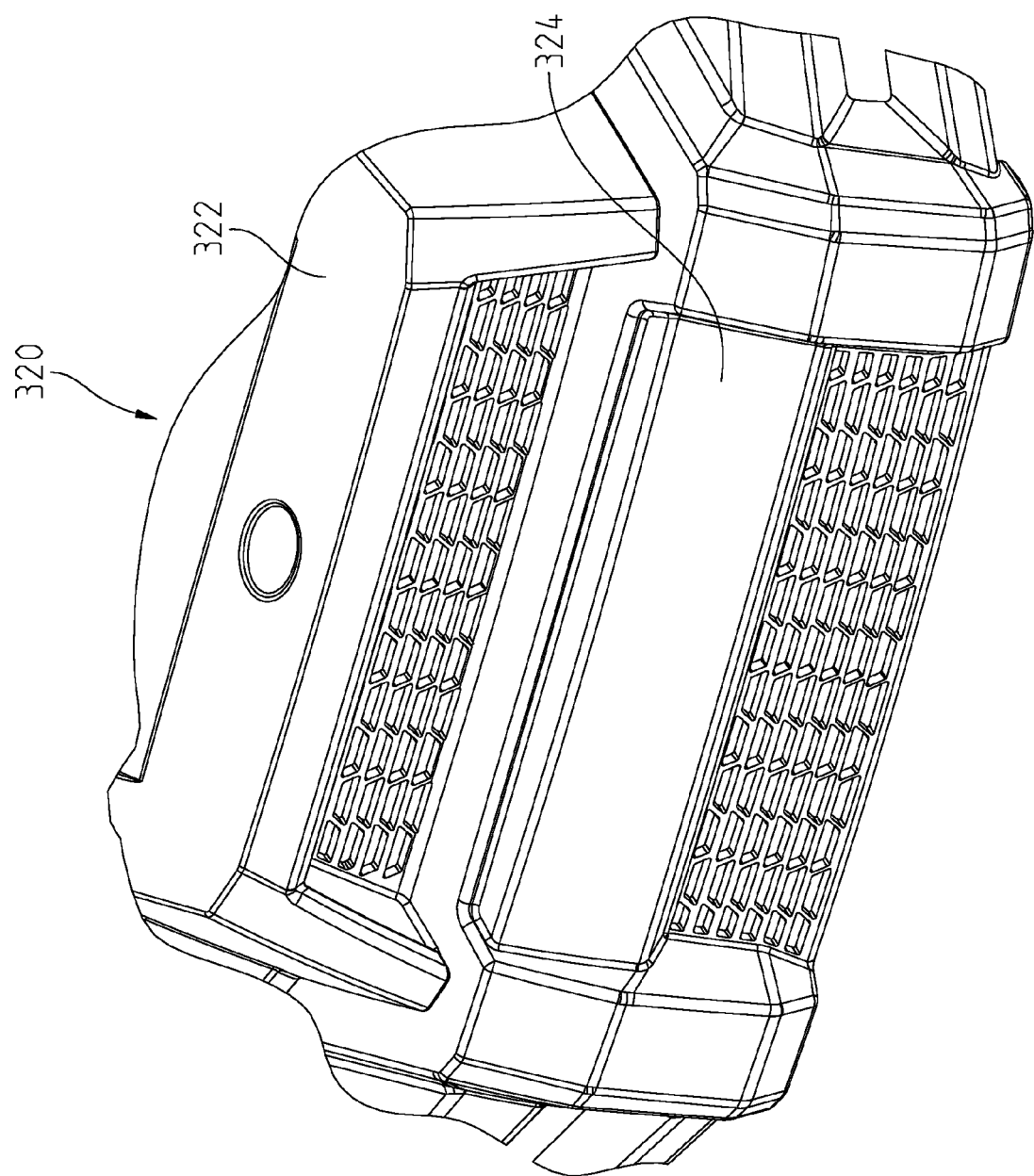
FIG. 33 is a left front perspective view of a hood and bumper of the vehicle of FIG. 1.
Figure 34:
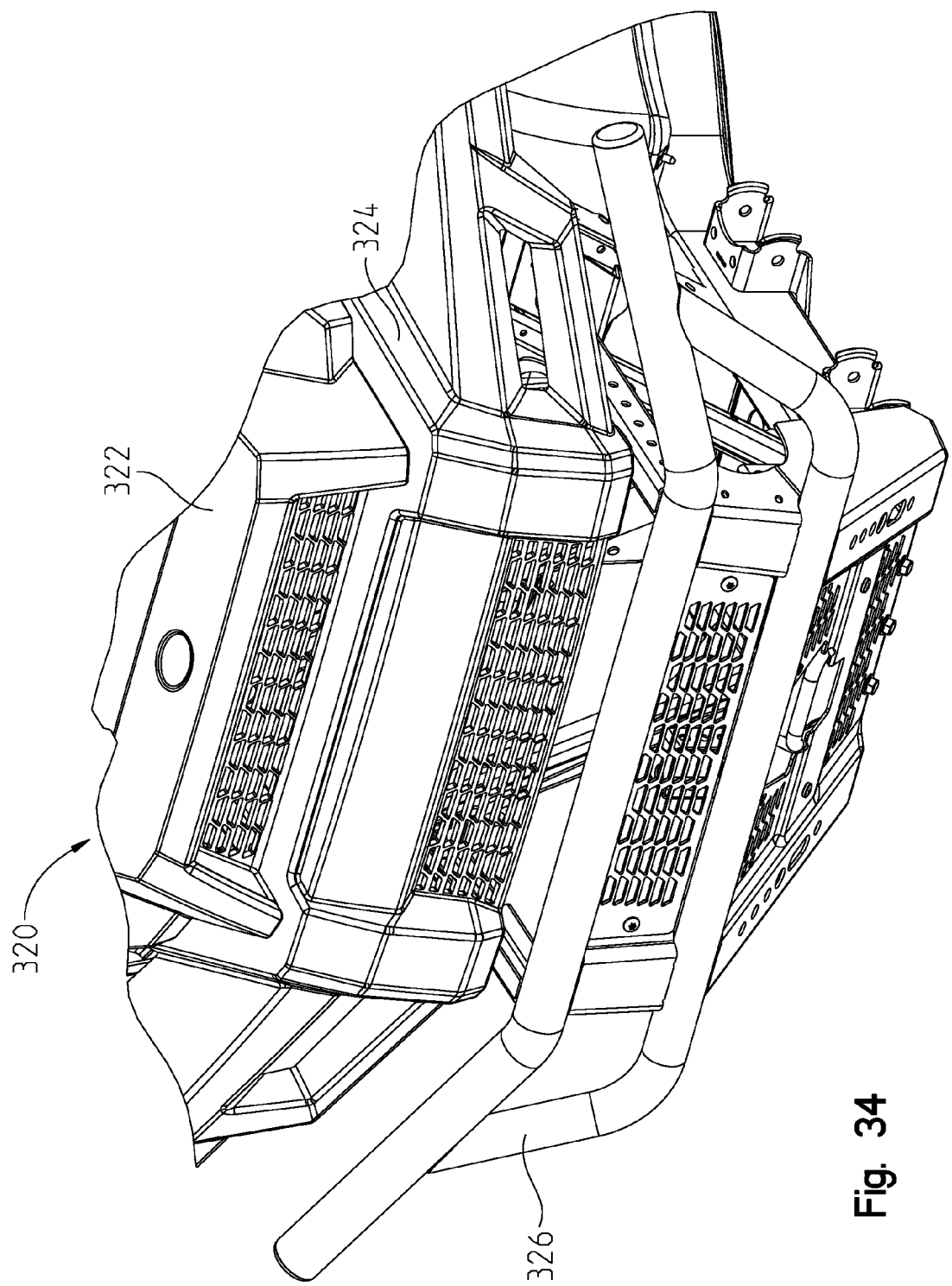
FIG. 34 is a left front perspective view of a brush guard of the vehicle of FIG. 1.
Figure 35:
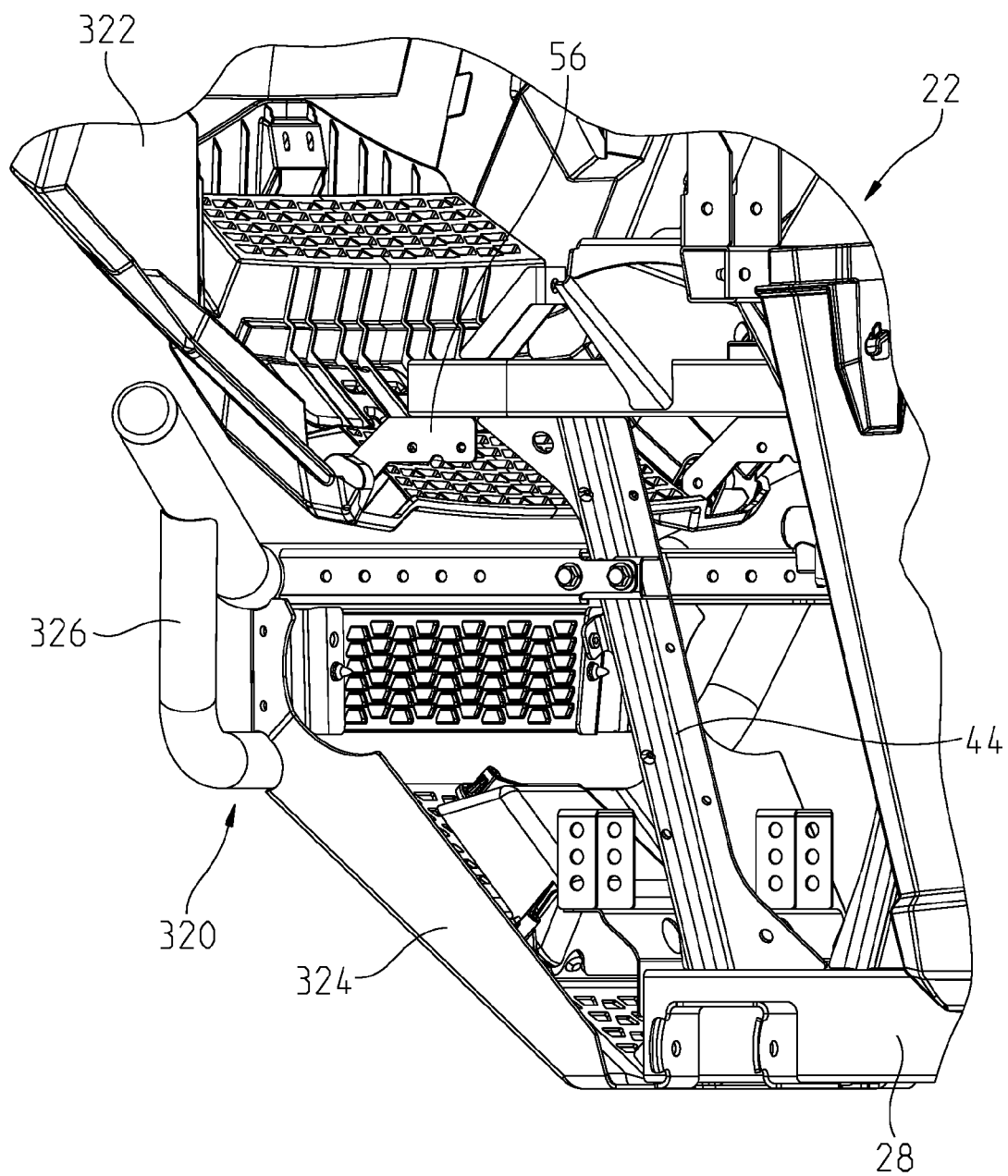
FIG. 35 is a rear cross-sectional view of the hood pivoted to an open position relative to the bumper of FIG. 33.
Figure 36:
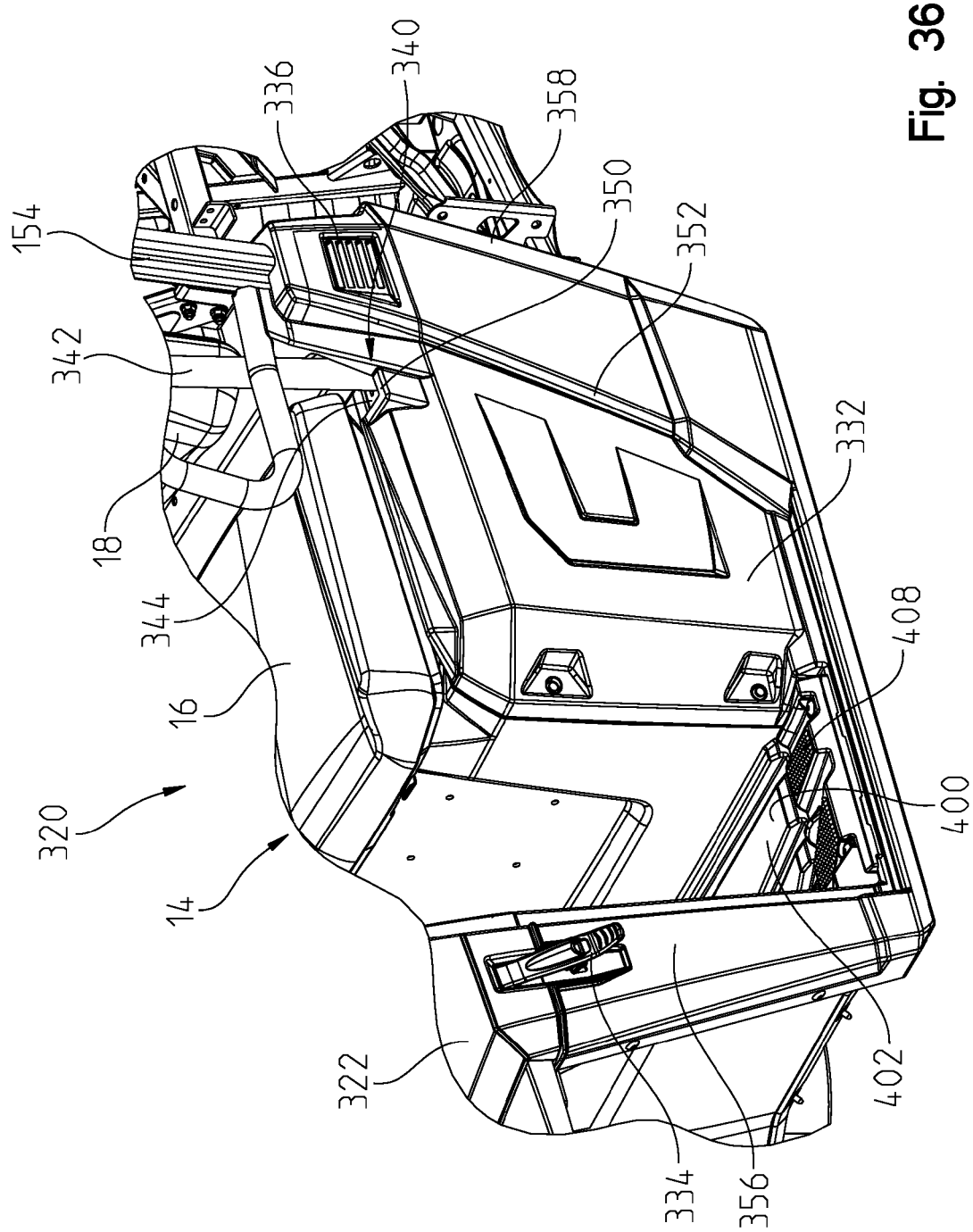
FIG. 36 is a left front perspective view of a side panel of the vehicle of FIG. 1.
Figure 37:
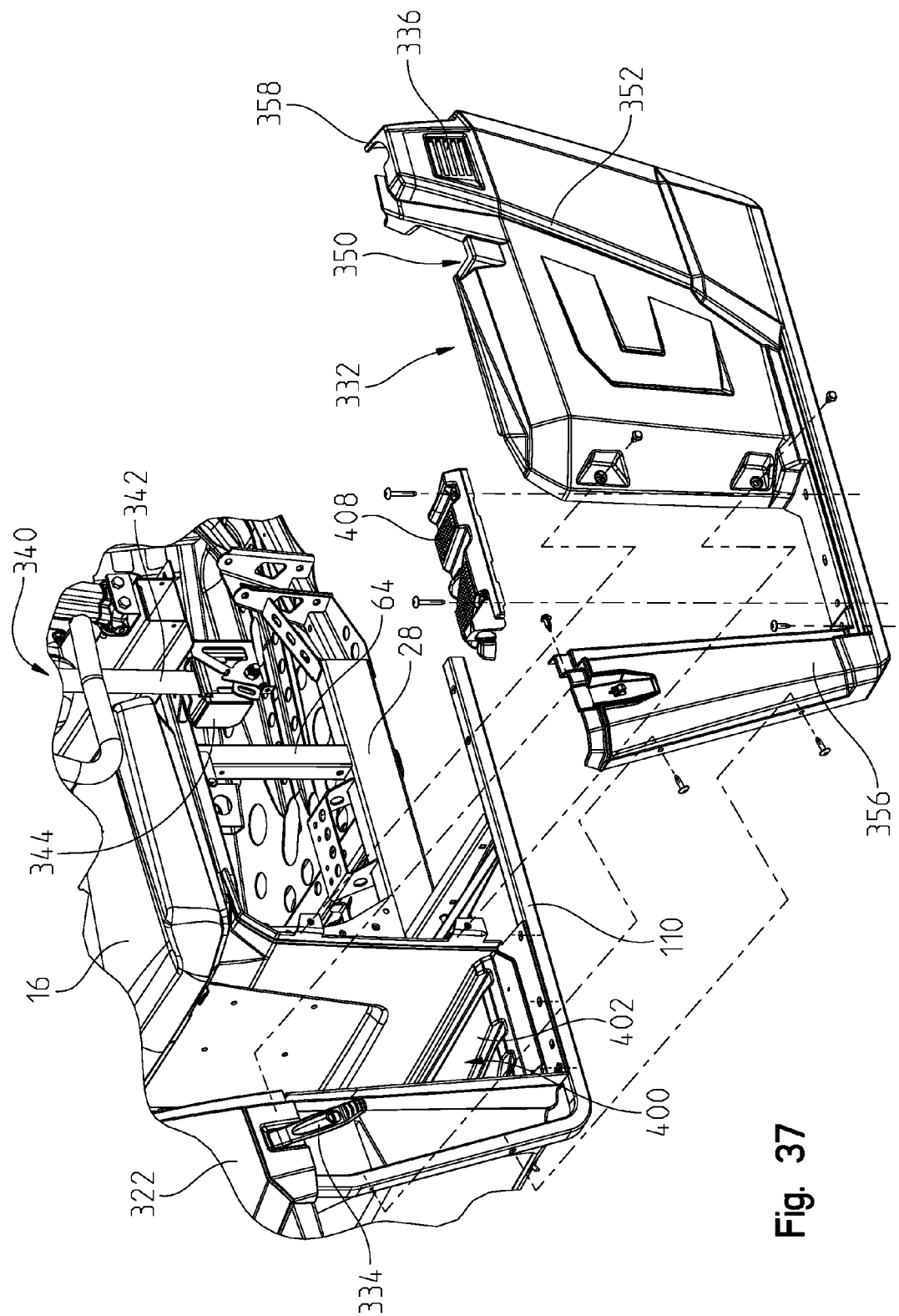
FIG. 37 is an exploded view of the side panel of FIG. 36.
Figure 38:
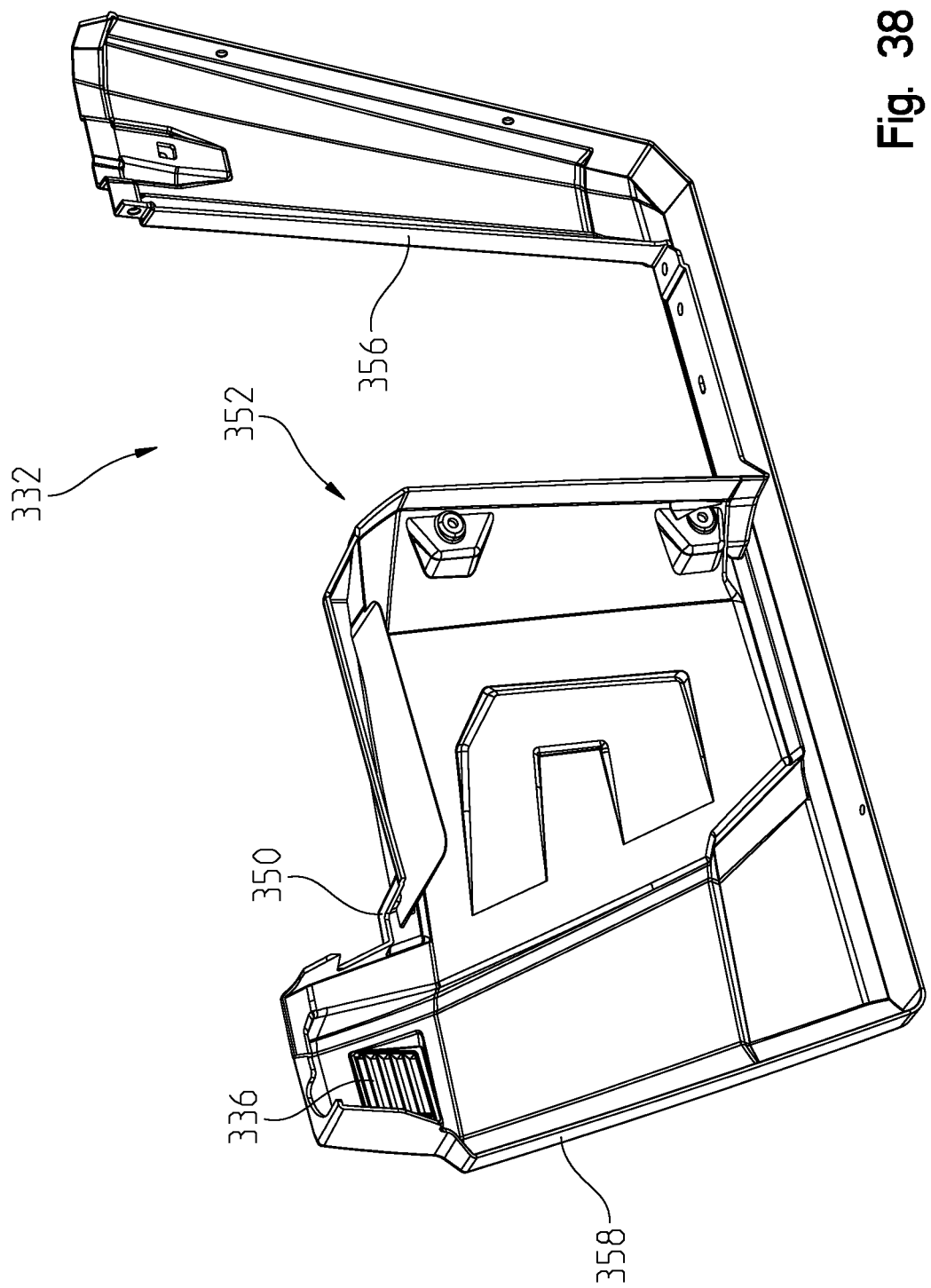
FIG. 38 is a right rear perspective view of an inner surface of the side panel of FIG. 36.

Referring now to FIGS. 33-35, a body assembly 320 of utility vehicle 2 includes at least a hood 322 and a bumper 324. Hood 322 and bumper 324 may be comprised of polymeric materials and may generally surround front frame portion 22 of frame assembly 20. As shown in FIG. 35, hood 322 is coupled to brackets 56 of front frame portion 22.

Both hood 322 and bumper 324 may be configured to support grilles 328, 330 of a cooling assembly of utility vehicle 2. As such, ambient air may flow into grilles 328, 330 in order to cool various components of utility vehicle 2, for example powertrain assembly 250. Grilles 328, 330 may be comprised of thinned or lightweight materials, however, in order to maintain structural integrity, grilles 328, 330 may extend deeper under hood 322. Additional details of the cooling assembly may be disclosed in U.S. patent application Ser. No. 13/492,589, filed on Jun. 8, 2012, the complete disclosure of which is incorporated by reference herein.

Additionally, bumper 324 may support a brush guard 326. Brush guard 326 may protect bumper 324 and hood 322 from scratches, dents, cracks, and other damage if front end 4 of utility vehicle 2 contacts an object (e.g., a rock).

Hood 322 is configured to pivot to an open position relative to bumper 324. As shown in FIG. 35, hood 322 is pivotally coupled to brackets 56 of front frame portion 22. The rearward end of hood 322 is adjacent a dashboard assembly 360 and is configured to pivot forwardly about brackets 56 between the open and closed positions. When in the open position, hood 322 is spaced apart from bumper 324 and brush guard 326.

As shown in FIGS. 36-39, body assembly 320 of utility vehicle 2 further includes side panels 332, which may be coupled to hood 322 with latches 334. More particularly, when the operator desires to pivot hood 322 to the open position, latches 334 on hood 322 are released from side panels 332 in order to allow hood 322 to pivot forwardly.

Illustrative side panel 332 is configured as a unitary, or one-piece, component that extends continuously from seat back 18 to hood 322. Additionally, the front and rear ends of side panel 332 extend vertically from a floorboard assembly 400 to seat bottom 16. A tread portion 408 of floorboard assembly 400 may be coupled to side panels 332.

Side panels 332 are configured to extend around the lower end of rear upstanding members 154 of roll cage assembly 150 and may include inlets 336, 338 for air intake assembly 260. More particularly, side panels 332 are positioned outwardly from rear cross-member 124 and extend over intake ports 268, 270. Inlet 336 corresponds to engine air intake port 268 and, therefore, may be positioned on the left or operator side of utility vehicle 2 and receives ambient air into first portion 276 of interior channel 128 of rear cross-member 124 (FIG. 27) to flow into engine 252. Similarly, inlet 338 (FIG. 2) corresponds to clutch air intake port 270 and, therefore, may be positioned on the right or passenger side of utility vehicle 2 and receives ambient air into second portion 278 of interior channel 128 of rear cross-member 124 (FIG. 27) to flow into transmission 254. Inlets 336, 338 are positioned generally rearward of seat back 18 and generally below rear upstanding members 154 of roll cage assembly 150.

Figure 4:
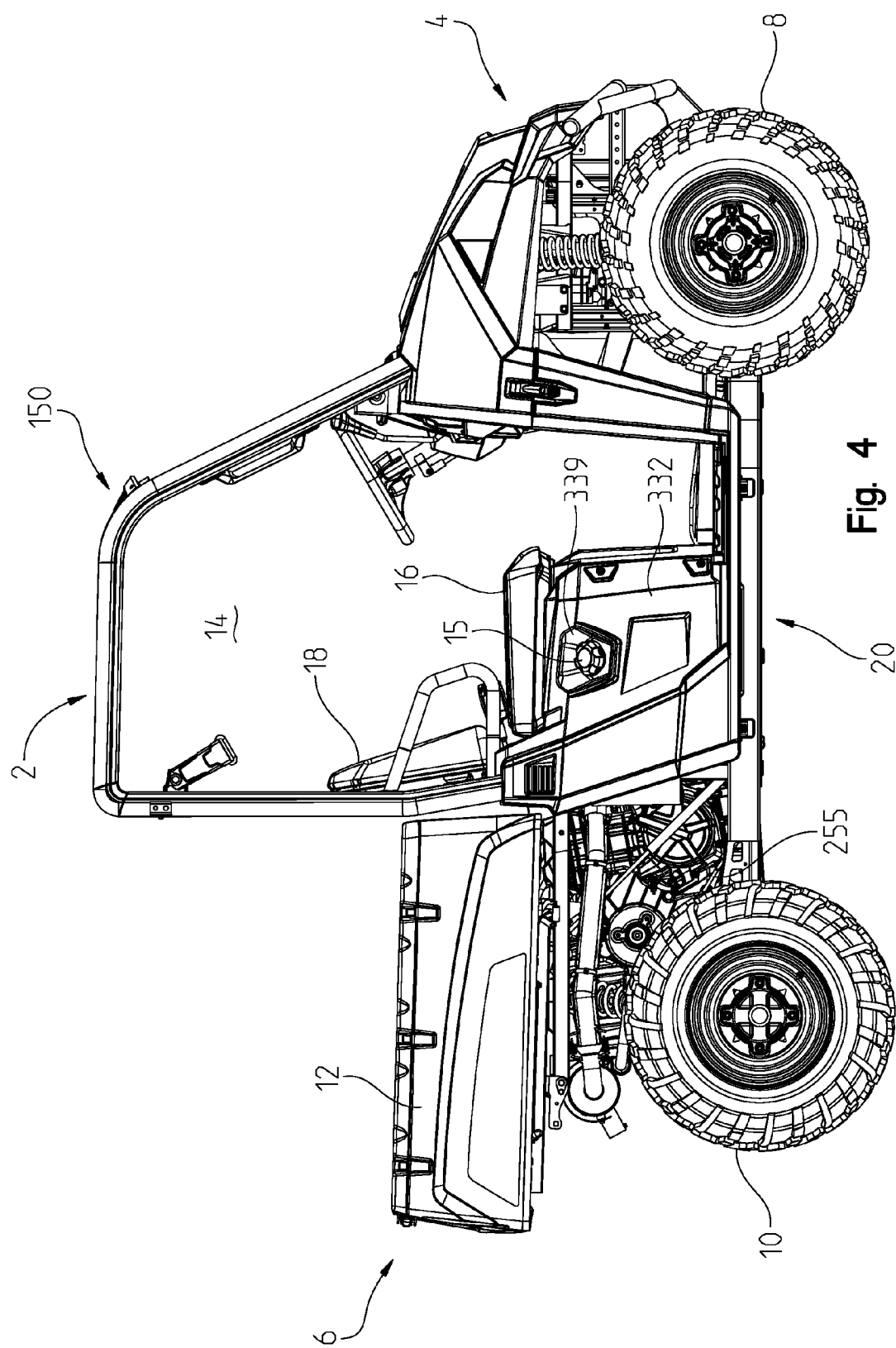
FIG. 4 is right side view of the vehicle of FIG. 1.
Figure 5:
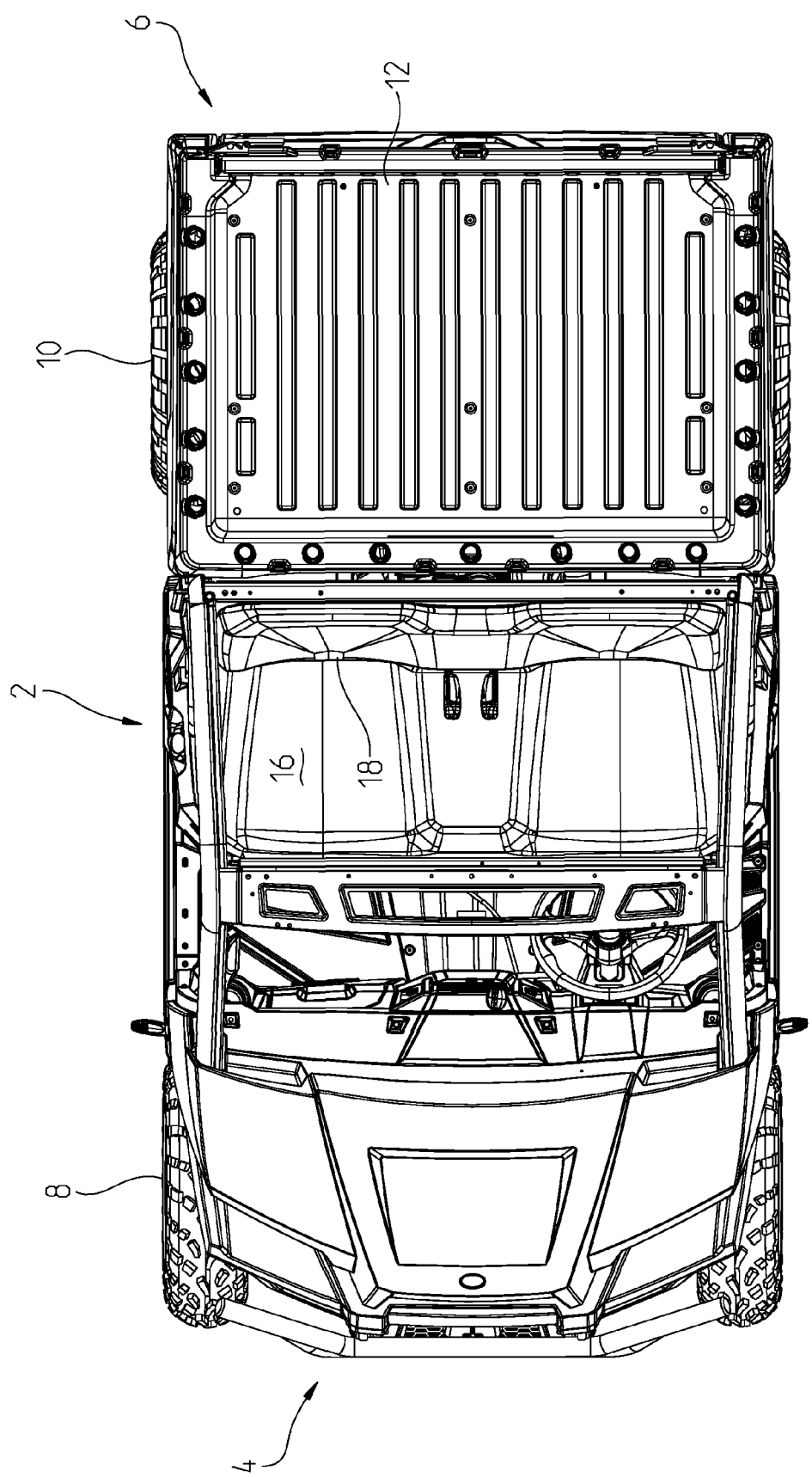
FIG. 5 is a top view of the vehicle of FIG. 1.
Figure 6:
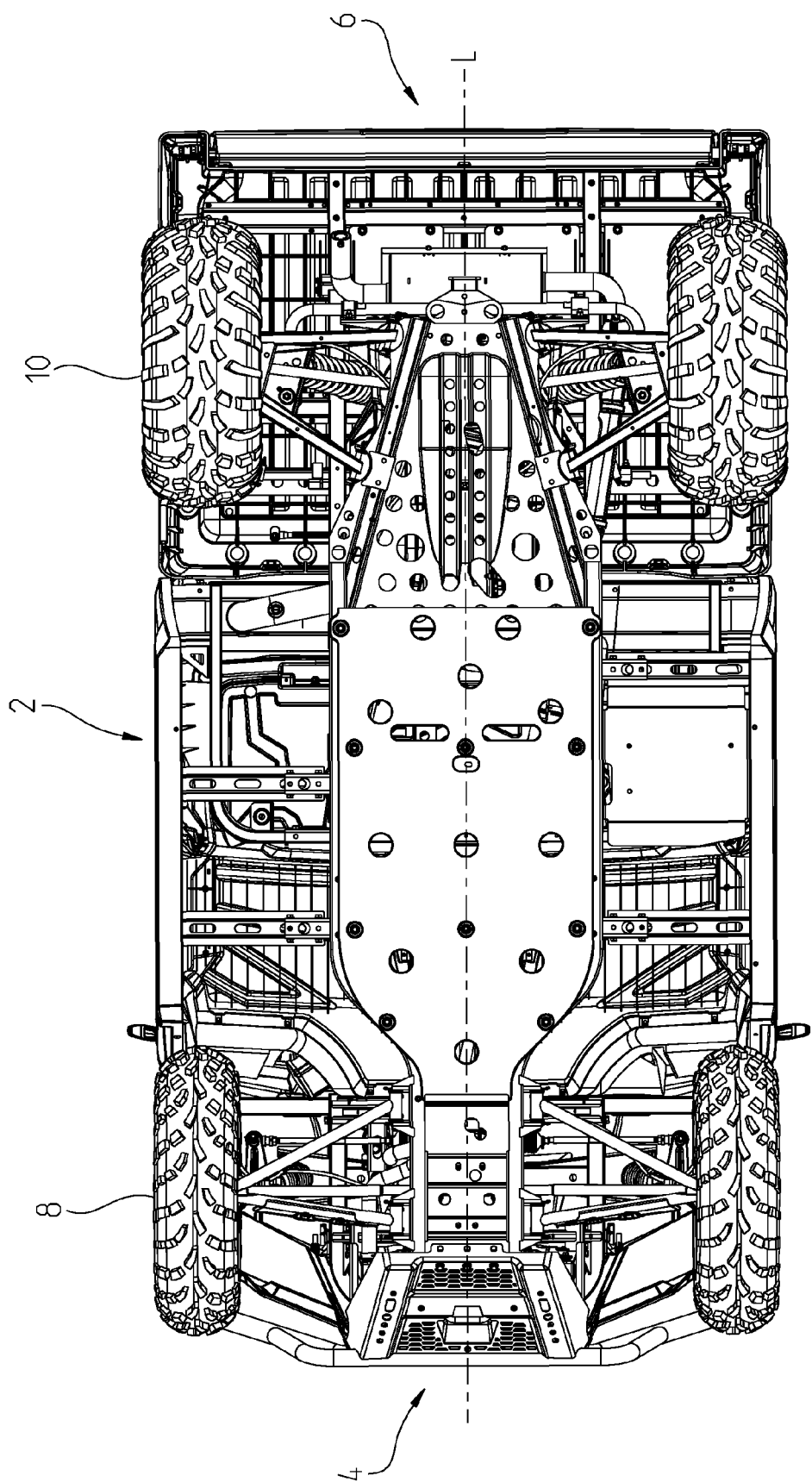
FIG. 6 is a bottom view of the vehicle of FIG. 1.
Figure 7:
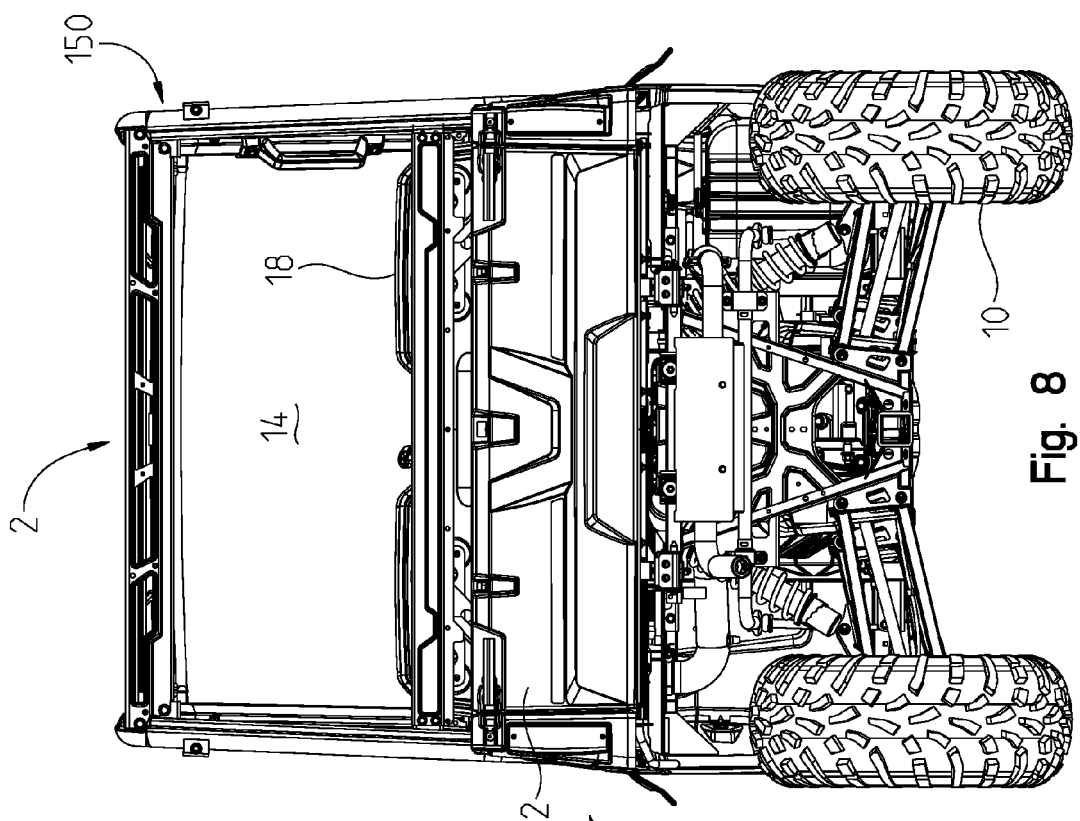
FIG. 7 is a front view of the vehicle of FIG. 1.

Side panels 332 are coupled to frame assembly 20 at outer frame rails 110. Side panel 332 on the left side of utility vehicle 2 generally conceals the batteries of utility vehicle 2, which are supported within battery support member 70. Side panel 332 on the right side of utility vehicle 2 generally conceals a fuel tank and may include a recess 339 configured to support a fuel cap 15 (FIGS. 2 and 4).

Additionally, side panels 332 are configured to generally conceal a portion of a seat restraint or seat belt assembly 340. Seat belt assembly 340 (FIG. 37) includes webbing or a belt portion 342, a hip retractor 344, a shoulder retractor 346 (FIG. 1), and a latch 348 (FIG. 1). Side panel 332 is positioned outward of seat belt assembly 340 and includes a recess or opening 350 for accommodating hip retractor 344 and belt portion 342 along an inner surface of side panel 332. As such, hip retractor 344 is positioned below the top surface of side panels 332 and is positioned inward of the inner surface of side panels 332. Additionally, hip retractor 344 may be coupled to bracket 65 on upstanding member 64 of frame assembly 20 and is positioned below seat bottom 16. Belt portion 342 extends above hip retractor 344 and side panel 332.

Figure 39:
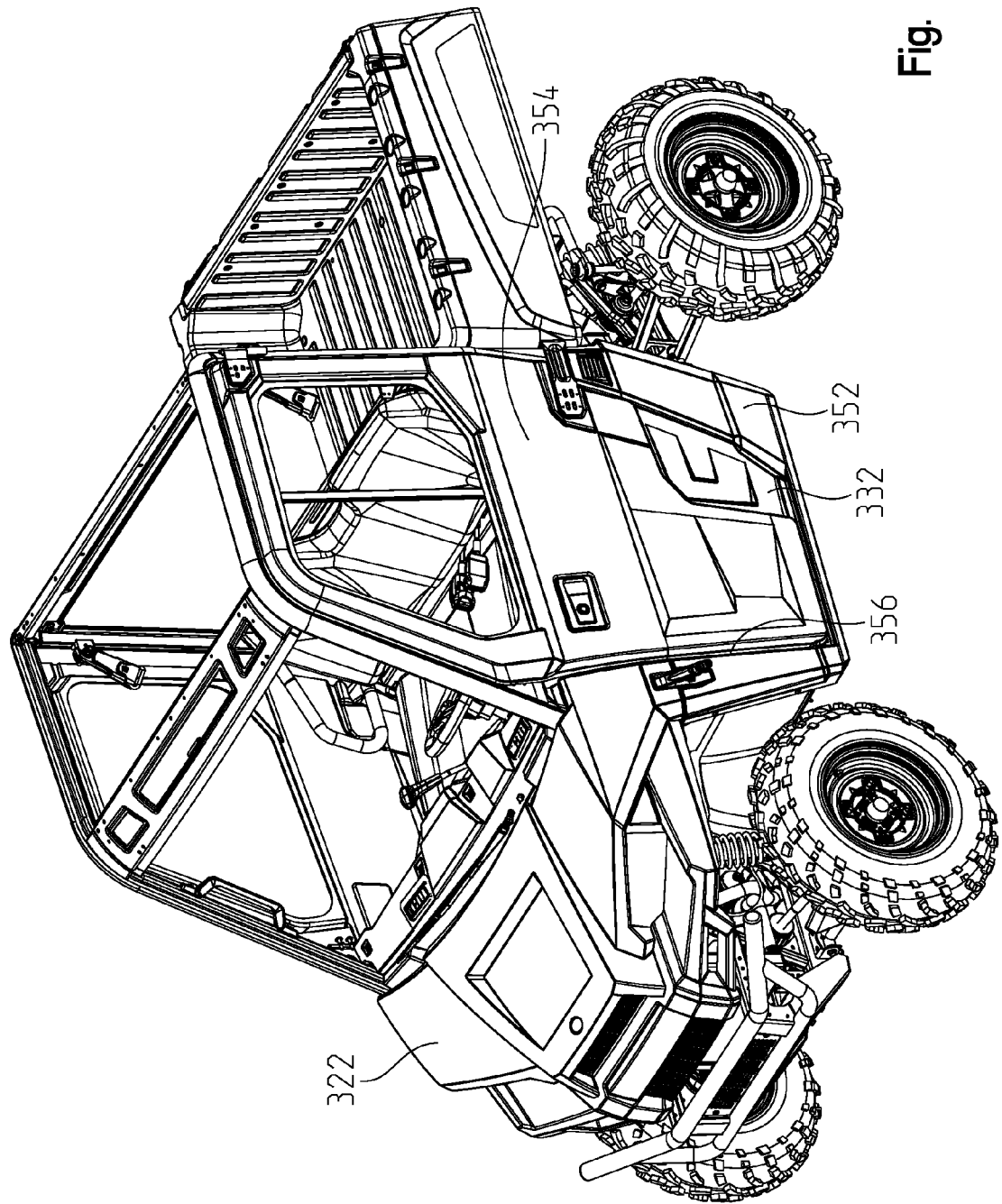
FIG. 39 is a left front perspective view of a door sealed against the side panel of FIG. 36.

Side panels 332 also include at least one sealing surface. For example, side panels 332 each include a first sealing surface 352, which extends generally vertically from the bottom surface of side panel 332 to a position generally adjacent seat bottom 16. First sealing surface 352 also is positioned rearward of hood 322 and floorboard assembly 400. First sealing surface 352 is angled or recessed inwardly relative to the portion of side panels 332 that includes inlets 336, 338. First sealing surface 352 is configured to engage with a door 354 (FIG. 39) to seal door 354 against side panel 332 and enclose operator area 14. Illustratively, first sealing surface 352 is configured to seal against a rear surface of a door 354. As shown in FIG. 39, because first sealing surface 352 is recessed or angled inwardly, door 354 is generally flush against the portion of side panels 332 that includes inlets 336, 338 and the portion of side panels 332 that couples with hood 322. Door 354 also may be flush against roll cage assembly 150 because of the profiled cross-section of at least front upstanding members 152, rear upstanding members 154, and longitudinal members 156. Additional details of door 354 and/or the engagement between door 354 and roll cage assembly 150 may be found in U.S. patent application Ser. No. 13/492,589, filed on Jun. 8, 2012, the complete disclosure of which is incorporated by reference herein.

Side panels 332 also may include a second sealing surface 356 to engage with a front surface of door 354. Second sealing surface 356 also is recessed or angled inwardly relative to the portion of side panel 332 which includes latch 334. As such, door 354 also may be flush against the portion of side panels 332 that includes latch 334.

In one embodiment, side panels 332 also may include a third sealing surface 358, which may be configured to seal against, or support a seal for, a rear door, as detailed further herein.

Figure 40:
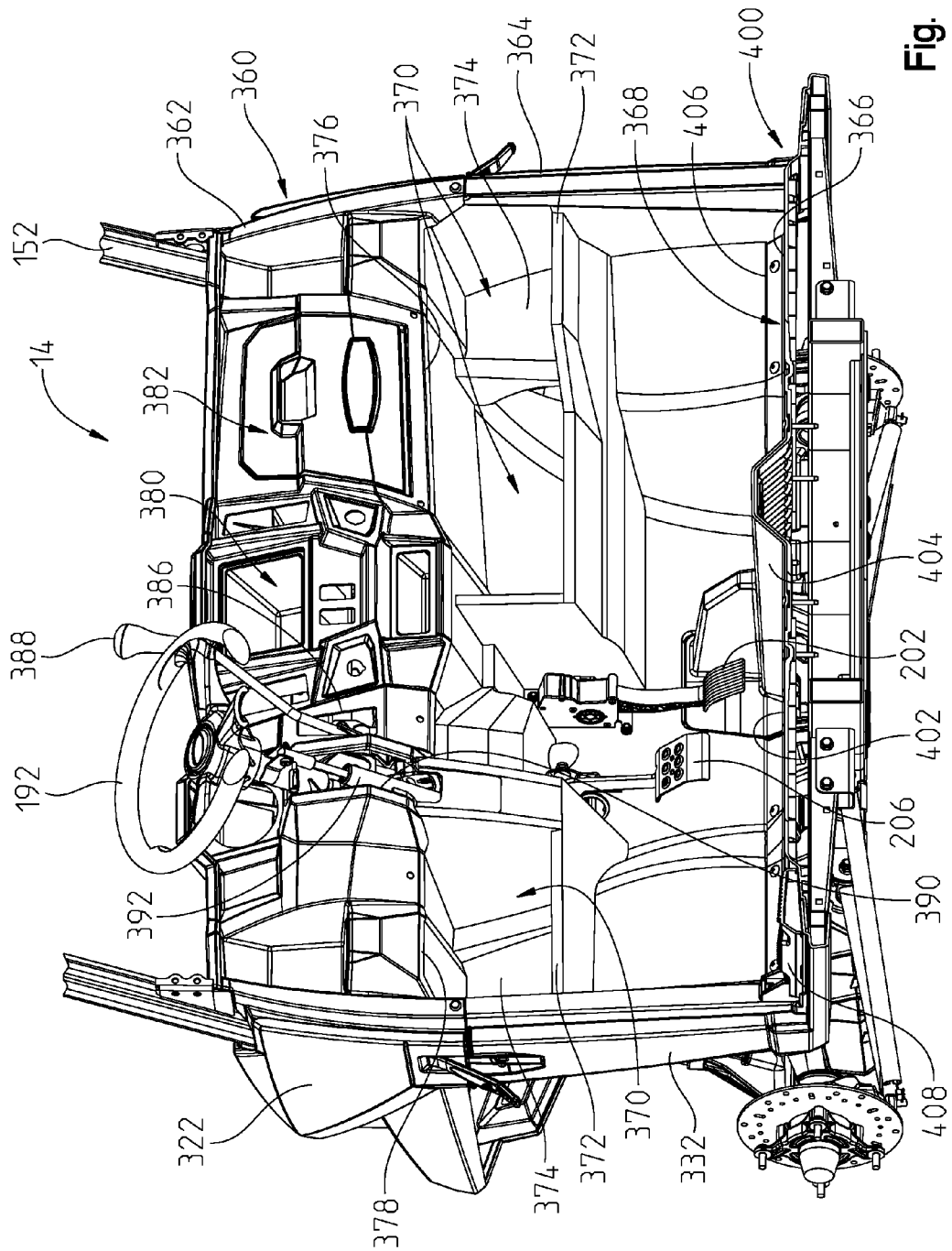
FIG. 40 is a left rear perspective view of a dashboard assembly of the vehicle of FIG. 1.
Figure 41:
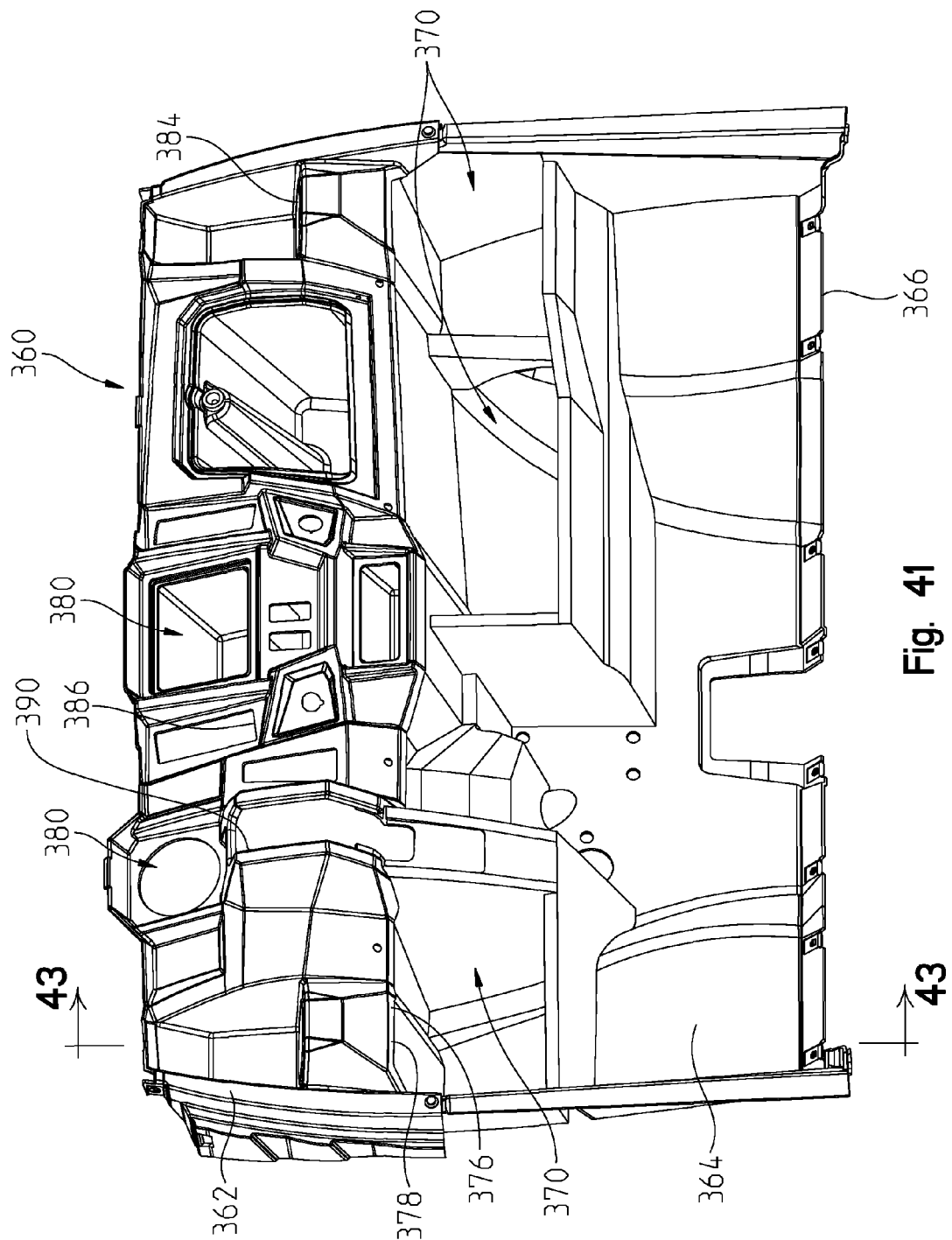
FIG. 41 is a further left rear perspective view of the dashboard assembly of FIG. 40.
Figure 42:
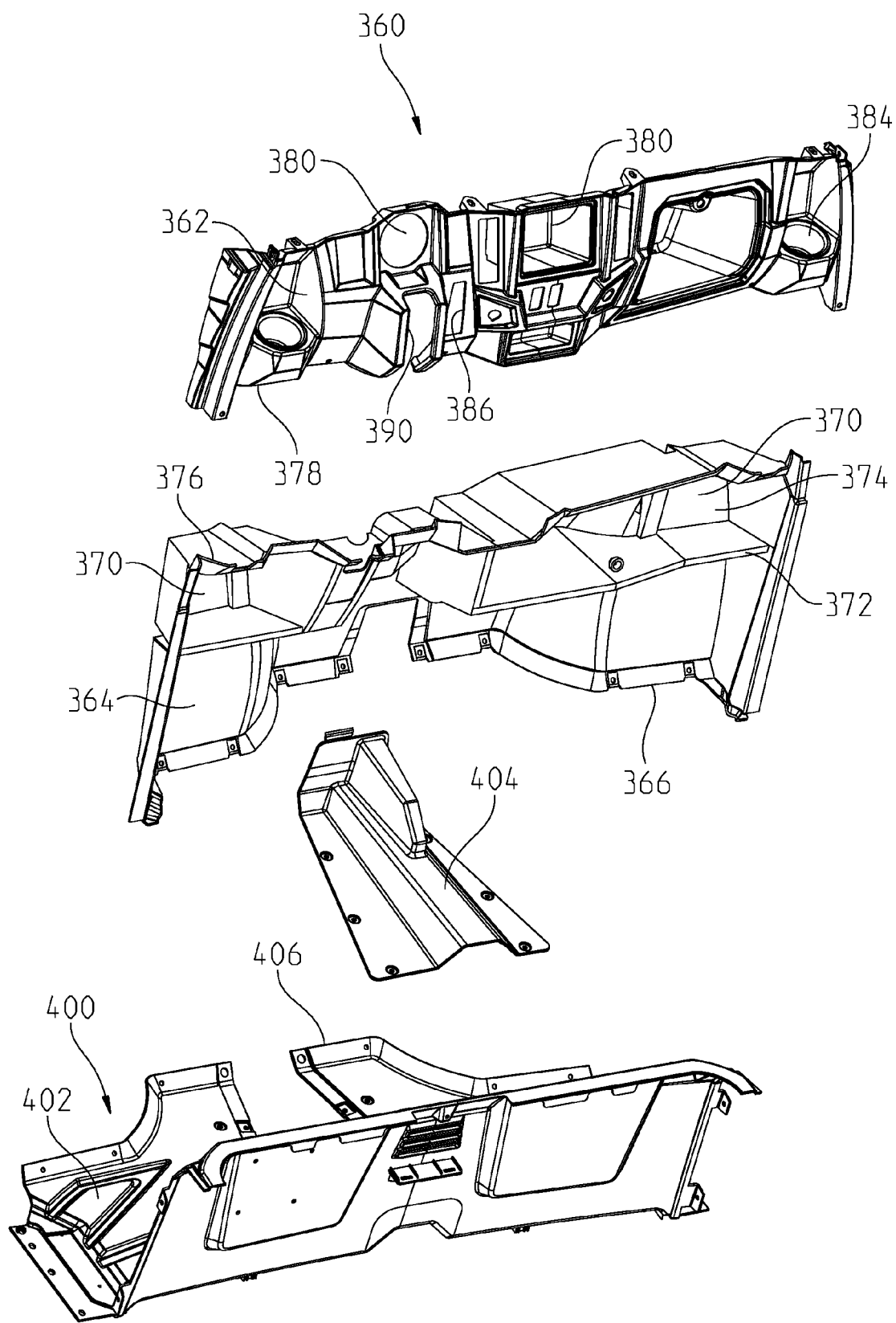
FIG. 42 is an exploded view of the dashboard assembly of FIG. 41.

Referring to FIGS. 40-46, body assembly 320 (FIG. 33) also includes dashboard assembly 360 and floorboard assembly 400. Dashboard assembly 360 includes an upper dash member 362 and a lower dash member 364 coupled thereto with conventional fasteners. Lower dash member 364 also is coupled to floorboard assembly 400 with conventional fasteners. As shown in FIG. 42, floorboard assembly 400 includes a main floorboard portion 402 and a center floorboard portion 404. Main floorboard portion 402 extends horizontally from lower dash member 364 and bends vertically toward seat bottom 16. Main floorboard portion 402 is configured to support the operator's and passenger's feet. Additionally, main floorboard portion 402 may include foot tread portion 408, which is coupled to side panels 332, and includes raised portions to increase friction between the operator's and passenger's feet and floorboard assembly 400.

As shown in FIGS. 40-42, a top edge 406 of main floorboard portion 402 couples with a bottom edge 366 of lower dash member 364. More particularly, top edge 406 of main floorboard portion 402 overlaps bottom edge 366 of lower dash member 364 to form a seam 368. Main floorboard portion 402 of floorboard assembly 400 is coupled to dashboard assembly 360 at seam 368 but main floorboard portion 402 does not extend forward of dashboard assembly 360. Additionally, main floorboard portion 402 is not coupled to dashboard assembly 360 at a position above bottom edge 366 of lower dash member 364.

Center floorboard portion 404 is removably coupled to main floorboard portion 402 with conventional fasteners (e.g., bolts) and also may be removably coupled to lower dash member 364. Center floorboard portion 404 may be elevated relative to main floorboard portion 402 in order to accommodate a portion of powertrain assembly 250 (e.g., the driveshaft).

Figure 43:
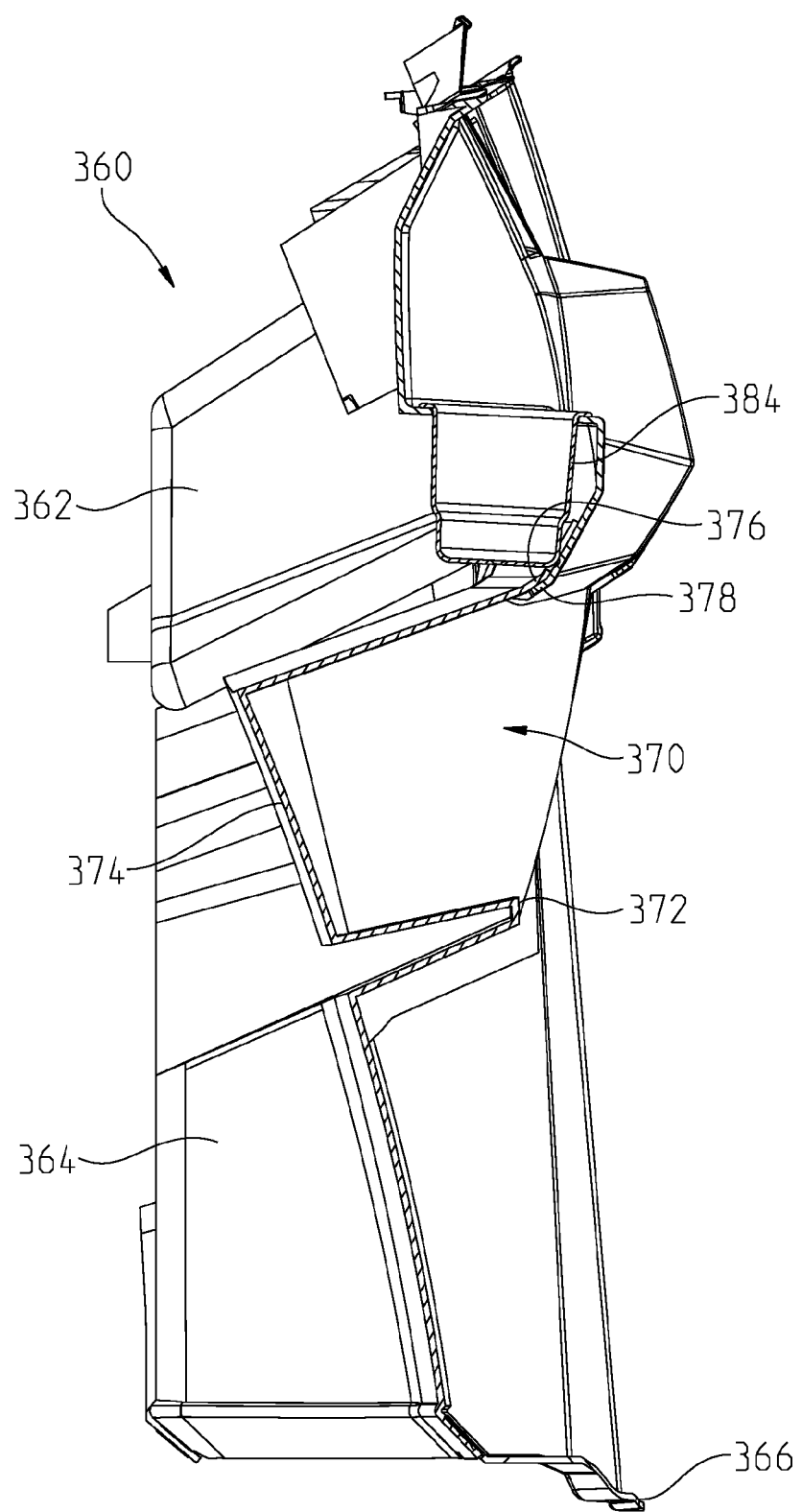
FIG. 43 is a cross-sectional view of the dashboard assembly of FIG. 41, taken along line 43-43 of FIG. 41.

Lower dash member 364 includes a plurality of storage containers 370. Lower dash member 364 may be configured as a unitary piece that includes storage containers 370 and extends continuously between floorboard assembly 400 and upper dash member 362. Illustratively, lower dash member 364 includes at least three storage containers 370. In one embodiment, storage containers 370 are integrally formed with lower dash member 364, as shown in FIG. 43. Alternatively, storage containers 370 may be separate from lower dash member 364 and coupled thereto with conventional fasteners, such as welds, rivets, bolts, and/or adhesive.

As shown best in FIG. 43, storage containers 370 have an open rearward end 372 which faces operator area 14. Open rearward end 372 allows the operator and/or passenger to place cargo within storage container 370. Additionally, storage containers 370 have a closed forward end 374, which is positioned forward of rearward end 372 and retains cargo within storage containers 370. Illustratively, forward end 374 is angled downwardly relative to rearward end 372. For example, forward end 374 may be angled downwardly relative to rearward end 372 by approximately 0-20 degrees. In one embodiment, forward end 374 is angled downwardly by approximately 10 degrees. By angling forward end 374 downwardly relative to rearward end 372, the cargo within storage containers 370 will remain therein during operation of utility vehicle 2. As such, the cargo may be jostled or bounced around within storage container 370 but will not come out of storage container 370 because it will remain at an angle lower than rearward end 372. In other embodiments, a door or closure member may close off rearward end 372 to further retain cargo within storage containers 370.

A top edge 376 of lower dash member 364 is coupled to a bottom edge 378 of upper dash member 362 with conventional fasteners. More particularly, lower dash member 364 extends continuously between floorboard assembly 400 and upper dash member 362. Upper dash member 362 includes a plurality of openings 380 for exposing display gauges and screens. For example, one opening 380 is positioned above steering wheel 192 and is configured to expose a display screen for at least the speed of utility vehicle 2. Additionally, one opening 380 is laterally inward or otherwise laterally offset from steering wheel 192 and is configured to expose a multi-function display screen for at least GPS, radio, accessory functionality, heating/cooling, defrost, and vehicle sensor information. In an alternative embodiment, openings 380 may be configured as storage containers for cargo, rather than openings for display screens.

Figure 44:
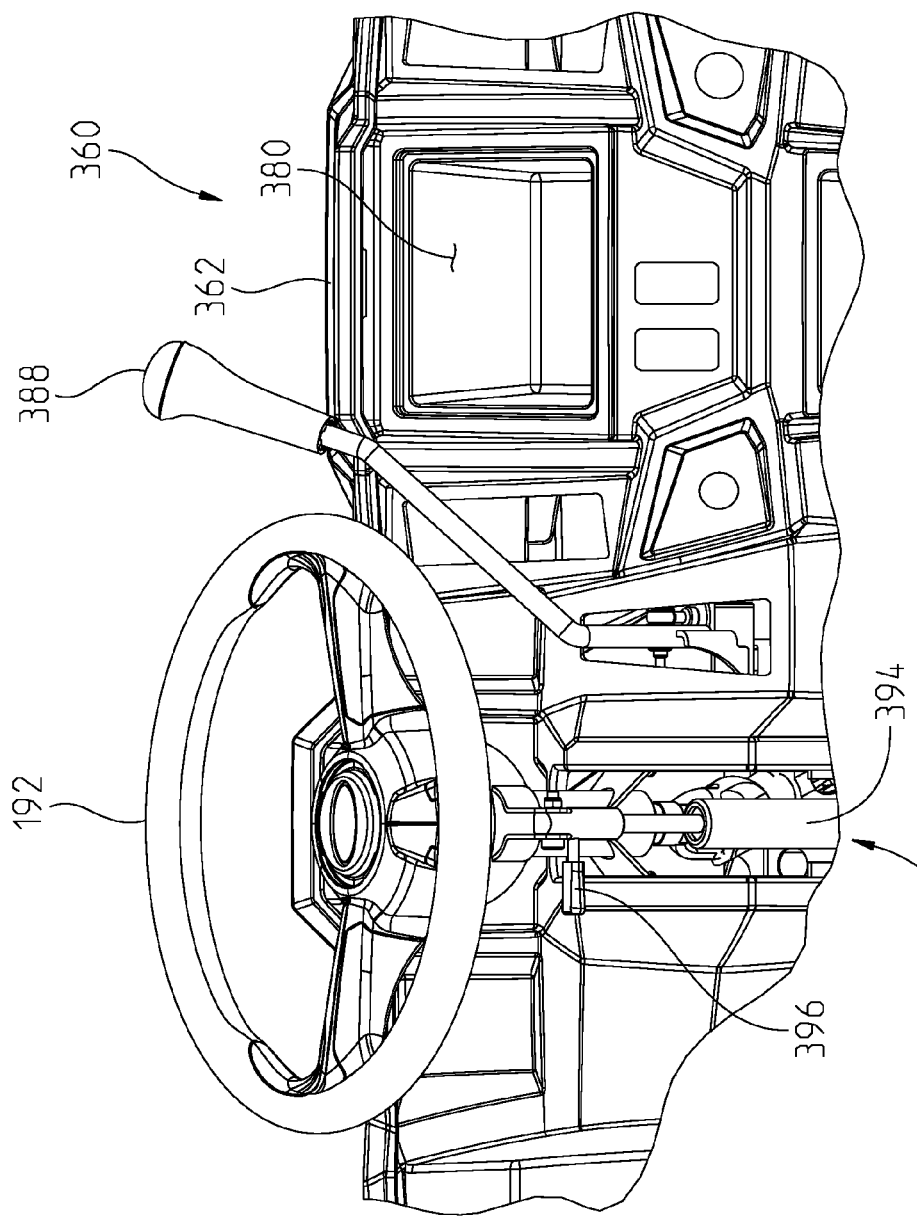
FIG. 44 is a rear view of the dashboard assembly of FIG. 40.

Upper dash member 362 may also include a plurality of storage containers, for example a glove box 382, and other accessories, for example speaker ports and cup holders 384 integrated within upper dash member 362. Additionally, upper dash member 362 includes an opening 386 for receiving a shift lever 388 of utility vehicle 2. Shift lever 388 remains laterally outward from opening 380 for the display screens such that the position of shift lever 388 does not block the operator's view of the display screens supported within openings 380. As shown in FIG. 44, shift lever 388 may angle outwardly from steering wheel 192. Alternatively, shift lever 388 may be in a generally vertical orientation.

Figure 45:
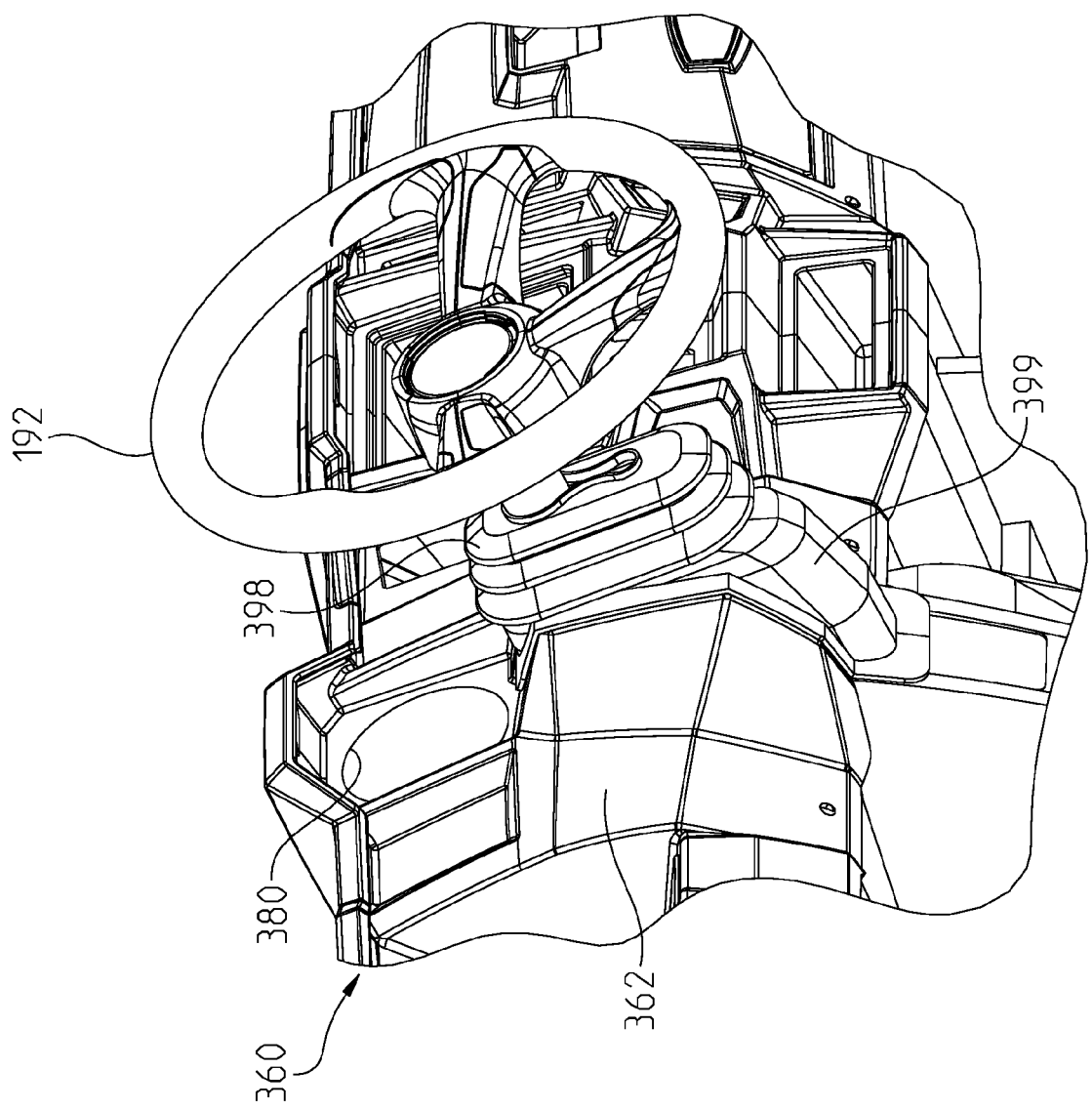
FIG. 45 is a left rear perspective view of the dashboard assembly of FIG. 40.

Upper dash member 362 also includes an opening 390 for receiving a portion of steering column 194, steering wheel 192, and an adjustment assembly 392 for adjusting the position of steering wheel 192. As shown in FIG. 44, adjustment assembly 392 may include a hydraulic cylinder or shock 394 and a lever 396 operably coupled to shock 394. When the operator depresses lever 396, shock 394 facilitates the adjustment of the position of steering wheel 192. As shown in FIG. 45, a seal member 398 may be positioned around opening 390 to seal operator area 14 from noise, dirt, dust, and debris within front end 4 of utility vehicle 2. Seal member 398 may include a lower portion 399 when extends around tilt assembly 392.

Additionally, it may be noted that power steering unit 196 is positioned forward of dashboard assembly 360 and, therefore, dashboard assembly 360 functions as a firewall for power steering unit 196 and other components at front end 4 of utility vehicle 2. In other words, power steering unit 196 and other components at front end 4 of utility vehicle 2 are spaced apart from operator area 14 by dashboard assembly 360 and, therefore, are positioned outside of operator area 14.

Figure 46:
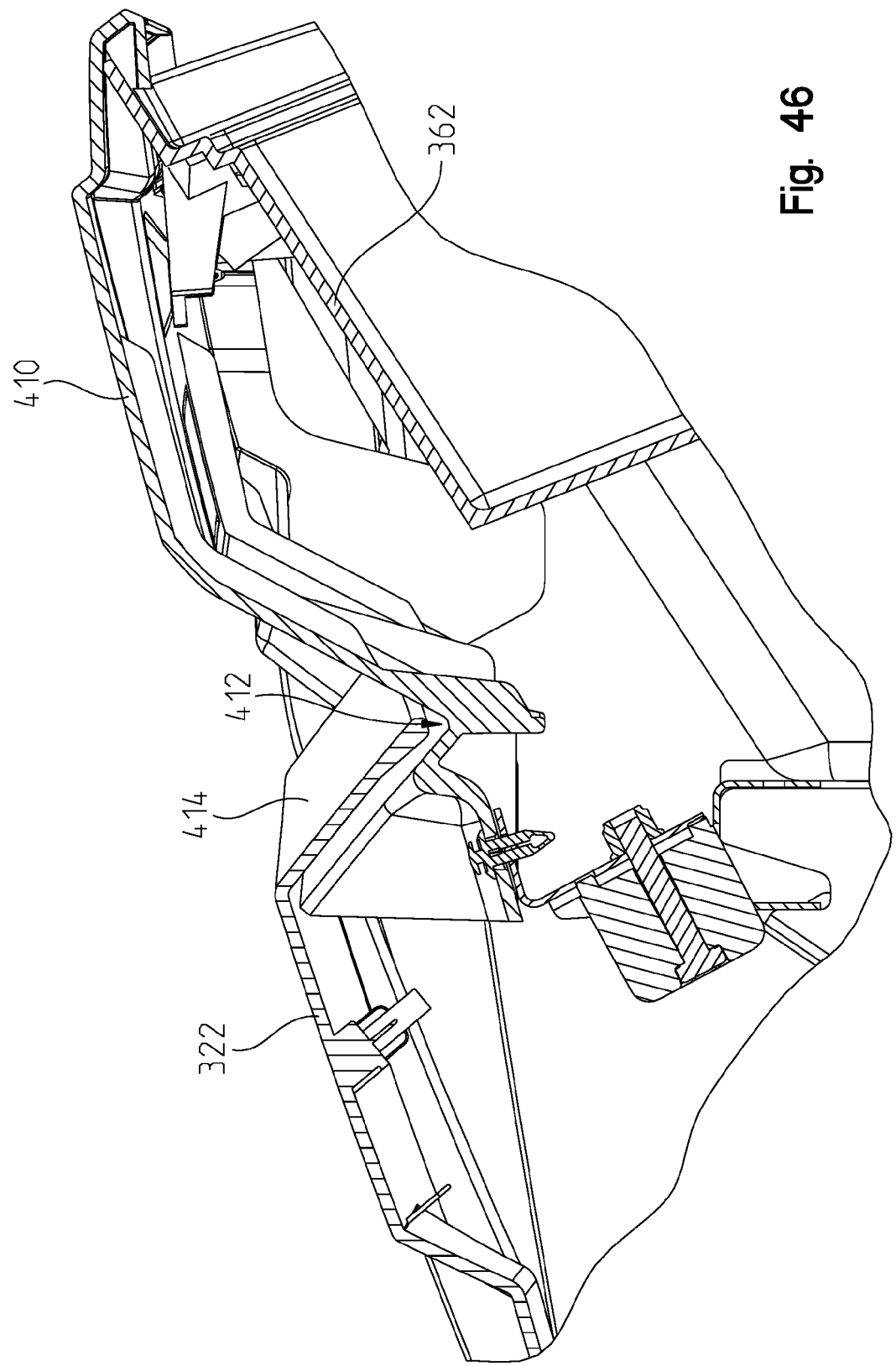
FIG. 46 is a cross-sectional view of the hood coupled to the dashboard assembly of FIG. 40.

As shown in FIG. 46, a top surface 410 of upper dash member 362 is configured to engage with hood 322. More particularly, top surface 410 of upper dash member 362 includes a recess 412, which is configured to receive a tab 414 of hood 322. Illustratively, recess 412 is generally V-shaped and tab 414 is angled so as to slide along a portion of the V-shaped recess 412 of upper dash member 362.

Figure 39A:
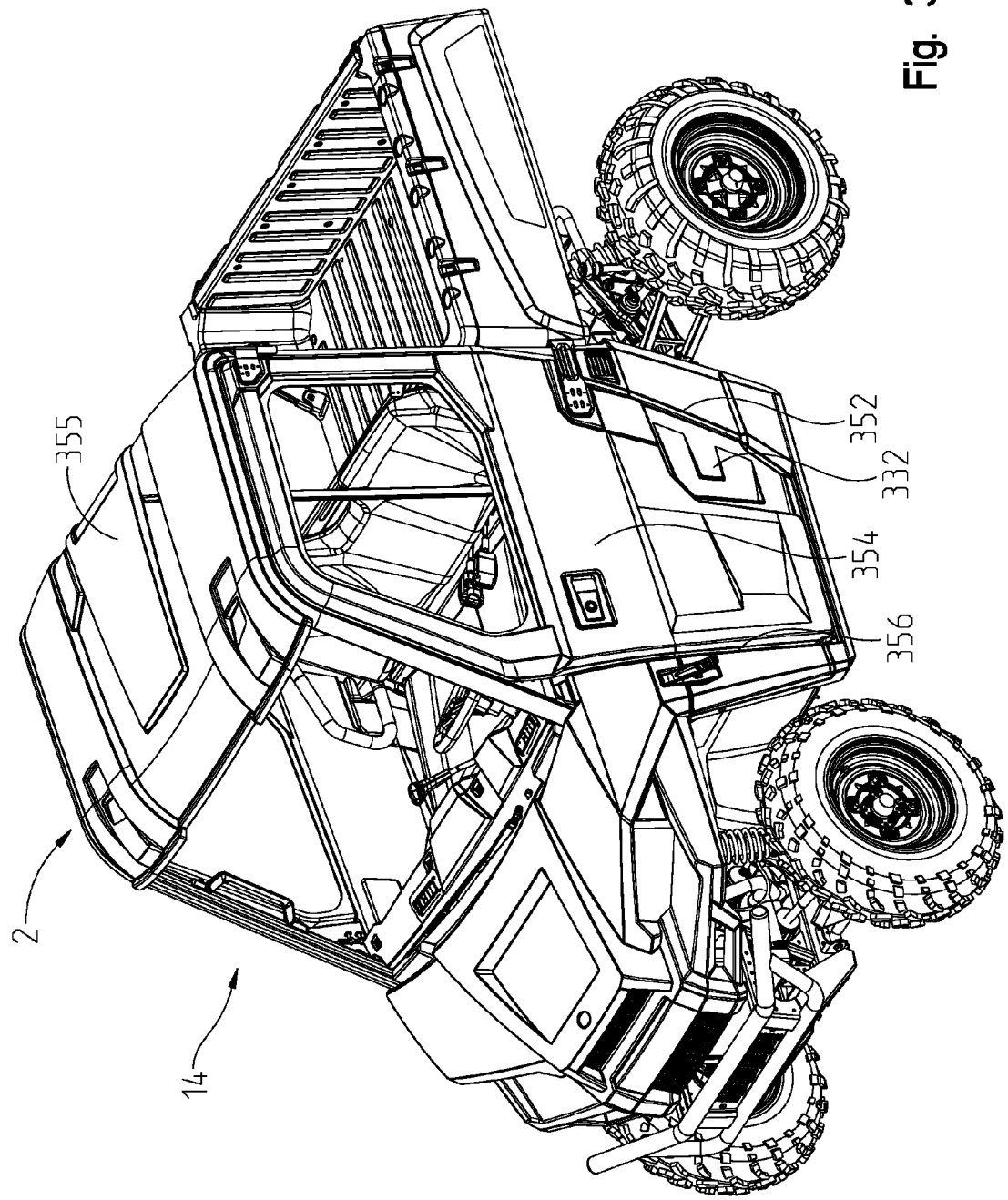
FIG. 39A is a left front perspective view of a roof coupled to the roll cage assembly of FIG. 12.

Utility vehicle 2 may include a cab assembly comprised of a front windshield 420, doors 354, a roof 355, and a rear windshield (not shown). As shown in FIG. 39A, roof 355 is coupled to roll cage assembly 150 to further enclose operator area 14 of vehicle 2. Roof 355 may be coupled with front cross-member 158, rear upper cross-member 160, and/or longitudinal members 156, as detailed further in U.S. patent application Ser. No. 13/492,589, filed on Jun. 8, 2012, the complete disclosure of which is expressly incorporated by reference herein.

Figure 47:
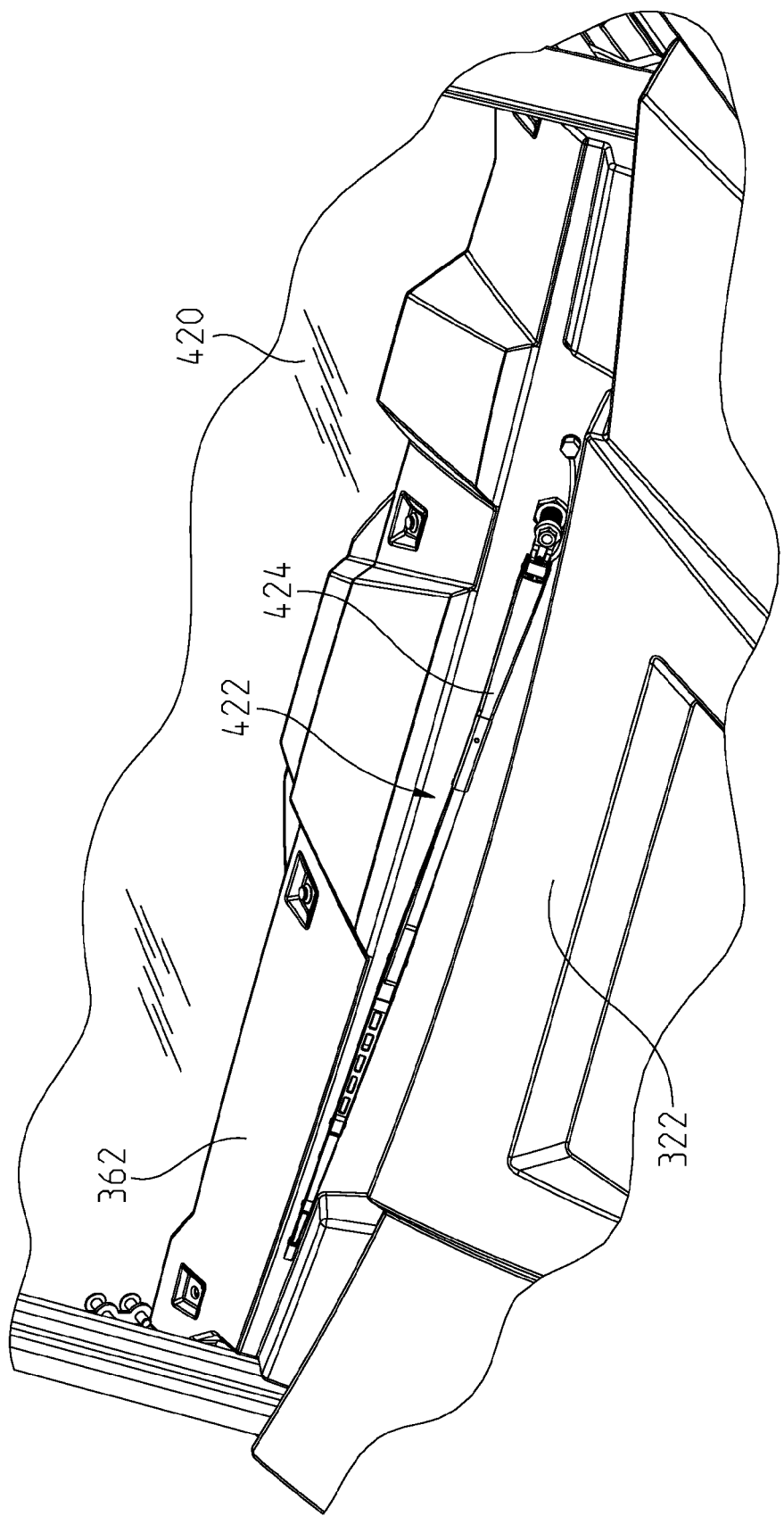
FIG. 47 is a left front perspective view of a windshield and wiper assembly of the vehicle of FIG. 1.
Figure 48:
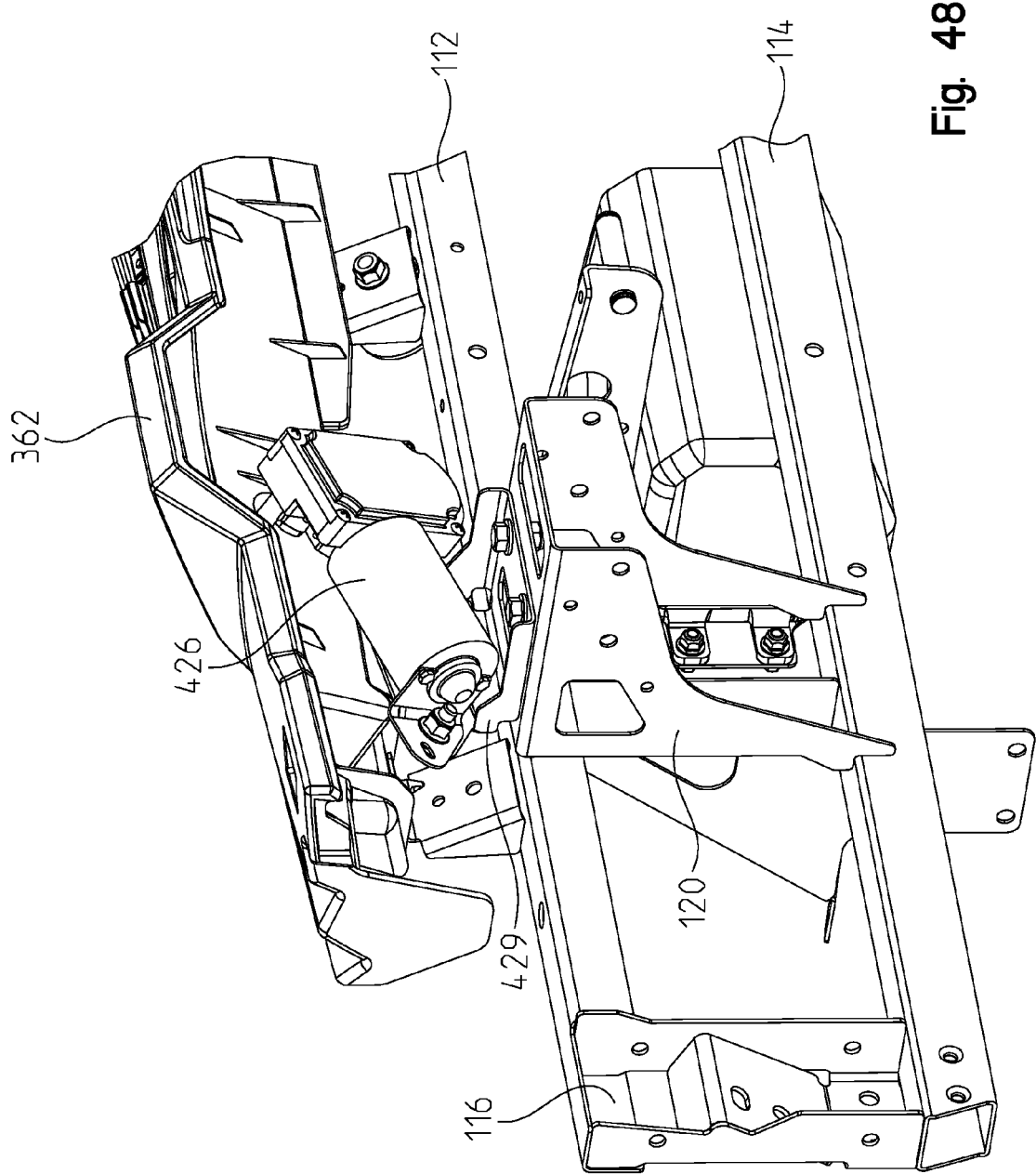
FIG. 48 is a left rear perspective view of a motor assembly of the wiper assembly of FIG. 47.
Figure 49:
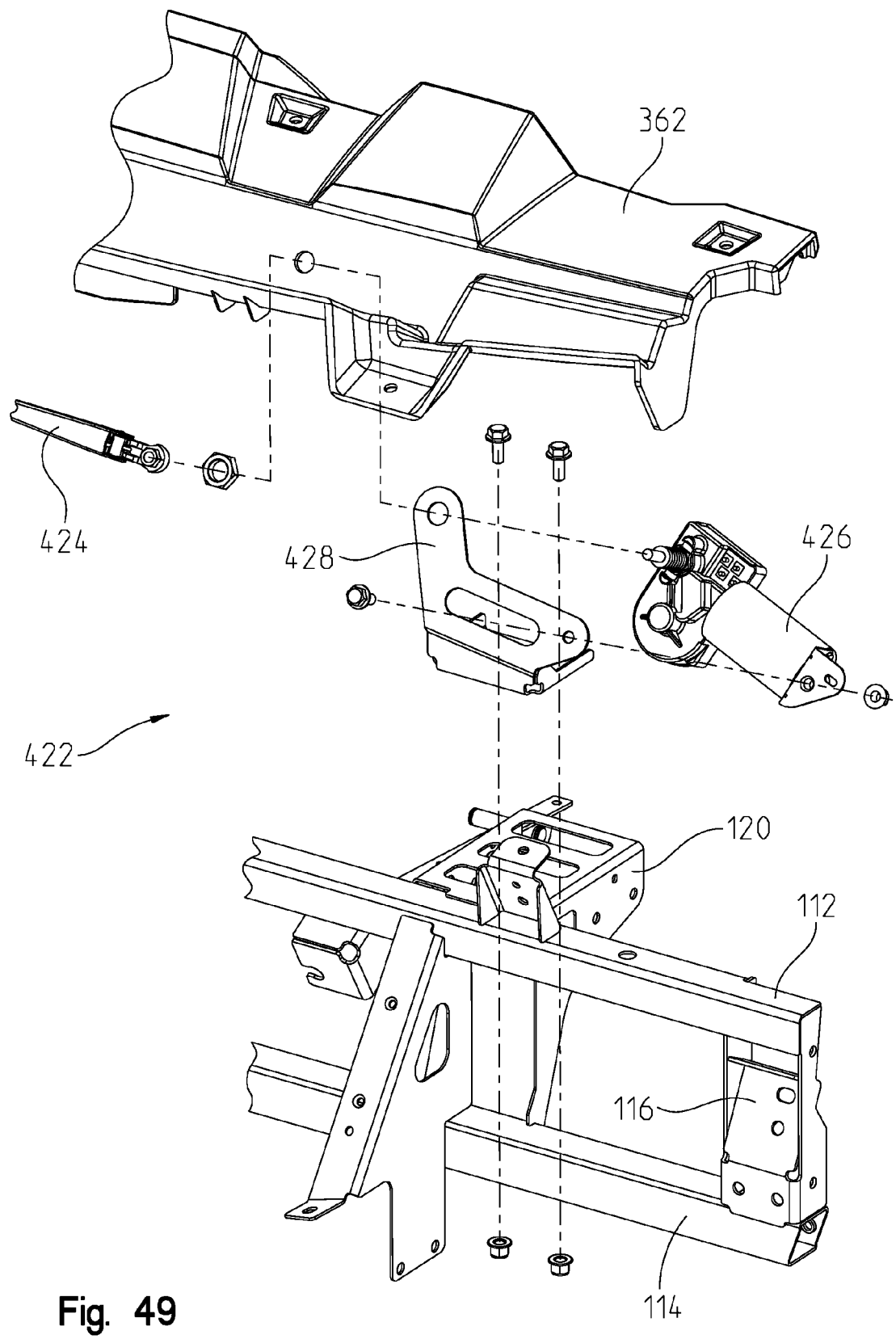
FIG. 49 is an exploded view of the motor assembly of FIG. 48.

Referring to FIGS. 47-49, recess 412 of upper dash member 362 may support front windshield 420 of utility vehicle 2. In one embodiment, front windshield 420 may be comprised of safety glass to enclose operator area 14 and protect the operator and passenger(s) therein. Front windshield 420 may be supported by upper dash member 362 and/or hood 322, as well as front upstanding member 152 and front cross-member 158 of roll cage assembly 150. The lower end of front windshield 420 may seal against upper dash member 362 and/or hood 322. Front windshield 420 may be configured to pivot upwardly and outwardly from upper dash member 362 and roll cage assembly 150.

A wiper assembly 422 may be operably coupled to front windshield 420. Wiper assembly 422 may include a wiper blade 424 and a wiper motor 426 positioned below front windshield 420. Wiper blade 424 may be positioned near the rearward end of hood 322 in order to contact front windshield 420, or alternatively, hood 322 may include an opening (not shown) through which wiper blade 424 extends in order to contact front windshield 420. Wiper blade 424 is supported on an outer surface of upper dash member 362, however, wiper motor 426 is supported below upper dash member 362. In one embodiment, wiper blade 424 is configured to be positioned off of front windshield 420, as shown in FIG. 47. Alternatively, wiper blade 424 may be configured to be positioned on front windshield 420 such that wiper blade 424 contacts front windshield 420 when in both an operating mode and a non-operating mode. In a further embodiment, wiper blade 424 may be configured for selective placement on or off front windshield 420, such that the operator is able to selectively adjust the position of wiper blade 424 in order to accommodate the position of wiper motor 426 and/or when removing front windshield 420 from vehicle 2.

Wiper motor 426 is supported by frame assembly 20 and, illustratively, is coupled to steering support member 120 on upper and lower cross-members 112, 114. As shown in FIGS. 48 and 49, wiper blade 424 is coupled to wiper motor 426 though a bracket 428, which supports both wiper blade 424 and wiper motor 426 on steering support member 120. Steering support member 120 includes a bracket 429 which couples with bracket 428 in order to support both wiper blade 424 and wiper motor 426.

Figure 50:
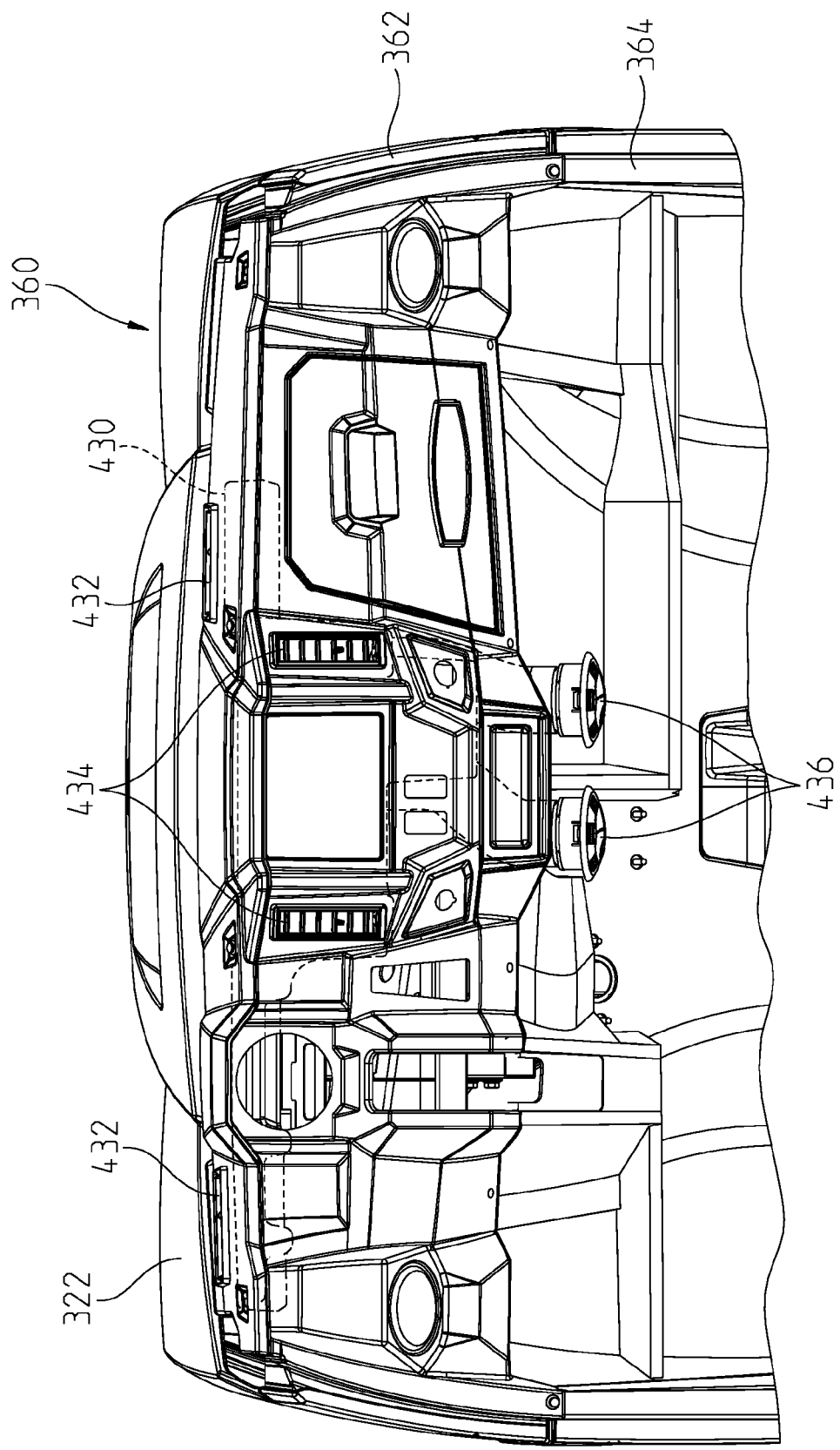
FIG. 50 is a rear view of a defrost and heating unit coupled to the dashboard assembly of FIG. 40.
Figure 52:
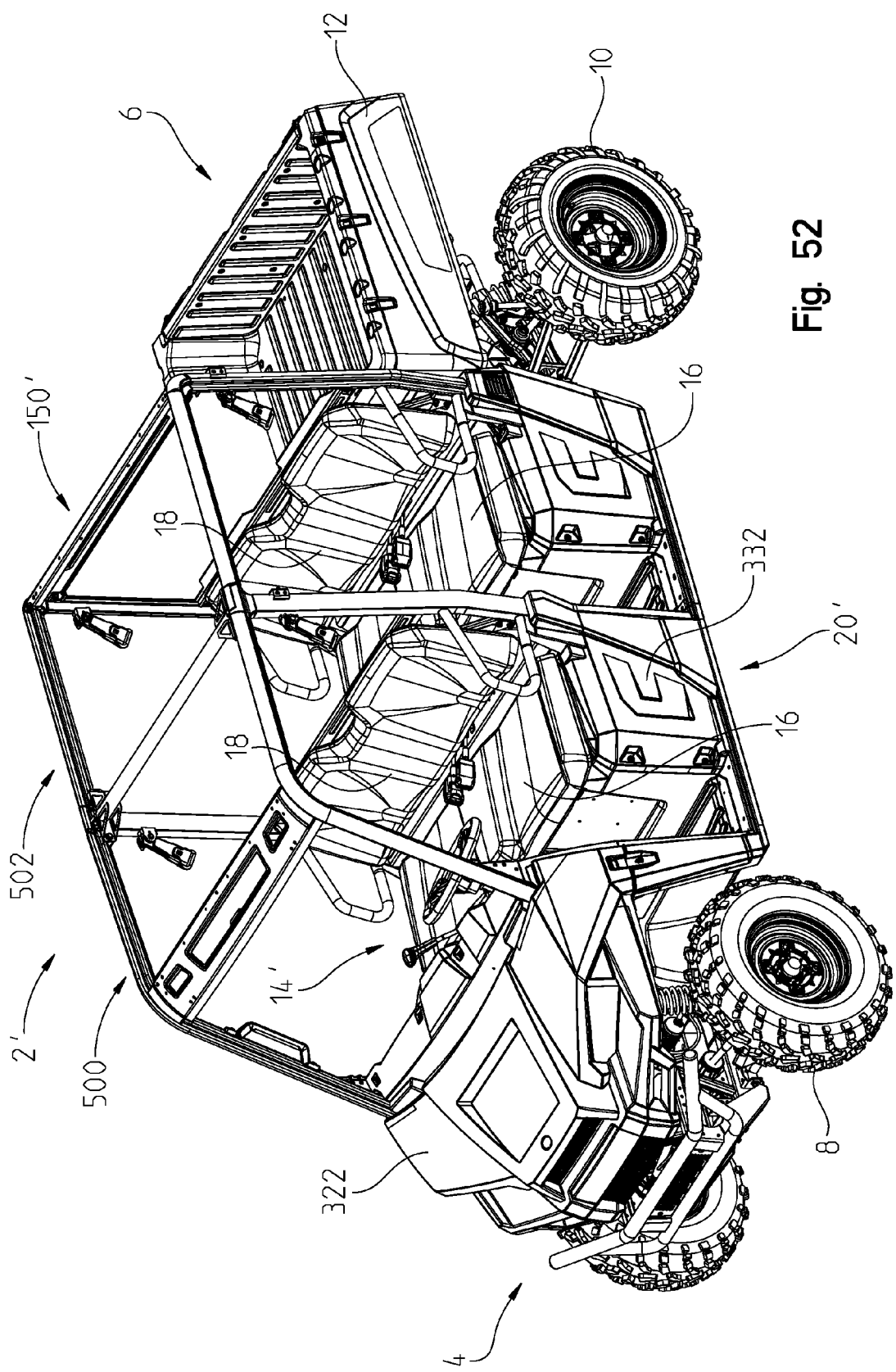
FIG. 52 is left front perspective view of an alternative embodiment of the utility vehicle of FIG. 1.

Referring to FIGS. 50 and 52, upper dash member 362 also supports and generally surrounds a defrost/heating unit 430. Defrost/heating unit 430 may be configured to defrost front windshield 420 and/or provide heat to operator area 14. In one embodiment, unit 430 defrosts front windshield 420 and also provides heat and air conditioning to operator area 14.

Figure 51:
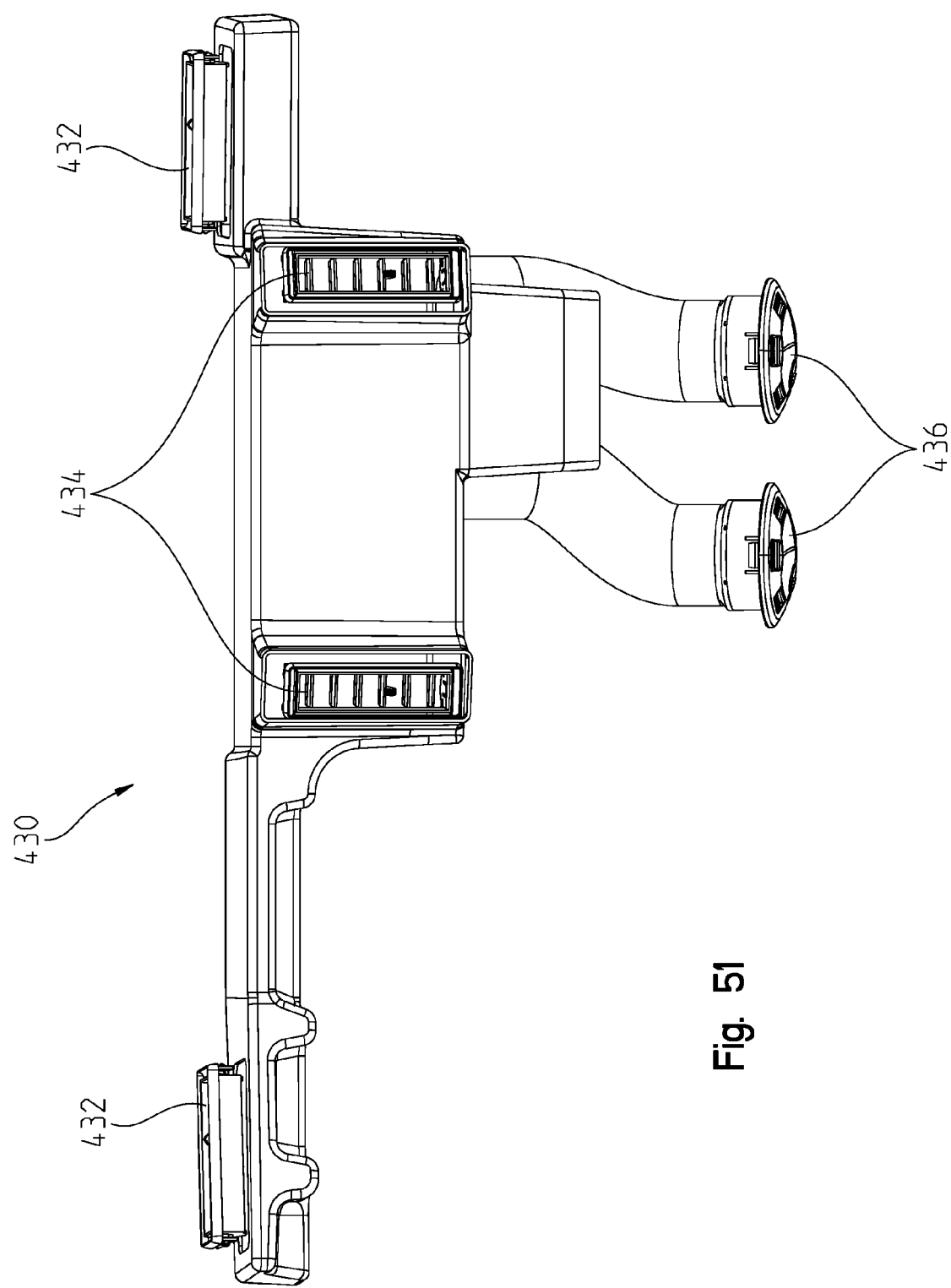
FIG. 51 is rear view of the defrost and heating unit of FIG. 50.

Defrost/heating unit 430 is configured to provide air to a plurality of vents, illustratively upper vents 432, intermediate vents 434, and lower vents 436. As shown in FIGS. 50 and 51, unit 430 may include two upper vents 432, two intermediate vents 434, and two lower vents 436. Upper vents 432 are positioned within top surface 410 of upper dash member 362, intermediate vents 434 are positioned within upper dash member 362 and are laterally outward of opening 380 for the multi-functional display, and lower vents 436 are extend below upper dash member 362 and are generally rearward of an upper portion of lower dash member 364. By positioning defrost/heating unit 430 forward of dashboard assembly 360, defrost/heating unit 430 is positioned outside of operator area 14.

Referring to FIGS. 52-61, an alternative embodiment of utility vehicle 2 is shown as utility vehicle 2'. Utility vehicle 2' of FIGS. 52-61 is similar to utility vehicle 2 of FIGS. 1-51, with like reference numerals indicating like parts having like structure and functionality, except as detailed herein. As shown in FIG. 52, utility vehicle 2' has front end 4 and rear end 6. A plurality of ground engaging members, including front wheels 8 and rear wheels 10, support utility vehicle 2' on a ground surface. A frame assembly 20' extends between front end 4 and rear end 6 and is supported on front wheels 8 and rear wheels 10. Frame assembly 20' supports cargo box 12 at rear end 6 and an operator area 14' between front end 4 and rear end 6.

Operator area 14' includes a front seating section 500 for at least an operator and a front passenger in a side-by-side arrangement. Illustratively, front seating section 500 includes seat bottom 16 and seat back 18. Additionally, operator area 14' includes a rear seating section 502 for at least two rear passengers in a side-by-side arrangement. Illustratively, rear seating section 500 also includes seat bottom 16 and seat back 18.

Figure 53:
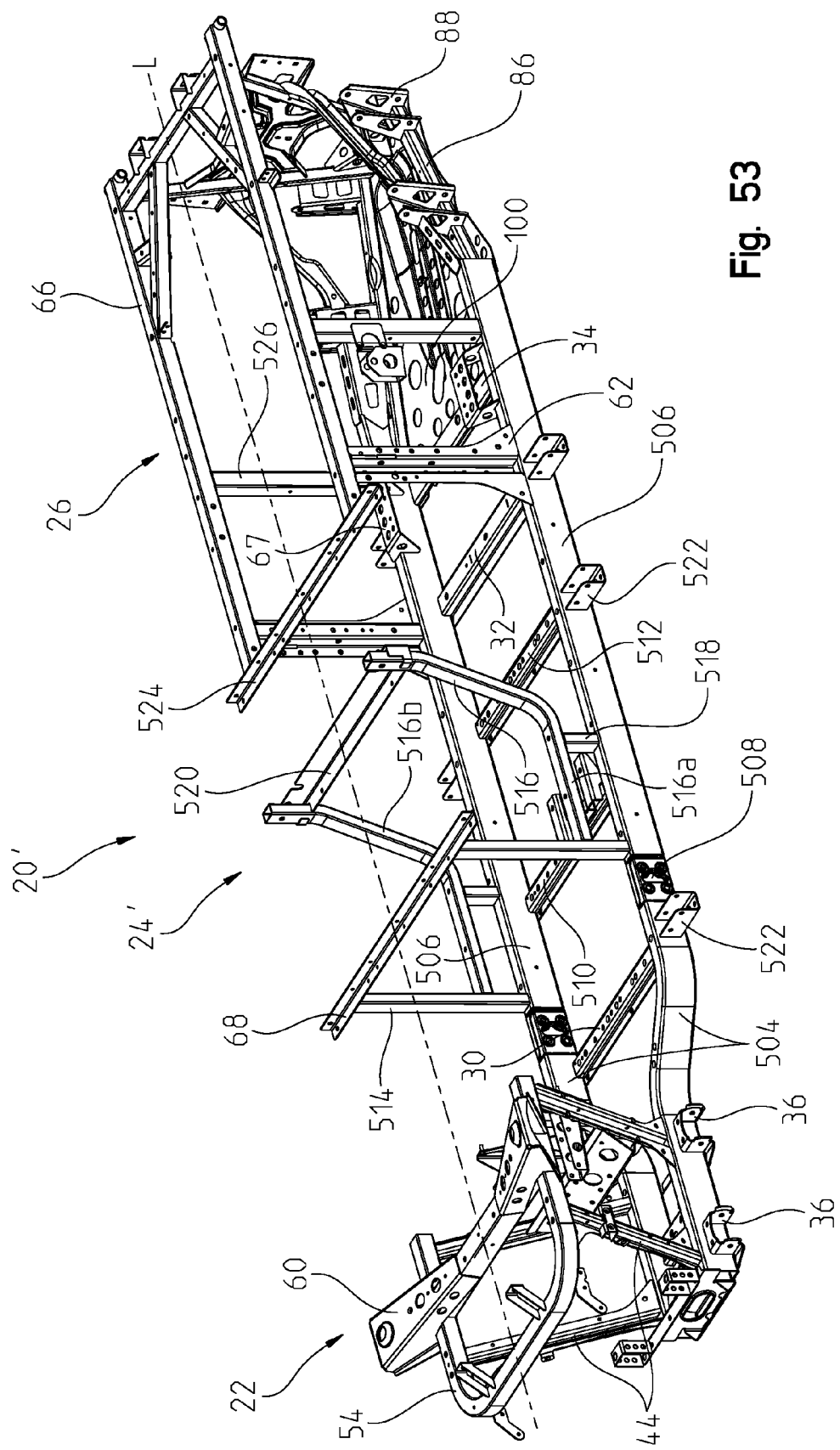
FIG. 53 is a left front perspective view of a frame assembly of the vehicle of FIG. 52.
Figure 54:
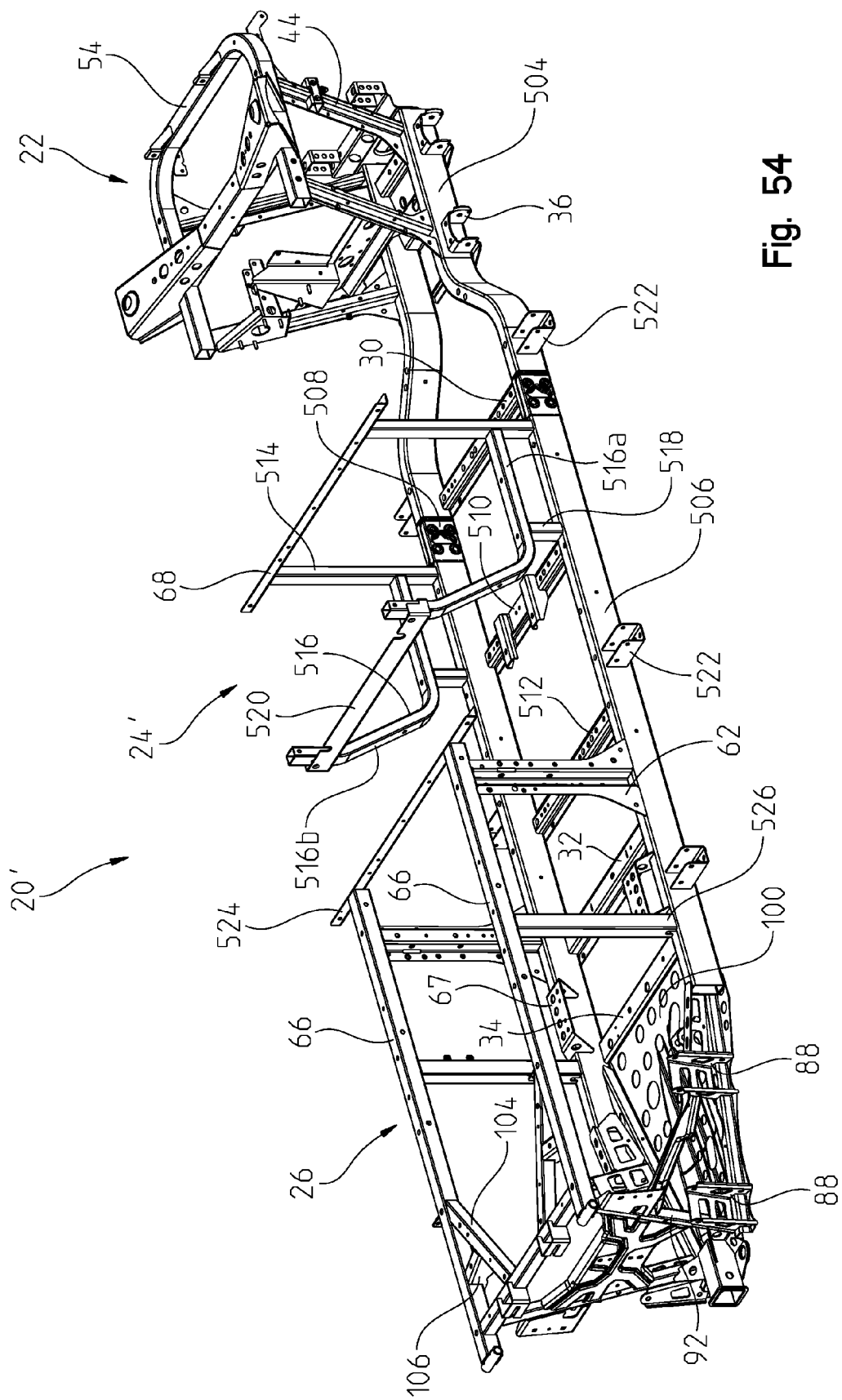
FIG. 54 is a right rear perspective view of the frame assembly of FIG. 53.
Figure 55:
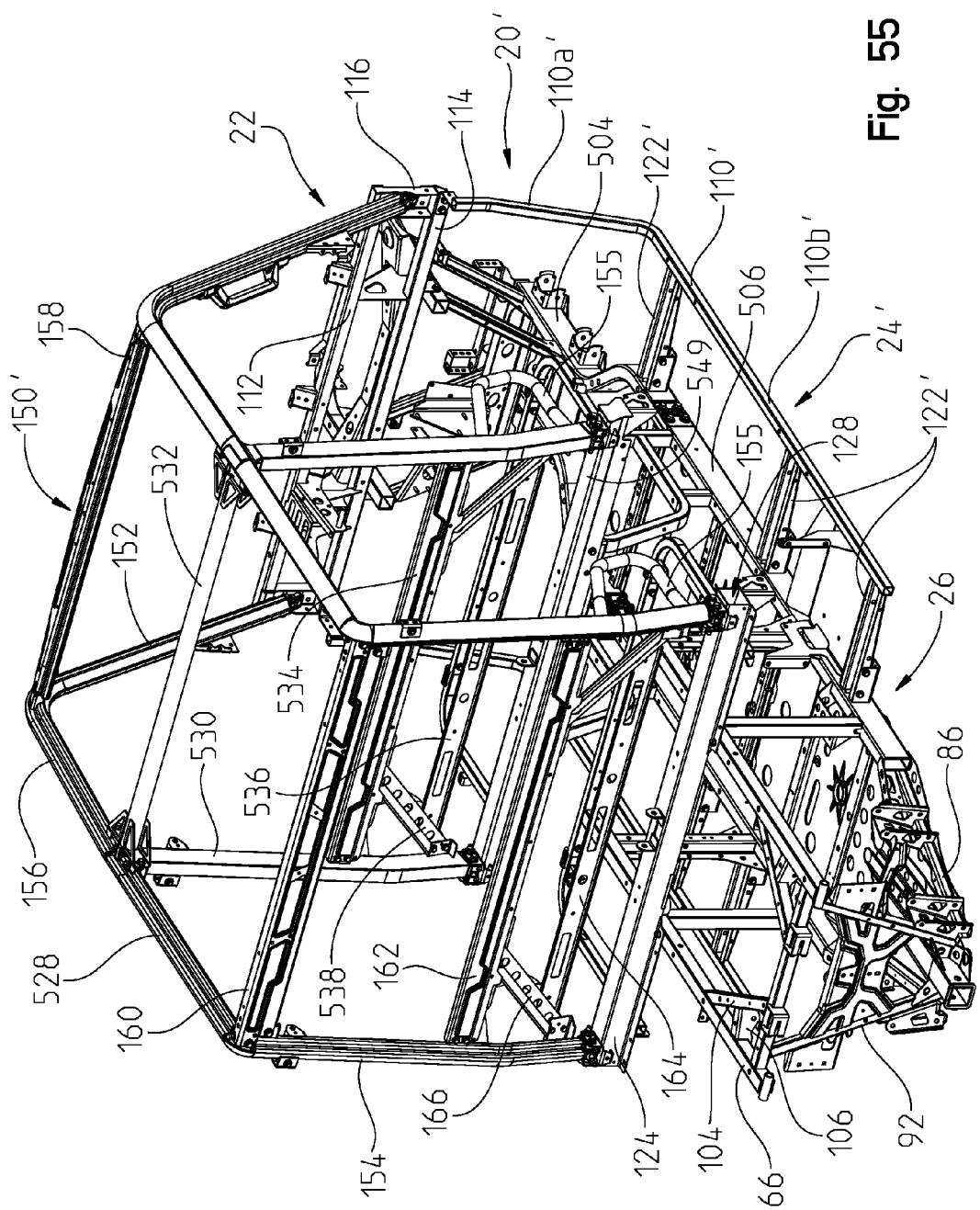
FIG. 55 is a right rear perspective view of a roll cage assembly coupled to the frame assembly of FIG. 54.

Referring to FIGS. 53-55, frame assembly 20' extends along longitudinal axis L and includes front frame portion 22, a mid-frame portion 24', and rear frame portion 26. Front longitudinally-extending members 504 are coupled to rear longitudinally-extending members 506 with a plurality of couplers 508. Rear longitudinally-extending members 506 include brackets 522. A plurality of cross-members 30, 32, 34, 510, and 512 extend transversely to longitudinal axis L. Cross-member 30 is coupled to front longitudinally-extending members 504. Cross-members 32, 34, 510, and 512 are rearward of cross-member 30 and are coupled to rear longitudinally-extending members 506.

At front frame portion 22, front longitudinally-extending members 504 are coupled to alignment arm brackets 36 and upstanding members 44. Upstanding members 44 support U-shaped frame member 54.

Referring to FIGS. 53-55, mid-frame portion 24' includes upstanding members 62 and 514, which are coupled to rear longitudinally-extending members 506. Upstanding members 514 also are coupled to cross-member 68, and upstanding members 62 are upper longitudinally-extending members 66. Upper longitudinally-extending members 66 also are coupled to a cross-member 524 of mid-frame portion 24'.

Mid-frame portion 24' also includes frame members 516, which include a horizontal portion 516a and a vertical portion 516b. Horizontal portion 516a is coupled to upstanding members 514 and a support member 518. Vertical portion 516b is coupled to a cross-member 520.

Referring to FIG. 55, mid-frame portion 24' also includes a roll cage support frame, which includes outer frame rails 110', upper cross-member 112, lower cross-member 114, braces 116, intermediate cross-member 549, and rear cross-member 124. Rear cross-member 124 is generally parallel to intermediate cross-member 549 and is fluidly coupled with air intake assembly 260. Outer frame rails 110' have an upstanding portion 110a' and a longitudinal portion 110b'. Longitudinal portion 110b' is coupled to front longitudinally-extending members 504 and rear longitudinally-extending members 506 with braces 122'. More particularly, braces 122' are coupled to brackets 522 on front longitudinally-extending members 504 and rear longitudinally-extending members 506. Upstanding portion 110a' of outer frame rails 110' are coupled to lower cross-member 114 with conventional fasteners, such as bolts, screws, welds, rivets, and/or adhesive.

Referring to FIGS. 53-55, rear frame portion 26 includes frame rails 86, alignment arm brackets 88, upstanding members 92, and pan 100. Additionally, rear frame portion 26 includes diagonal frame members and braces 106. Rear frame portion 26 further includes upstanding members 526 coupled to rear longitudinally-extending members 506 and upper longitudinally-extending members 66.

Referring to FIGS. 55-61, a roll cage assembly 150' is coupled to frame assembly 20' and includes front upstanding members 152, intermediate upstanding members 530, rear upstanding members 154, front longitudinal members 156, and rear longitudinal members 528. Additionally, roll cage assembly 150' includes front cross-member 158, an intermediate cross-member 532, rear upper cross-member 160, rear intermediate cross-member 162, rear lower cross-member 164, and diagonal braces 166. Front cross-member 158 is coupled to front upstanding members 152 and/or front longitudinal members 156. Intermediate cross-member 532 is coupled to intermediate upstanding members 530, front longitudinal members 156, and/or rear longitudinal members 528. Rear upper cross-member 160 is coupled to rear upstanding members 154 and/or longitudinal members 156. Rear intermediate cross-member 162, rear lower cross-member 164, and diagonal braces 166 are coupled to rear upstanding members 154.

At least front upstanding members 152, rear upstanding members 154, front longitudinal members 156, rear longitudinal members 528, front cross-member 158, and rear upper cross-member 160 may be profiled such that the cross-sections thereof generally define a figure-8 or hourglass configuration, as detailed further in U.S. patent application Ser. No. 13/492,589, filed on Jun. 8, 2012, the complete disclosure of which is incorporated by reference herein. Intermediate upstanding members 530 may define a rectangle in cross-section.

Figure 56:
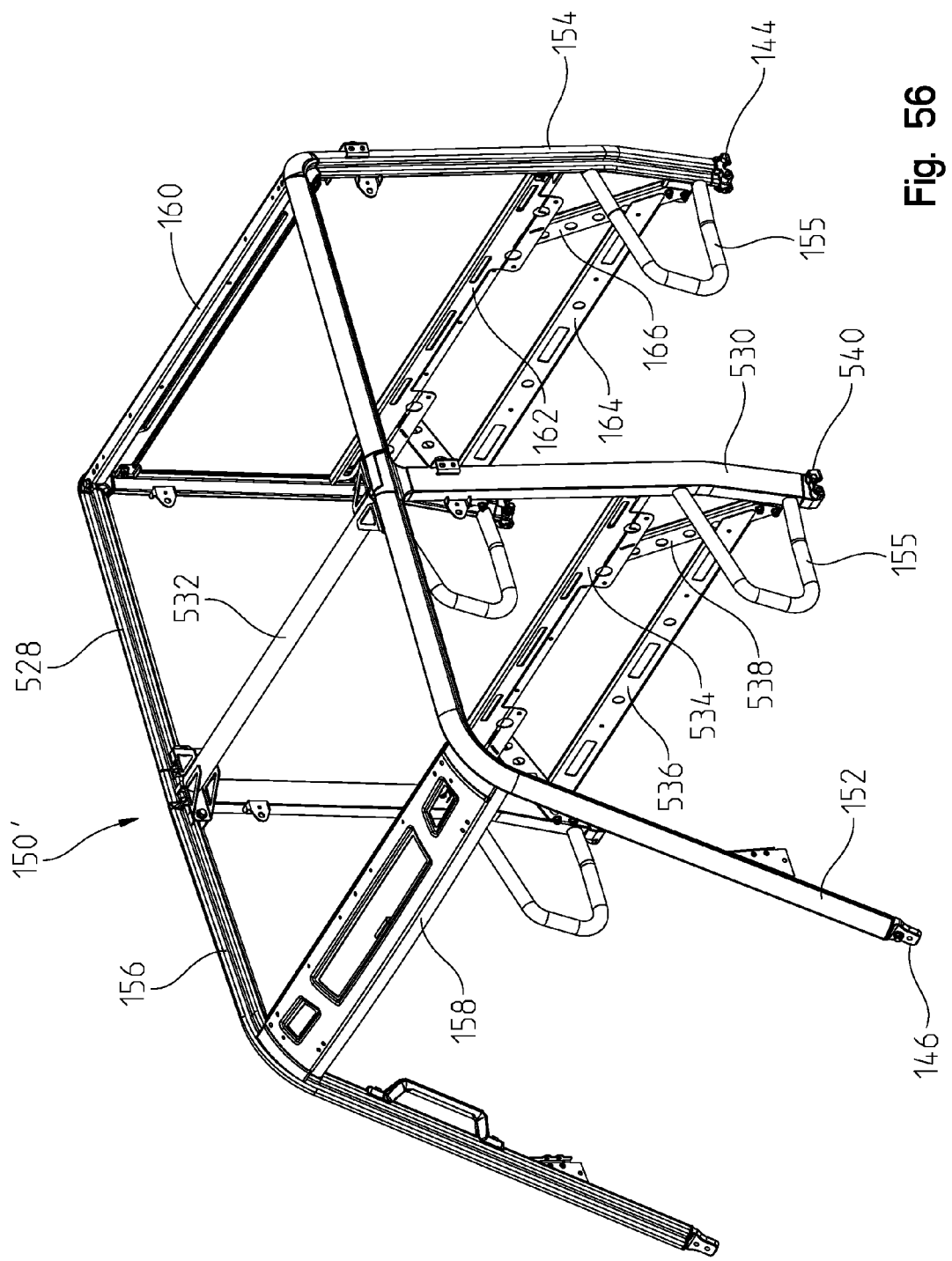
FIG. 56 is s left front perspective view of the roll cage assembly of FIG. 55.
Figure 57:
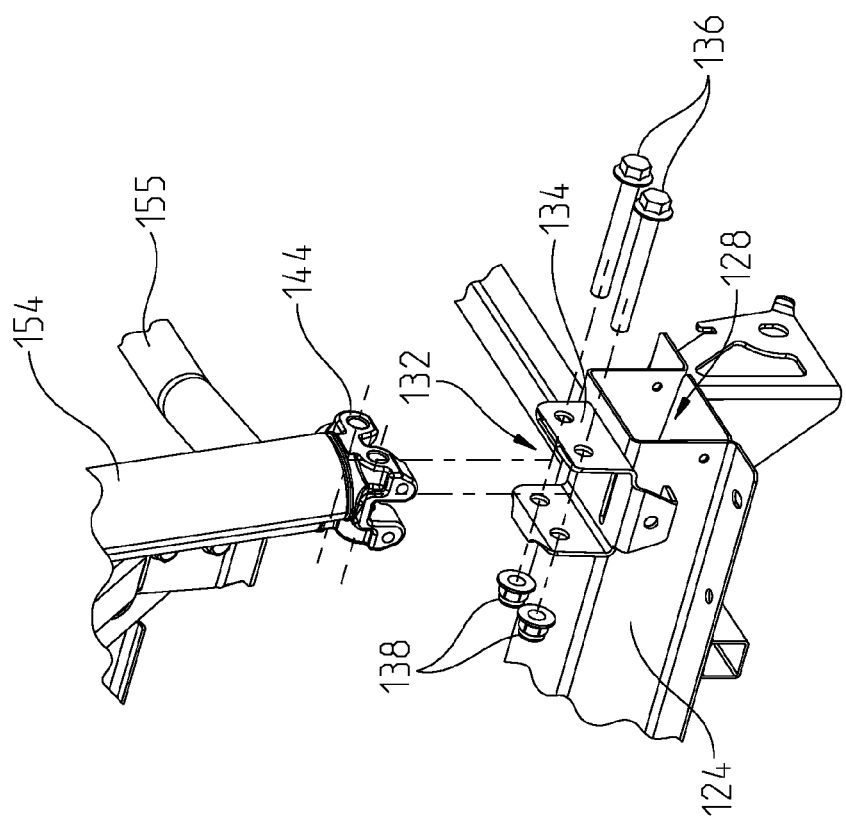
FIG. 57 is an exploded view of a portion of the roll cage assembly configured to couple with a portion of the frame assembly of FIG. 55.

As shown in FIG. 56, the upper end of rear upstanding members 154 is coupled to rear cross-member 160 and/or rear longitudinal members 528. As shown in FIG. 57, the lower end of rear upstanding members 154 is coupled to rear cross-member 124 through bracket 132. The lower ends of rear upstanding members 154 include couplers 144. Couplers 144 are configured to be received between tabs 134 of brackets 132 such that openings within couplers 144 align with the corresponding openings in tabs 134. Fasteners 136 extend though the openings in tabs 134 and couplers 144 in order to couple with fasteners 138 to secure rear upstanding members 154 to rear cross-member 124, which may be detailed further in U.S. patent application Ser. No. 13/492,589, filed on Jun. 8, 2012, the complete disclosure of which is incorporated by reference herein. Rear upstanding members 154 also may include retention bars 155 (FIG. 1), which support the rear passengers within rear seating section 502 of operator area 14'. Retention bars 155 may be welded to rear upstanding members 154.

Figure 59:
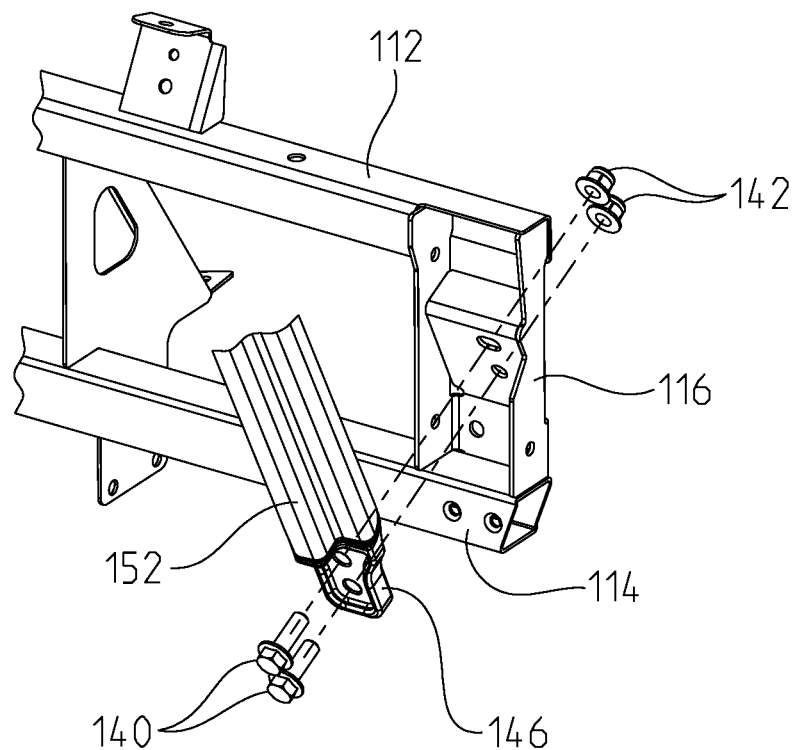
FIG. 59 is another exploded view of a further portion of the roll cage assembly configured to couple with another portion of the frame of FIG. 55.

Referring to FIG. 59, the upper end of front upstanding members 152 is coupled to front cross-member 158 and/or front longitudinal members 156, and the lower end of front upstanding members 152 is coupled to braces 116. Couplers 146 on the lower ends of front upstanding members 152 include openings which align with corresponding openings in braces 116. Fasteners 140 extend through the openings in couplers 146 and braces 116 and couple with fasteners 142 to secure front upstanding members 152 to braces 116, which may be detailed further in U.S. patent application Ser. No. 13/492,589, filed on Jun. 8, 2012, the complete disclosure of which is incorporated by reference herein.

Figure 58:
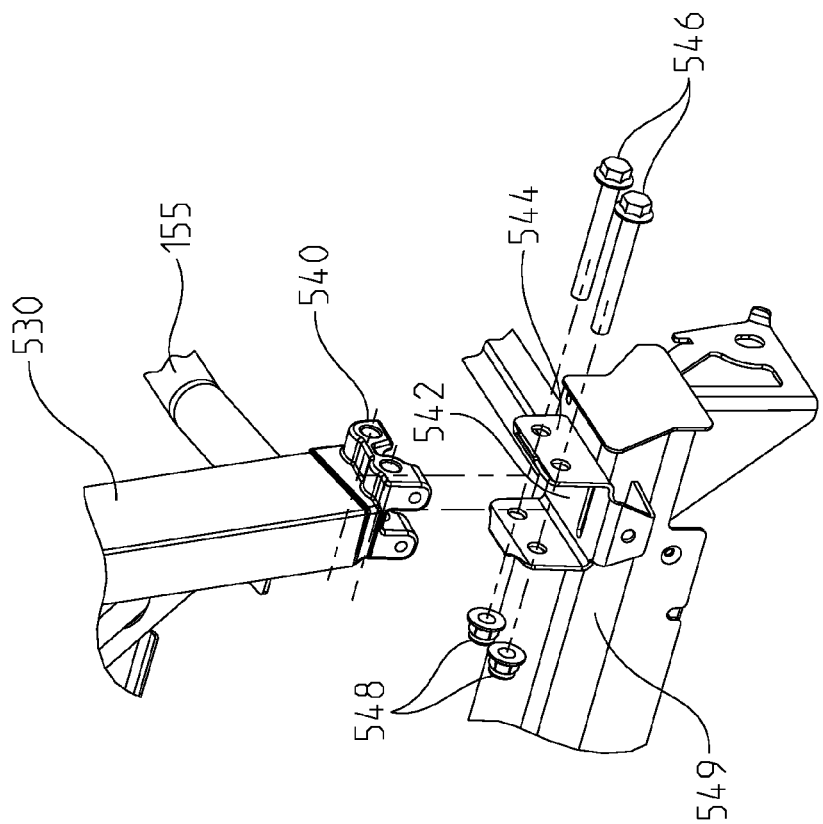
FIG. 58 is a further exploded view of another portion of the roll cage assembly configured to couple with a further portion of the frame assembly of FIG. 55.

Referring to FIG. 58, the lower ends of intermediate upstanding members 530 are coupled to intermediate cross-member 549 through bracket 542. The lower ends of intermediate upstanding members 530 include couplers 540. Couplers 540 are configured to be received between tabs 544 of brackets 542 such that openings within couplers 540 align with the corresponding openings in tabs 544. Fasteners 546 extend though the openings in tabs 544 and couplers 540 in order to couple with fasteners 548 to secure intermediate upstanding members 530 to intermediate cross-member 549, which may be detailed further in U.S. patent application Ser. No. 13/492,589, filed on Jun. 8, 2012, the complete disclosure of which is incorporated by reference herein. Intermediate upstanding members 530 also may include retention bars 155, which support the operator and the passenger within front seating section 500 of operator area 14'.

Figure 60:
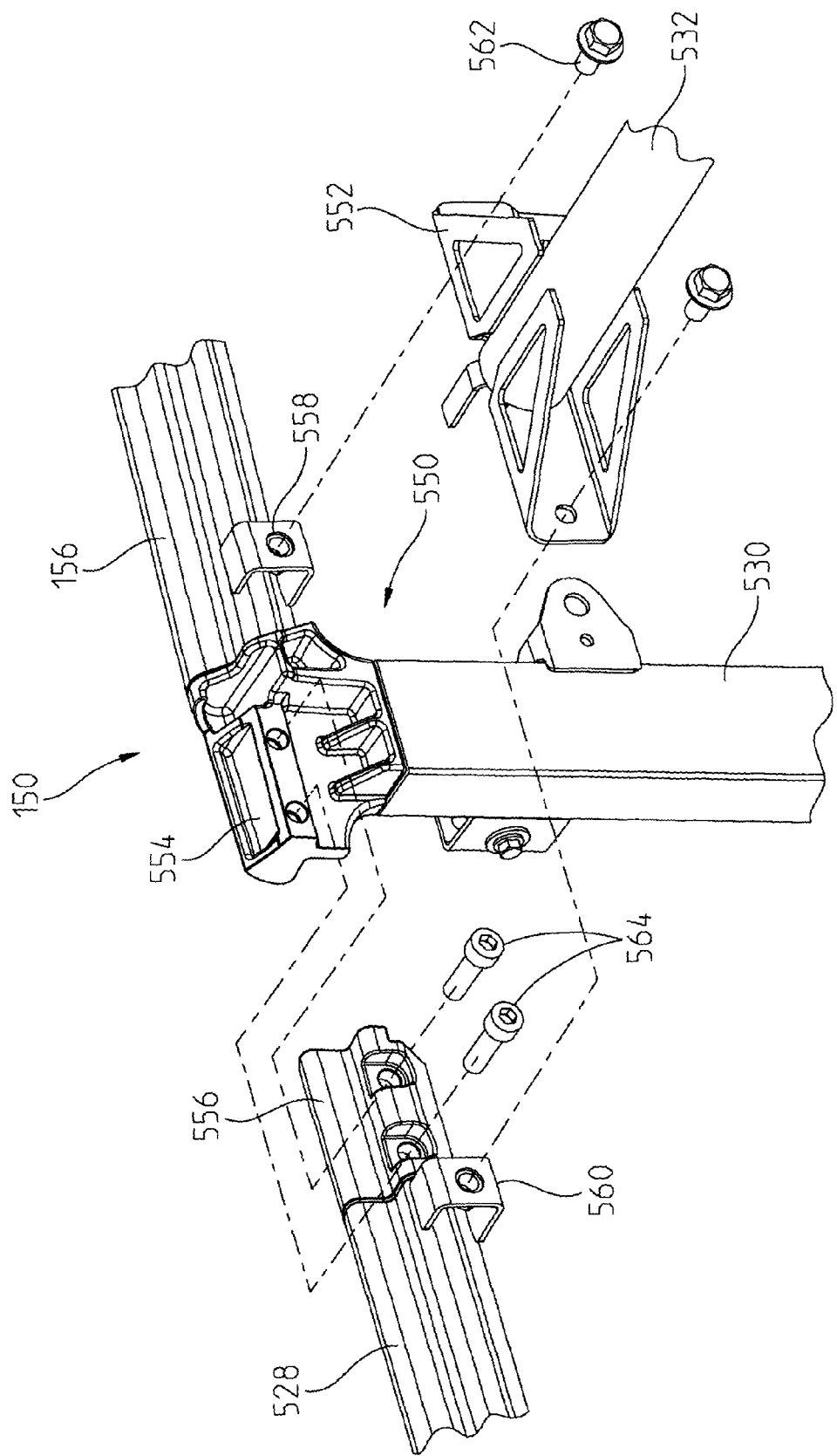
FIG. 60 is an exploded view of a portion of the roll cage assembly of FIG. 55.

Referring to FIG. 60, the upper ends of intermediate upstanding members 530 are coupled to intermediate cross-member 532, front longitudinal members 156, and rear longitudinal members 528 with a coupler assembly 550. Coupler assembly 550 includes a bracket 552, a forward coupling member 554, a rearward coupling member 556, a forward support member 558, and a rearward support member 560. In particular, intermediate cross-member 532 is coupled to bracket 552. In one embodiment, bracket 552 is welded to intermediate cross-member 532. In other embodiments, bracket 552 may be retained on intermediate cross-member 532 with other fasteners, such as rivets, bolts, screws, and/or adhesive, or may be integrally formed with intermediate cross-member 532. Bracket 552 also is coupled to front longitudinal member 156 through forward support member 558. A fastener 562 is received within corresponding openings of bracket 552 and forward support member 558 to couple intermediate cross-member 532 to front longitudinal member 156. Similarly, bracket 552 is coupled to rear longitudinal member 528 with rearward support member 560 and fastener 562.

In order to couple front longitudinal member 156 to intermediate upstanding member 530 and rear longitudinal member 528, front longitudinal member 156 includes forward coupling member 554, which may be cast and welded to the rearward end of front longitudinal member 156 and the upper end of intermediate upstanding member 530. In other embodiments, forward coupling member 554 may be formed through other processes and/or coupled to the rearward end of front longitudinal member 156 and the upper end of intermediate upstanding member 530 with other fasteners, such as rivets, bolts, and/or adhesive. The inner surface of forward coupling member 554 is generally complimentary to the outer surface of rearward coupling member 556. Rearward coupling member 556 is coupled to forward coupling member 554 with fasteners 564. As such, front longitudinal member 156 is coupled to rear longitudinal member 528 through coupling members 554, 556. Additionally, front longitudinal member 156 is coupled to intermediate upstanding member 530 with forward coupling member 554, and is coupled to intermediate cross-member 532 with bracket 552.

Figure 61:
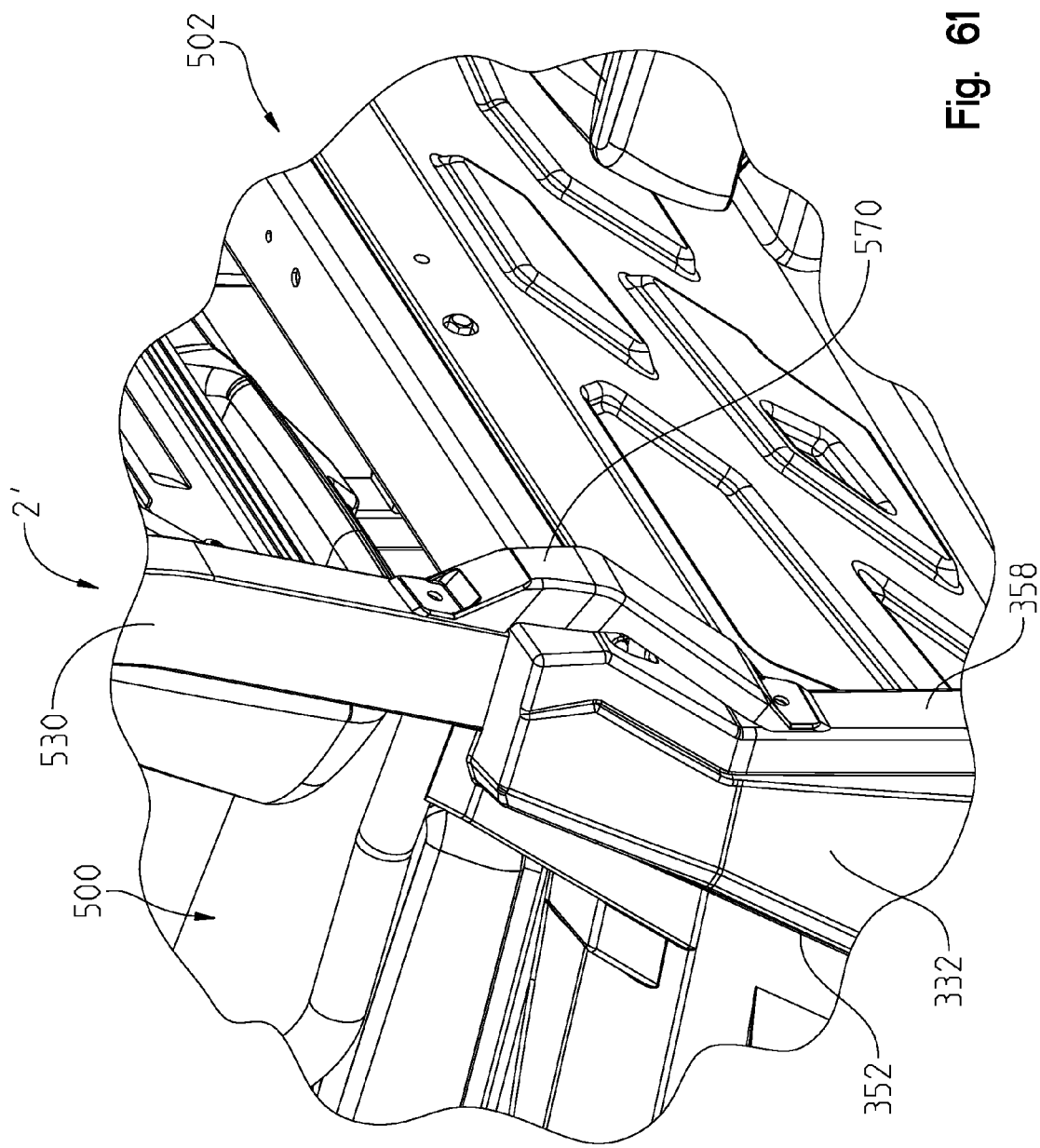
FIG. 61 is left rear perspective view of a rear door sealing member of the vehicle of FIG. 52.

Vehicle 2' of FIGS. 52-61 may include front doors 354, rear doors (not shown), a roof (not shown), front windshield 420, and/or a rear windshield (not shown) in order to enclose operator area 14'. When operator area 14' is enclosed, the rear doors are configured to engage with body assembly 320 and roll cage assembly 150' in order to seal operator area 14'. More particularly, side panels 352 may include a rear door sealing member 570. As shown in FIG. 61, rear door sealing member 570 is configured to couple with third sealing surface 358 of side panels 352 and intermediate upstanding member 530 with conventional fasteners. The rear doors are configured to engage with rear door sealing member 570 when closed in order to seal operator area 14'. In particular, the front end of the rear doors is configured to contact rear door sealing member 570, side panel 352, and/or intermediate upstanding member 530 in order to seal operator area 14'. Alternatively, third sealing surface 358 of side panels may be configured to directly engage the front end of the rear doors in order to seal operator area 14'.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
a plurality of ground engaging members;
a frame supported by the plurality of ground engaging members;
an engine supported by the frame and configured to provide power to at least one of the plurality of ground engaging members;
an operator area supported by the frame and including seating for at least an operator and a passenger in a side-by-side arrangement, the seating including at least one seat bottom and at least one seat back; and
a body assembly coupled to the frame and including:
a hood;
a first unitary side panel positioned along an operator side of the utility vehicle and extending continuously from the hood to the at least one seat back; and
a second unitary side panel positioned along a passenger side of the utility vehicle and extending continuously from the hood to the at least one seat back.

2. The utility vehicle of claim 1, further including a floor board assembly, wherein the first and second unitary side panels extend from the floor board assembly to a position adjacent the at least one seat bottom.

3. The utility vehicle of claim 2, wherein the first and second unitary side panels are coupled to the floor board assembly.

4. The utility vehicle of claim 1, wherein the first and second unitary side panels are removably coupled to the hood with a latch assembly.

5. The utility vehicle of claim 1, further comprising a fuel assembly having a fuel tank and a fuel cap, the second unitary side panel is positioned adjacent the fuel tank and supports the fuel cap.

6. The utility vehicle of claim 1, further comprising an electrical system including at least one battery, and the first unitary side panel is positioned adjacent the at least one battery.

7. The utility vehicle of claim 1, further comprising a dashboard assembly having an upper dash member and a lower dash member, and at least the lower dash member is coupled to the first and second unitary side panels of the body.

8. The utility vehicle of claim 1, further comprising an air intake system operably coupled to the engine and including an air inlet within each of the first and second unitary side panels.

9. The utility vehicle of claim 3, wherein the floor board assembly includes a tread member coupled to the first unitary side panel.

10. The utility vehicle of claim 1, wherein the frame includes a lower longitudinal frame member, and the first unitary side panel extends continuously from the hood to the lower longitudinal frame member.

11. A utility vehicle, comprising:
at least one front ground engaging member having an axis of rotation;
at least one rear ground engaging member having an axis of rotation;
a frame supported by the front and rear ground engaging members and including front upwardly-extending members and rear upwardly-extending members;
an engine supported by the frame and configured to provide power to at least one of the plurality of ground engaging members;
an operator area supported by the frame and defined generally intermediate the front and rear upwardly-extending members, and the operator area including seating for at least an operator and a passenger in a side-by-side arrangement, the seating including at least one seat bottom and at least one seat back; and
a body assembly coupled to the frame and including:
a hood;
a first unitary side panel positioned along an operator side of the utility vehicle and having a first end positioned generally below the front upwardly-extending member and above the axis of rotation of the front ground engaging member and a second end positioned generally below the rear upwardly-extending member and above the axis of rotation of the front ground engaging member, and the first unitary side pane a extending continuously between the first and second ends; and a second unitary side panel positioned along an operator side of the utility vehicle and having a first end positioned generally below the front upwardly-extending member and above the axis of rotation of the front ground engaging member and a second end positioned generally below the rear upwardly-extending member and above the axis of rotation of the front ground engaging member, and the first unitary side pane a extending continuously between the first and second ends.

12. The utility vehicle of claim 11, further including a floor board assembly, wherein the first and second unitary side panels extend from the floor board assembly to a position adjacent the at least one seat bottom.

13. The utility vehicle of claim 12, wherein the first and second unitary side panels are coupled to the floor board assembly.

14. The utility vehicle of claim 11, wherein the first and second unitary side panels are removably coupled to the hood with a latch assembly.

15. The utility vehicle of claim 11, further comprising a fuel assembly having a fuel tank and a fuel cap, the second unitary side panel is positioned adjacent the fuel tank and supports the fuel cap.

16. The utility vehicle of claim 11, further comprising an electrical system including at least one battery, and the first unitary side panel is positioned adjacent the at least one battery.

17. The utility vehicle of claim 11, further comprising a dashboard assembly having an upper dash member and a lower dash member, and at least the lower dash member is coupled to the first and second unitary side panels of the body.

18. The utility vehicle of claim 11, further comprising an air intake system operably coupled to the engine and including an air inlet within each of the first and second unitary side panels.

* * * * *